United States Patent
Berkland et al.

(10) Patent No.: US 11,460,356 B2
(45) Date of Patent: Oct. 4, 2022

(54) FUNCTIONAL SOFT MATERIALS AND METHODS OF MAKING AND USING THEREOF

(71) Applicant: THE UNIVERSITY OF KANSAS, Lawrence, KS (US)

(72) Inventors: Cory Berkland, Wildwood, MO (US); Jonathan Whitlow, Hutchinson, KS (US); Jean Salash, Overland Park, KS (US)

(73) Assignee: The University of Kansas, Lawrence, KS (US)

( * ) Notice: Subject to any disclaimer, the term of this patent is extended or adjusted under 35 U.S.C. 154(b) by 264 days.

(21) Appl. No.: 16/895,965

(22) Filed: Jun. 8, 2020

(65) Prior Publication Data
US 2020/0408616 A1   Dec. 31, 2020

Related U.S. Application Data

(60) Provisional application No. 62/858,946, filed on Jun. 7, 2019.

(51) Int. Cl.
*G01L 1/12* (2006.01)
*C09D 11/037* (2014.01)
(Continued)

(52) U.S. Cl.
CPC ............... *G01L 1/12* (2013.01); *B33Y 10/00* (2014.12); *B33Y 70/00* (2014.12); *B33Y 80/00* (2014.12);
(Continued)

(58) Field of Classification Search
CPC .. B29C 64/118; B29K 2995/0008; G01L 1/12
See application file for complete search history.

(56) References Cited

U.S. PATENT DOCUMENTS

| 10,155,884 B2 | 12/2018 | Kenney et al. |
| 2011/0151377 A1* | 6/2011 | Gray ............... G03F 7/0385 427/128 |

(Continued)

OTHER PUBLICATIONS

Lisjak et al. "Anisotropic Magnetic Nanoparticles: A Review of their Properties, Synthesis, and Potential Applications," *Progress in Materials Science*, 2018, 95; 286-328.

(Continued)

*Primary Examiner* — James Sanders
(74) *Attorney, Agent, or Firm* — Meunier Carlin & Curfman LLC

(57) ABSTRACT

Disclosed are functional materials for use in additive manufacturing (AM). The functional material can comprise an elastomeric composition (e.g., a silicone composite) for use in, for example, direct ink writing. The elastomeric composition can include and elastomeric resin, and a magnetic nanorod filler dispersed within the elastomeric resin. Nanorod characteristics (e.g., length, diameter, aspect ratio) can be selected to create 3D-printed constructs with desired mechanical properties along different axes. Furthermore, since nickel nanorods are ferromagnetic, the spatial distribution and orientation of nanorods within the continuous phase can be controlled with an external magnetic field. This level of control over the nanostructure of the material system offers another degree of freedom in the design of functional parts and components with anisotropic properties. Magnetic fields can be used to remotely sense compression of the constructs, or alternatively, control the stiffness of these materials.

14 Claims, 40 Drawing Sheets

(51) Int. Cl.
| | |
|---|---|
| C09D 11/102 | (2014.01) |
| H01F 7/20 | (2006.01) |
| B33Y 10/00 | (2015.01) |
| B33Y 70/00 | (2020.01) |
| B33Y 80/00 | (2015.01) |
| B29K 509/08 | (2006.01) |
| H01F 1/032 | (2006.01) |
| B29C 64/118 | (2017.01) |
| B29K 83/00 | (2006.01) |
| B29K 105/16 | (2006.01) |

(52) U.S. Cl.
CPC .......... *C09D 11/037* (2013.01); *C09D 11/102* (2013.01); *H01F 7/20* (2013.01); *B29C 64/118* (2017.08); *B29K 2083/00* (2013.01); *B29K 2105/162* (2013.01); *B29K 2509/08* (2013.01); *B29K 2995/0008* (2013.01); *H01F 1/032* (2013.01)

(56) References Cited

U.S. PATENT DOCUMENTS

| | | | |
|---|---|---|---|
| 2016/0319150 | A1 | 11/2016 | Shepherd et al. |
| 2017/0312981 | A1 | 11/2017 | Selbertinger et al. |
| 2018/0066115 | A1 | 3/2018 | Achenbach et al. |
| 2018/0186076 | A1 | 7/2018 | Backer et al. |
| 2018/0370141 | A1 | 12/2018 | Eller et al. |
| 2019/0100626 | A1 | 4/2019 | Durban et al. |
| 2021/0270253 | A1* | 9/2021 | Omenetto ............... F03G 7/065 |

OTHER PUBLICATIONS

Frutiger, A.; Muth, J. T.; Vogt, D. M.; Mengüç, Y.; Campo, A.; Valentine, A. D.; Walsh, C. J.; Lewis, J. A., Capacitive Soft Strain Sensors via Multicore-Shell Fiber Printing. Advanced Materials 2015, 27 (15), 2440-2446.

Martin, J. J.; Fiore, B. E.; Erb, R. M., Designing bioinspired composite reinforcement architectures via 3D magnetic printing. Nature Communications 2015, 6 (1), 8641.

Darabi, M. A.; Khosrozadeh, A.; Mbeleck, R.; Liu, Y.; Chang, Q.; Jiang, J.; Cai, J.; Wang, Q.; Luo, G.; Xing, M., Skin-Inspired Multifunctional Autonomic-Intrinsic Conductive Self-Healing Hydrogels with Pressure Sensitivity, Stretchability, and 3D Printability. Advanced Materials 2017, 29 (31), 1700533.

Zeng, W.; Shu, L.; Li, Q.; Chen, S.; Wang, F.; Tao, X. M., Fiber-Based Wearable Electronics: A Review of Materials, Fabrication, Devices, and Applications. Advanced Materials 2014, 26 (31), 5310-5336.

Pang, C.; Lee, C.; Suh, K. Y., Recent advances in flexible sensors for wearable and implantable devices. 2013; vol. 130, pp. 1429-1441.

Vaidya, U. K.; Chawla, K. K., Processing of fibre reinforced thermoplastic composites. 2008; vol. 53, pp. 185-218.

Mouritz, A. P.; Bannister, M. K.; Falzon, P. J.; Leong, K. H., Review of applications for advanced three-dimensional fibre textile composites. Composites Part A 1999, 30 (12), 1445-1461.

Benjamin, C. K. Tee.; Chao, W.; Ranulfo, A.; Zhenan, B., An electrically and mechanically self-healing composite with pressure— and flexion-sensitive properties for electronic skin applications. Nature Nanotechnology 2012, 7 (12), 825.

Rashid, A.; Hasan, O., Wearable technologies for hand joints monitoring for rehabilitation: A survey. Microelectronics Journal 2019, 88, 173-183.

Mirzanejad, H.; Agheli, M., Soft force sensor made of magnetic powder blended with silicone rubber. Sensors and Actuators A: Physical 2019, 293, 108-118.

Mirzanejad, H.; Tabrizi, M. M.; Fathian, A.; Sharifnejad, A.; Agheli, M. In a New Soft Force Sensor using Blended Silicone-Magnetic Powder, 2017 5th RSI International Conference on Robotics and Mechatronics (ICRoM), Oct. 25-27, 2017; 2017; pp. 150-155.

Hongbo, Wang.; de Boer, G.; Junwai, K.; Alazmani, A.; Ghajari, M.; Hewson, R.; Culmer, P., Design Methodology for Magnetic Field-Based Soft Tri-Axis Tactile Sensors. Sensors (14248220) 2016, 16 (9), 1356.

Jamone, L.; Metta, G.; Nori, F.; Sandini, G. In James: A Humanoid Robot Acting over an Unstructured World, 2006 6th IEEE-RAS International Conference on Humanoid Robots, Dec. 4-6, 2006; 2006; pp. 143-150.

Kou, H.; Zhang, L.; Tan, Q.; Liu, G.; Dong, H.; Zhang, W.; Xiong, J., Wireless wide-range pressure sensor based on graphene/PDMS sponge for tactile monitoring. Scientific Reports 2019, 9 (1), 3916.

Alex, Chortos.; Jia, L.; Zhenan, B., Pursuing prosthetic electronic skin. Nature Materials 2016, 15 (9).

Ho-Hsiu, Chou.; Amanda, N.; Alex, C.; John, W. F. T.; Chien, L.; Jianguo, M.; Tadanori, K.; Won-Gyu, B.; Jeffrey, B. H. T.; Zhenan, B., A chameleon-inspired stretchable electronic skin with interactive colour changing controlled by tactile sensing. Nature Communications 2015, 6 (1).

Wang, X.; Gu, Y.; Xiong, Z.; Cui, Z.; Zhang, T., Silk-Molded Flexible, Ultrasensitive, and Highly Stable Electronic Skin for Monitoring Human Physiological Signals. Advanced Materials 2014, 26 (9), 1336-1342.

Ho, D. H.; Sun, Q.; Kim, S. Y.; Han, J. T.; Kim, D. H.; Cho, J. H., Stretchable and Multimodal All Graphene Electronic Skin. Advanced Materials 2016, 28 (13), 2601-2608.

Donghee, Son.; et al., Multifunctional wearable devices for diagnosis and therapy of movement disorders. Nature Nanotechnology 2014, 9 (5), 397.

Patel, M. S.; Asch, D. A.; Volpp, K. G., Wearable Devices as Facilitators, Not Drivers, of Health Behavior Change. JAMA 2015, 313 (5).

Haghi, M.; Thurow, K.; Stoll, R., Wearable Devices in Medical Internet of Things: Scientific Research and Commercially Available Devices. Healthcare informatics research 2017, 23 (1), 4-15.

Kappassov, Z.; Corrales, J.-A.; Perdereau, V., Tactile sensing in dexterous robot hands—Review. Robotics and Autonomous Systems 2015, 74, 195-220.

Kyberd, P. J.; Chappell, P. H., A force sensor for automatic manipulation based on the Hall effect. Measurement Science and Technology 1993, 4 (3), 281-287.

Low, J. H.; Khin, P. M.; Yeow, C. H. In a pressure-redistributing insole using soft sensors and actuators, 2015 IEEE International Conference on Robotics and Automation (ICRA), May 26-30, 2015; 2015; pp. 2926-2930.

Mengüç, Y.; Park, Y.; Martinez-Villalpando, E.; Aubin, P.; Zisook, M.; Stirling, L.; Wood, R. J.; Walsh, C. J. In Soft wearable motion sensing suit for lower limb biomechanics measurements, 2013 IEEE International Conference on Robotics and Automation, May 6-10, 2013; 2013; pp. 5309-5316.

Chathuranga, D. S.; Wang, Z.; Noh, Y.; Nanayakkara, T.; Hirai, S. In Disposable soft 3 axis force sensor for biomedical applications, 2015 37th Annual International Conference of the IEEE Engineering in Medicine and Biology Society (EMBC), Aug. 25-29, 2015; 2015; pp. 5521-5524.

Hallali, N.; Clerc, P.; Fourmy, D.; Gigoux, V.; Carrey, J., Influence on cell death of high frequency motion of magnetic nanoparticles during magnetic hyperthermia experiments. Applied Physics Letters 2016, 109 (3), 032402.

Lee, J.-J.; Jeong, K. J.; Hashimoto, M.; Kwon, A. H.; Rwei, A.; Shankarappa, S. A.; Tsui, J. H.; Kohane, D. S., Synthetic Ligand-Coated Magnetic Nanoparticles for Microfluidic Bacterial Separation from Blood. Nano Letters 2014, 14 (1), 1-5.

Liu, L.; Yu, P.; Zhang, Y.; Wu, B.; Cui, C.; Wu, M.; Wang, C.-X.; Zhuo, R.-X.; Huang, S.-W., Doxorubicin-conjugated magnetic iron oxide nanoparticles for pH-sensitive and magnetic responsive drug delivery. Journal of Controlled Release 2015, 213, e67-e67.

Frey, N. A.; Peng, S.; Cheng, K.; Sun, S., Magnetic nanoparticles: synthesis, functionalization, and applications in bioimaging and magnetic energy storage. Chemical Society Reviews 2009, 38 (9), 2532-2542.

(56) References Cited

OTHER PUBLICATIONS

Jedlovszky-Hajdú, A.; Tombácz, E.; Bányai, I.; Babos, M.; Palkó, A., Carboxylated magnetic nanoparticles as MRI contrast agents: Relaxation measurements at different field strengths. Journal of Magnetism and Magnetic Materials 2012, 324 (19), 3173-3180.

Schwartz, G.; Tee, B. C. K.; Mei, J.; Appleton, A. L.; Kim, D. H.; Wang, H.; Bao, Z., Flexible polymer transistors with high pressure sensitivity for application in electronic skin and health monitoring. Nature Communications 2013, 4 (1), 1859.

Puangmali, P.; Liu, H.; Seneviratne, L. D.; Dasgupta, P.; Althoefer, K., Miniature 3-Axis Distal Force Sensor for Minimally Invasive Surgical Palpation. IEEE/ASME Transactions on Mechatronics 2012, 17 (4), 646-656.

Chatzipirpiridis, G.; Erne, P.; Ergeneman, O.; Pané, S.; Nelson, B. J. In a magnetic force sensor on a catheter tip for minimally invasive surgery, 2015 37th Annual International Conference of the IEEE Engineering in Medicine and Biology Society (EMBC), Aug. 25-29, 2015; 2015; pp. 7970-7973.

Paxton, N.; Smolan, W.; Böck, T.; Melchels, F.; Groll, J.; Jungst, T., Proposal to assess printability of bioinks for extrusion-based bioprinting and evaluation of rheological properties governing bioprintability. Biofabrication 2017, 9 (4), 044107.

Chen, D. T. N.; Wen, Q.; Janmey, P. A.; Crocker, J. C.; Yodh, A. G., Rheology of Soft Materials. Annual Review of Condensed Matter Physics 2010, 1 (1), 301-322.

Gul, J. Z.; Sajid, M.; Rehman, M. M.; Siddiqui, G. U.; Shah, I.; Kim, K.-H.; Lee, J.-W.; Choi, K. H., 3D printing for soft robotics—a review. Sci Technol Adv Mater 2018, 19 (1), 243-262.

Kim, Y.; Yuk, H.; Zhao, R.; Chester, S. A.; Zhao, X., Printing ferromagnetic domains for untethered fast-transforming soft materials. Nature 2018, 558 (7709), 274-279.

Schmid, H.; Michel, B., Siloxane Polymers for High-Resolution, High-Accuracy Soft Lithography. Macromolecules 2000, 33 (8), 3042-3049.

Wang, Z.; Volinsky, A. A.; Gallant, N. D., Crosslinking effect on polydimethylsiloxane elastic modulus measured by custom-built compression instrument. Journal of Applied Polymer Science 2014, 131 (22).

Bentley, A. K.; Farhoud, M.; Ellis, A. B.; Nickel, A.-M. L.; Lisensky, G. C.; Crone, W. C., Template Synthesis and Magnetic Manipulation of Nickel Nanowires. Journal of Chemical Education 2005, 82 (5), 765.

Bloomfield, V. A.; Dewan, R. K., Viscosity of liquid mixtures. The Journal of Physical Chemistry 1971, 75 (20), 3113-3119.

Komar, P. D., Settling Velocities of Circular Cylinders at Low Reynolds Numbers. The Journal of Geology 1980, 88 (3), 327-336.

Li, L.; Lin, Q.; Tang, M.; Duncan, A. J. E.; Ke, C., Advanced Polymer Designs for Direct-Ink-Write 3D Printing. Chemistry—A European Journal 2019, 25 (46), 10768-10781.

Hölzl, K.; Lin, S.; Tytgat, L.; Van Vlierberghe, S.; Gu, L.; Ovsianikov, A., Bioink properties before, during and after 3D bioprinting. Biofabrication 2016, 8 (3), 032002.

Lewis, J. A., Direct Ink Writing of 3D Functional Materials. Advanced Functional Materials 2006, 16 (17), 2193-2204.

\* cited by examiner (a) 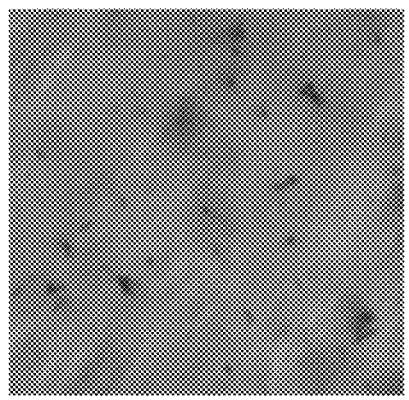 (b) 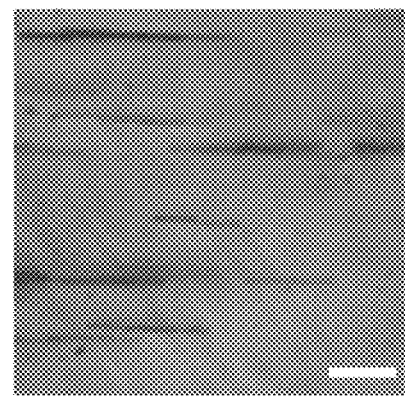
FIGURES 6A-6B
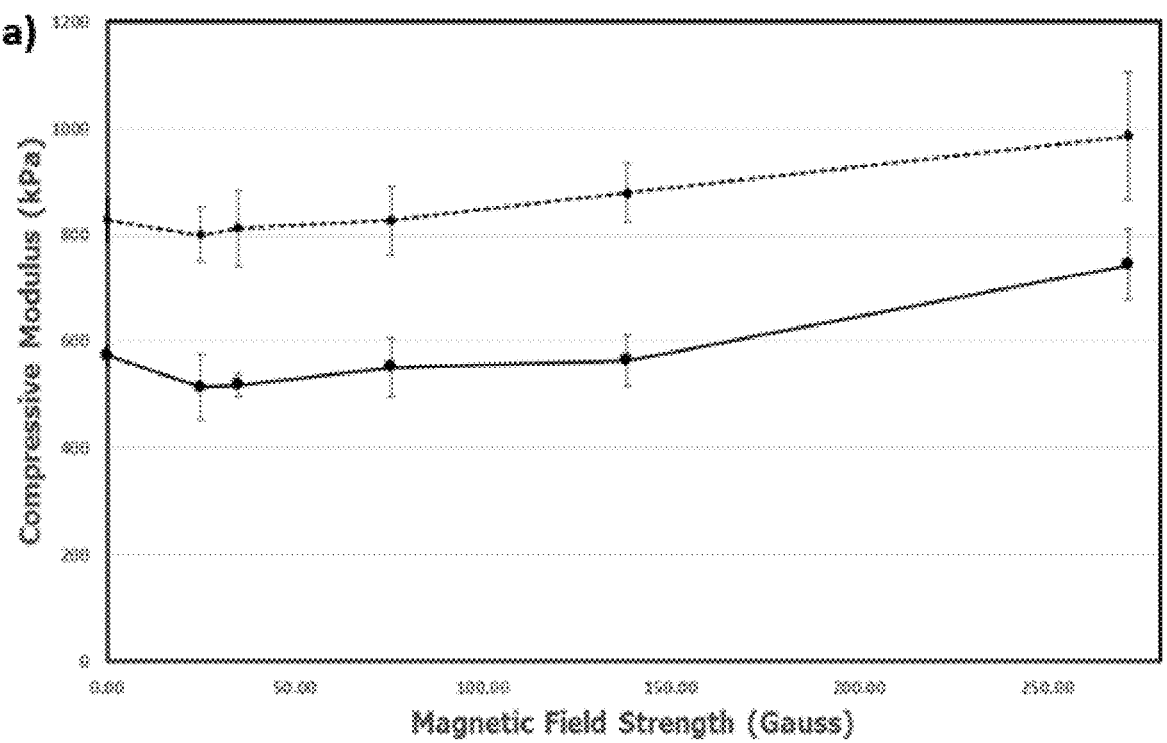
FIGURE 7A

FUNCTIONAL SOFT MATERIALS AND METHODS OF MAKING AND USING THEREOF

CROSS-REFERENCE TO RELATED APPLICATIONS

This application claims the benefit of priority to 62/858,946 filed Jun. 7, 2019, the disclosure of which is incorporated herein by reference in its entirety.

STATEMENT REGARDING FEDERALLY SPONSORED RESEARCH OR DEVELOPMENT

This invention was made with government support under DE-NA0002839 awarded by the Department of Energy. The government has certain rights in the invention.

BACKGROUND

Soft materials are often composed of polymers or other flexible structural components. Fillers or other materials are commonly added to the soft material to facilitate processing (e.g., additive manufacturing) and/or to achieve desirable properties of the final product. For example, silicone polymers can be printed in 3D when silica fillers are included at sufficient concentration to provide structural fidelity to the printed material. This step is often followed by curing to yield a robust product.

Soft materials have a wide range of commercial uses, including applications in consumer products and as devices in the healthcare industry. However, next generation materials would benefit from the ability to remotely sense changes in soft materials. Remote or 'wireless' sensing would allow monitoring of the device performance and fidelity, for example. In addition, a means to remotely control the mechanical properties of soft materials would also prove beneficial. Remotely controlling to stiffen or soften as needed for a particular situation would enable new applications.

SUMMARY

Remote sensing and/or remote control of soft materials can be achieved by incorporating an additive that can be detected and/or influenced by an external force. A variety of detectable/controllable phenomena (e.g., thermal, optical, electric, acoustic, and magnetic fields) can be utilized. For example, the inclusion of graphene can improve the conductivity of soft materials and changes in the material structure can be detected as a change in the resistance of the material.

While many of these approaches require wired connections, magnetic fields offer a unique opportunity for wireless detection and/or control of soft materials. For example, ferromagnetic nanoparticles can be suspended in a precursor polymer and 3D printed to develop high fidelity structures. Change in the magnetic field of the nanoparticles caused by deformation of the soft material can be detected by sensors such as a Hall Effect sensor (e.g., a magnetometer). In addition, an external magnetic field can be applied to stiffen or soften the material, for example. If desired, a magnetometer and electromagnet can both be interfaced with the soft material. Such a system can be operated in a closed-loop fashion, such that forces acting on the soft material can be measured in real time, and an external magnetic field can be applied in response to alter the mechanical properties of the soft material in response. The compositions described herein can be used to help predict possible injuries from repeated stress and strain within people and potentially professional athletes. In some embodiments, the composition can be integrated within a shoe sole/insole for diagnosing and monitoring in patients with an increased risk or undergoing treatment for neuropathy.

DESCRIPTION OF DRAWINGS

FIGS. 2A-2B show TEM images of nanorods. FIG. 2C shows the elemental composition of nanorods ascertained from energy dispersive x-ray spectroscopy (EDX). FIGS. 2D-2H show dark-field STEM image with corresponding element maps of nanorods.

FIGS. 6A-6B show bright field microscopy images (20× objective) of cryo-sectioned SYLGARD 184 PDMS-nanorod composites with vertically (FIG. 6A) and horizontally (FIG. 6B) oriented nanorods. Scale bar=5 µm.

FIGS. 7A-7B show the compressive moduli of SYLGARD 184 PDMS structures containing 1% by weight vertically aligned nickel nanorods of various lengths (small=1-4 µm; large=8-12 µm) (FIG. 7A) and 1% by weight vertically and horizontally aligned large nickel nanorods (FIG. 7B) exposed to an electromagnetic field in increasing intervals up to 272 Gauss.

DETAILED DESCRIPTION

General Definitions

Figure 1:
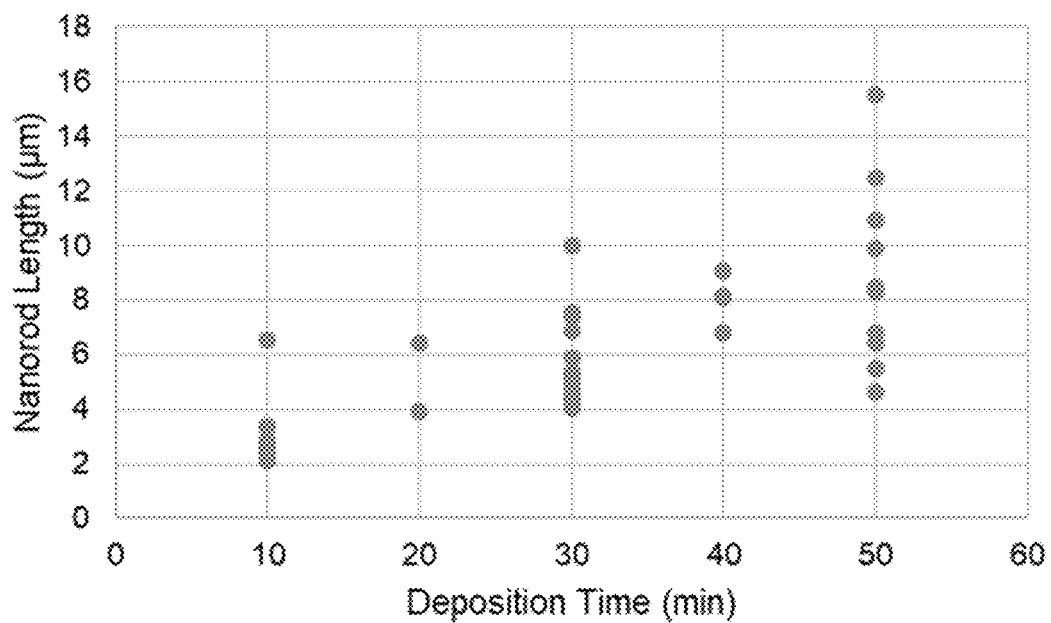
FIG. 1 is a plot showing the average nickel nanorod length (n=50) as a function of electrochemical deposition time.
Figures 2A, 2B, 2C, 2D, 2E, 2F, 2G, 2H:
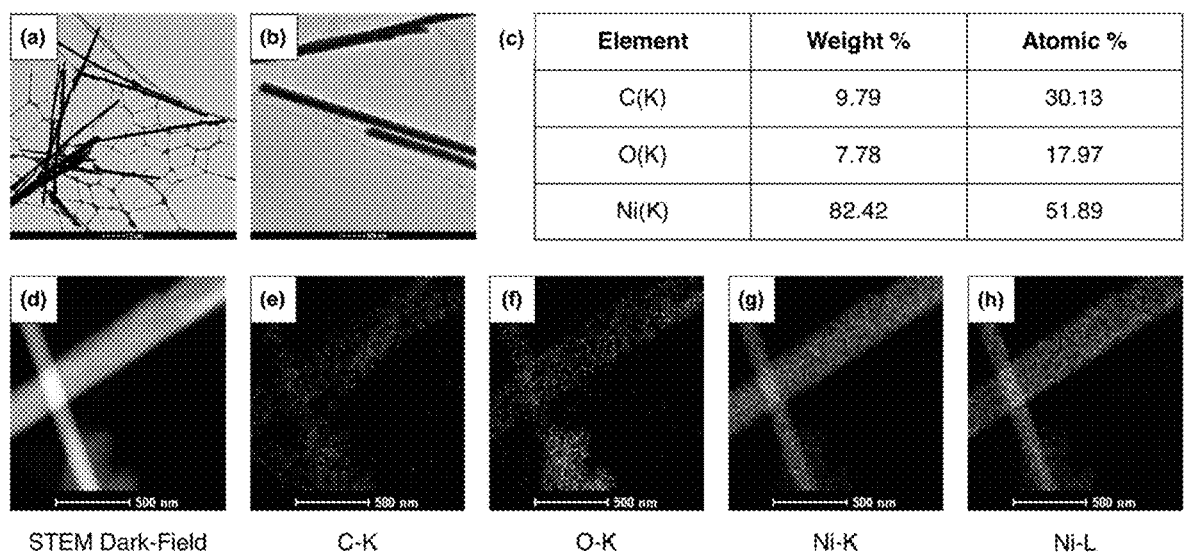
FIGS. 2A-2H so the characterization of electrodeposited nanorods.

Unless defined otherwise, all technical and scientific terms used herein have the same meaning as commonly understood to one of ordinary skill in the art to which this disclosure belongs.

Ranges can be expressed herein as from "about" one particular value, and/or to "about" another particular value. By "about" is meant within 10% of the value, e.g., within 9, 8, 8, 7, 6, 5, 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

The term "comprising" and variations thereof as used herein is used synonymously with the term "including" and variations thereof and are open, non-limiting terms.

Although the terms "comprising" and "including" have been used herein to describe various embodiments, the terms "consisting essentially of" and "consisting of" can be used in place of "comprising" and "including" to provide for more specific embodiments and are also disclosed. Throughout the description and claims of this specification the word "comprise" and other forms of the word, such as "comprising" and "comprises," means including but not limited to, and is not intended to exclude, for example, other additives, components, integers, or steps.

As used in the specification and claims, the singular form "a", "an", and "the" include plural references unless the context clearly dictates otherwise. For example, the term "an agent" includes a plurality of agents, including mixtures thereof.

As used herein, the terms "may," "optionally," and "may optionally" are used interchangeably and are meant to include cases in which the condition occurs as well as cases in which the condition does not occur. Thus, for example, the statement that a formulation "may include an excipient" is meant to include cases in which the formulation includes an excipient as well as cases in which the formulation does not include an excipient.

A "decrease" can refer to any change that results in a smaller amount of a symptom, disease, composition, condition, or activity. A substance is also understood to decrease the genetic output of a gene when the genetic output of the gene product with the substance is less relative to the output of the gene product without the substance. Also, for example, a decrease can be a change in the symptoms of a disorder such that the symptoms are less than previously observed. A decrease can be any individual, median, or average decrease in a condition, symptom, activity, composition in a statistically significant amount. Thus, the decrease can be a 1, 2, 3, 4, 5, 6, 7, 8, 9, 10, 15, 20, 25, 30, 35, 40, 45, 50, 55, 60, 65, 70, 75, 80, 85, 90, 95, or 100% decrease so long as the decrease is statistically significant.

"Inhibit," "inhibiting," and "inhibition" mean to decrease an activity, response, condition, disease, or other biological parameter. This can include but is not limited to the complete ablation of the activity, response, condition, or disease. This may also include, for example, a 10% reduction in the activity, response, condition, or disease as compared to the native or control level. Thus, the reduction can be a 10, 20, 30, 40, 50, 60, 70, 80, 90, 100%, or any amount of reduction in between as compared to native or control levels.

By "reduce" or other forms of the word, such as "reducing" or "reduction," is meant lowering of an event or characteristic (e.g., tumor growth). It is understood that this is typically in relation to some standard or expected value, in other words it is relative, but that it is not always necessary for the standard or relative value to be referred to. For example, "reduces tumor growth" means reducing the rate of growth of a tumor relative to a standard or a control.

As used herein, the terms "treating" or "treatment" of a subject includes the administration of a drug to a subject with the purpose of preventing, curing, healing, alleviating, relieving, altering, remedying, ameliorating, improving, stabilizing or affecting a disease or disorder, or a symptom of a disease or disorder. The terms "treating" and "treatment" can also refer to reduction in severity and/or frequency of symptoms, elimination of symptoms and/or underlying cause, prevention of the occurrence of symptoms and/or their underlying cause, and improvement or remediation of damage.

By "prevent" or other forms of the word, such as "preventing" or "prevention," is meant to stop a particular event or characteristic, to stabilize or delay the development or progression of a particular event or characteristic, or to minimize the chances that a particular event or characteristic will occur. Prevent does not require comparison to a control as it is typically more absolute than, for example, reduce. As used herein, something could be reduced but not prevented, but something that is reduced could also be prevented. Likewise, something could be prevented but not reduced, but something that is prevented could also be reduced. It is understood that where reduce or prevent are used, unless specifically indicated otherwise, the use of the other word is also expressly disclosed. For example, the terms "prevent" or "suppress" can refer to a treatment that forestalls or slows the onset of a disease or condition or reduced the severity of the disease or condition. Thus, if a treatment can treat a disease in a subject having symptoms of the disease, it can also prevent or suppress that disease in a subject who has yet to suffer some or all of the symptoms. As used herein, the term "preventing" a disorder or unwanted physiological event in a subject refers specifically to the prevention of the occurrence of symptoms and/or their underlying cause, wherein the subject may or may not exhibit heightened susceptibility to the disorder or event.

A "control" is an alternative subject or sample used in an experiment for comparison purposes. A control can be "positive" or "negative."

As used herein, by a "subject" is meant an individual. Thus, the "subject" can include domesticated animals (e.g., cats, dogs, etc.), livestock (e.g., cattle, horses, pigs, sheep, goats, etc.), laboratory animals (e.g., mouse, rabbit, rat, guinea pig, etc.), and birds. "Subject" can also include a mammal, such as a primate or a human. Thus, the subject can be a human or veterinary patient. The term "patient" refers to a subject under the treatment of a clinician, e.g., physician.

Composition

Disclosed herein are compositions that comprise an elastomeric resin; and a population of anisotropic magnetic particles dispersed within the elastomeric resin.

Anisotropic Magnetic Particles

In some embodiments, the anisotropic magnetic particles can comprise nanoparticles. The term "nanoparticle," as used herein, generally refers to a particle of any shape having one or more dimensions ranging from 1 nm up to, but not including, 1 micron. In some embodiments, the nanoparticles can comprise a particle of any shape having one or more dimensions ranging from 1 nm up to, but not including, 1 micron; and one or more dimensions of 1 micron or more (e.g., from 1 micron to 10 microns, from 1 micron to 20 microns, from 1 micron to 25 microns, or from 1 micron to 50 microns).

In other embodiments, the anisotropic magnetic particles can comprise microparticles. The microparticles can be of any shape, and have one or more dimensions ranging from 1 micron to 100 microns. In some embodiments, all dimensions can range from 1 micron to 100 microns.

In some embodiments, the population of anisotropic magnetic particles is a monodisperse population of anisotropic magnetic particles. In other embodiments, the population of anisotropic magnetic particles is a polydisperse population of anisotropic magnetic particles. In some instances where the population of anisotropic magnetic particles is monodisperse, greater that 50% of the particle size distribution, more preferably 60% of the particle size distribution, most preferably 75% of the particle size distribution lies within 10% of the median particle size.

The anisotropic magnetic particles can comprise any suitable magnetic material, such as ferromagnetic alloys comprising Fe, Co, Ni, or combinations thereof. In certain embodiments, the anisotropic magnetic particles can comprise Ni particles. Such particles can be formed using methods known in the art, including synthesis driven by appropriate shaping ligands, template-assisted synthesis, template-assisted electrodeposition, and magnetically directed assembly. Examples of such materials are described, for example, in Lisjak et al. "Anisotropic Magnetic Nanoparticles: A Review of their Properties, Synthesis, and Potential Applications," *Progress in Materials Science*, 2018, 95; 286-328 (which is hereby incorporated by reference in its entirety for its description of anisotropic magnetic particles, and which is attached to this filing).

The anisotropic magnetic particles can be essentially homogeneous throughout, meaning that the composition does not vary throughout the particle cross-section (from the particle surface to the particle center). Alternatively, the anisotropic magnetic particles can possess a non-homogeneous structure. For example, the particles may possess a core-shell structure, or a multilayer structure (e.g., a magnetic core coated by a non-magnetic shell material).

Figure 9:
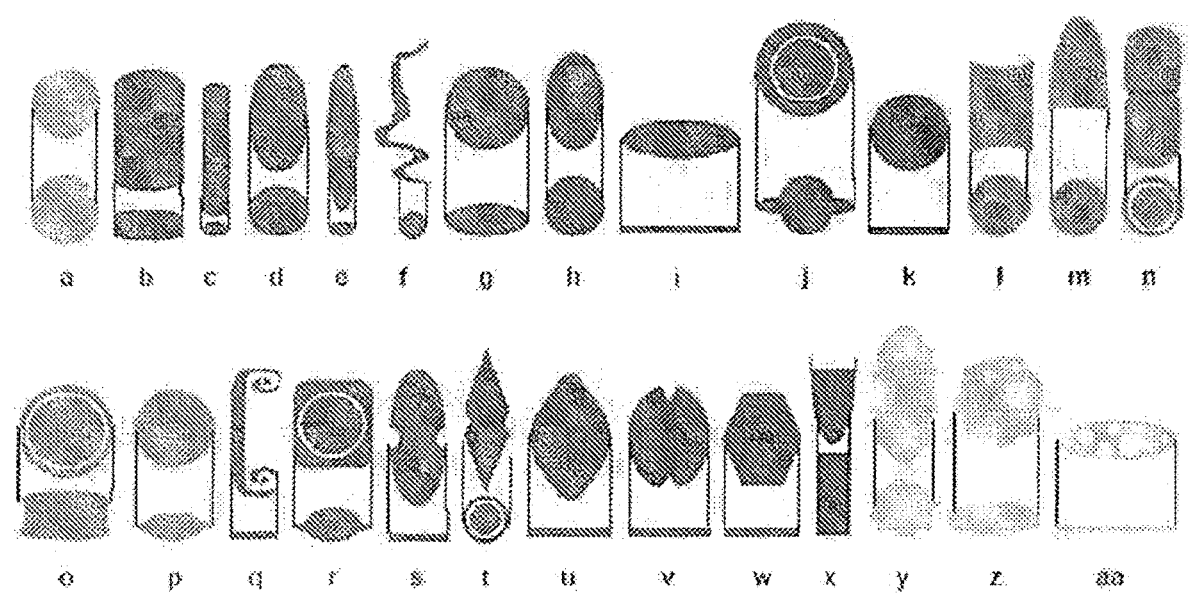
FIG. 9 illustrates the 3-dimensional shape of various classes of particles: (a) spheres, (b) rectangular disks, (c) high aspect ratio rectangular disks, (d) rods, (e) high aspect ratio rods, (f) worms, (g) oblate ellipses (h) prolate ellipses, (i) elliptical disks, (j) UFOs, (k) circular disks, (l) barrels, (m) bullets, (n) pills, (o) pulleys, (p) bi-convex lenses, (q) ribbons, (r) ravioli, (s) flat pills, (t) bicones, (u) diamond disks, (v) emarginate disks, (w) elongated hexagonal disks, (x) tacos, (y) wrinkled prolate ellipsoids, (z) wrinkled oblate ellipsoids and (aa) porous elliptical disks.

The anisotropic magnetic particles may have any desired shape. In certain embodiments, the particles can have a non-spherical shape. As generally used herein, "non-spherical" is used to describe particles having at least one dimension differing from another dimension by a ratio of at least 1:1.10. In one embodiment, the non-spherical particles have at least one dimension which differs from another dimension by a ratio of at least 1:1.25. A wide variety of shapes are considered "non-spherical" shapes. For example, as shown in FIG. 9, non-spherical particles may be in the shape of rectangular disks, high aspect ratio rectangular disks, rods, high aspect ratio rods, worms, oblate ellipses, prolate ellipses, elliptical disks, UFOs, circular disks, barrels, bullets, pills, pulleys, bi-convex lenses, ribbons, ravioli, flat pill, bicones, diamond disks, emarginated disks, elongated hexagonal disks, tacos, wrinkled prolate ellipsoids, wrinkled oblate ellipsoids, or porous elliptical disks. Additional shapes beyond those illustrated in the figures are also within the scope of the definition for "non-spherical" shapes.

In some embodiments, the anisotropic magnetic particles can comprise rod-shaped particles. "Rod-shaped," as used herein, refers to a particle which has an elongated spherical or cylindrical shape (e.g., the shape of a pill) or a flattened rod-shape, such as the shape of a green bean. Rod-shaped particles have an aspect ratio of at least 1.25 (e.g., at least 1.5, at least 2, at least 2.5, or at least 5). "Aspect ratio," as used herein, refers to the length divided by the diameter of a particle.

In certain embodiments, the particles can be rod-shaped. In some embodiments, the rod-shaped particles can have an aspect ratio, defined as the length of the rod-shaped particle divided by the diameter of the rod-shaped particle, of at least 1.25 (e.g., at least 2.5, at least 5, at least 10, at least 15, at least 25, at least 50, at least 100, at least 150, at least 200, at least 250, or more). In some embodiments, the rod-shaped particles can have an aspect ratio, defined as the length of the rod-shaped particle divided by the diameter of the rod-shaped particle, of 500 or less (e.g., 250 or less, 200 or less, 150 or less, 100 or less, 50 or less, 25 or less, 15 or less, 10 or less, 5 or less, or 2.5 or less).

The rod-shaped particles can have an aspect ratio ranging from any of the minimum values described above to any of the maximum values described above. In certain embodiments, the rod-shaped particles can have an aspect ratio of from 1.25 to 500 (e.g., from 5 to 500, from 5 to 250, from 5 to 100, from 5 to 500, from 5 to 250, or from 5 to 100).

In some embodiments, the rod-shaped particles can have an average diameter of at least 5 nm (e.g., at least 25 nm, at least 50 nm, at least 100 nm, at least 200 nm, at least 300 nm, at least 400 nm, at least 500, at least 600 nm, at least 700 nm, at least 800 nm, or at least 900 nm). In some embodiments, the rod-shaped particles can have an average diameter of 950 nm or less (e.g., 900 nm or less, 800 nm or less, 700 nm or less, 600 nm or less, 500 nm or less, 400 nm or less, 300 nm or less, 200 nm or less, 100 nm or less, 50 nm or less, or 25 nm or less.

The rod-shaped particles can have an average diameter ranging from any of the minimum values described above to any of the maximum values described above. In certain embodiments, the rod-shaped particles can have an average diameter of from 50 nm to 800 nm (e.g., from 50 nm to 500 nm, or from 100 nm to 300 nm).

In some embodiments, the rod-shaped particles can have an average length of at least 500 nm (e.g., at least 1 micron, at least 5 microns, at least 10 microns, at least 15 microns, at least 20 microns, at least 25 microns, at least 50 microns, at least 75 microns, at least 100 microns, at least 150 microns, or at least 200 microns). In some embodiments, the rod-shaped particles can have an average length of 250 microns or less (e.g., 200 microns or less, 150 microns or less, 100 microns or less, 75 microns or less, 50 microns or less, 25 microns or less, 20 microns or less, 15 microns or less, 10 microns or less, 5 microns or less, or 1 micron or less).

The rod-shaped particles can have an average length ranging from any of the minimum values described above to any of the maximum values described above. In certain embodiments, the rod-shaped particles can have an average length of from 500 nm to 100 microns (e.g., from 1 micron to 25 microns).

The anisotropic magnetic particles can be present in the composition in an amount of from 0.1% by weight to 10% by weight (e.g., from 0.1% by weight to 5% by weight, from 0.1% by weight to 2.5% by weight, from 0.1% by weight to 2% by weight, from 0.1% by weight to 1.5% by weight, or from 0.1% by weight to 1% by weight), based on the total weight of the composition.

The anisotropic magnetic particles can be present in the composition in an amount of from 0.01% by volume to 2.0% by volume (e.g., from 0.01% by volume to 1.5% by volume, from 0.01% by volume to 1.0% by volume, from 0.01% by volume to 0.75% by volume, from 0.01% by volume to 0.5% by volume, from 0.01% by volume to 0.2% by volume, or from 0.01% by volume to 0.15% by volume), based on the total volume of the composition.

In some embodiments, the magnetic particles can be uniformly dispersed throughout the elastomeric resin. In other embodiments, the magnetic particles can by non-homogenously dispersed throughout the elastomeric resin. For example, the magnetic particles can be at varying concentrations throughout the elastomeric resin (e.g., at a higher concentration at a region in proximity to a magnetometer and at a lower concentration at a region further away from a magnetometer). In some embodiments, a gradient of magnetic particles can be dispersed within the elastomeric resin.

Elastomeric Resin

The elastomeric resin can comprise an elastomeric resin suitable for use in an additive manufacturing process. Such materials are well known in the art. In some examples, the elastomeric resin can comprise a thermoplastic polymer such as acrylonitrile butadiene styrene (ABS), polyphenylene sulfide (PPS), polyphenylsulfone (PPSU), polyetheretherketone (PEEK), polyurethane (PU), polyetherimide (PEI), polyphenylene ether (PPE), polycarbonate (PC), and combinations thereof. In some embodiments, the elastomeric resin can comprise a crosslinkable composition (e.g., a blend of monomers, oligomers, and/or polymers which can be crosslinked during the additive manufacturing process). Depending on the additive manufacturing process employed, the crosslinkable composition can be selected such that crosslinking can be induced thermally and/or by impinging electromagnetic radiation (e.g., UV and/or visible light). In certain embodiments, the elastomeric resin can comprise a crosslinkable silicone composition. For example, the elastomeric resin can comprise (A) a first organosilicon compound having at least two ethylenically unsaturated moieties per molecule; and optionally (B) one or more additional organosilicon compounds. Suitable silicone compositions are known in the art. See, for example, U.S. Pat. No. 10,155,884 to Dow Silicones Corp., U.S. Patent Application Publication No. 2017/0312981 to Wacker Chemie AG, U.S. Patent Application Publication No. 2018/0370141 to Wacker Chemie AG, U.S. Patent Application Publication No. 2018/0066115 to Wacker Chemie AG, U.S. Patent Application Publication No. 2018/0186076 to Dow Corning Corp., and U.S. Patent Application Publication No. 2019/0100626 to Lawrence Livermore National Security LLC, each of which is hereby incorporated by reference in its entirety. Other suitable elastomeric resins are described, for example, in U.S. Patent Application Publication No. 20160319150 to Cornell University.

Optionally, the composition may further optionally a non-magnetic filler. The non-magnetic filler may be, for example, an organic filler, an inorganic filler, a ceramic powder, or combinations thereof. The organic filler may be a polymer, such as, but not limited to, polystyrene, polyethylene, polypropylene, polysulfone, polyamide, polyimide, polyetheretherketone, etc. The organic filler can also be a smaller molecule either amorphous or crystalline in nature, and can be of in various shapes and sizes. The inorganic filler or ceramic powder can be any inorganic compounds that are compatible with the curing chemistry. Examples include, but are not limited to, silicon dioxide, titanium dioxide, zirconium dioxide, barium titanate, strontium titanate, etc. A mixture of more than one inorganic or organic with inorganic fillers are also suitable.

In embodiments including the non-magnetic filler, the non-magnetic filler can be present as any suitable wt. % of the composition, such as about 0.01 wt. % to about 90 wt. %, about 1 wt. % to about 80 wt. %, about 5 wt. % to about 80 wt. %, about 10 wt. % to about 80 wt. %, about 15 wt. % to about 80 wt. %, about 25 wt. % to about 80 wt. %, about 30 wt. % to about 80 wt. %, about 40 wt. % to about 80 wt. %, about 50 wt. % to about 75 wt. %, about 55 wt. % to about 75 wt. %, about 60 wt. % to about 70 wt. %, alternatively about 0.1 wt. %, 1, 2, 3, 4, 5, 6, 7, 8, 9, 10, 11, 12, 13, 14, 15, 16, 18, 20, 25, 30, 35, 40, 45, 50, 55, 60, 65, or about 70 wt. % or more.

The non-magnetic filler can have any suitable particle size, e.g., the longest dimension of the particle, such as the average longest dimension. For example, the non-magnetic filler can have a primary particle size of about 5 to about 100, about 10 to about 90, about 20 to about 80, about 30 to about 70, about 40 to about 60, or about 50, microns, alternatively 5 microns or less, alternatively 100 microns or more. As used herein, "primary" particle size refers to the actual particles in their un-conglomerated state, which can optionally conglomerate to form larger "secondary" particles.

Any of the compositions may optionally and independently further comprise additional ingredients or components ("additives"). Examples of additional ingredients include, but are not limited to, adhesion promoters; dyes; pigments; anti-oxidants; initiators for crosslinking; carrier vehicles; heat stabilizers; flame retardants; thixotropic agents; flow control additives; inhibitors; extending and reinforcing fillers; and cross-linking agents. One or more of the additives can be present as any suitable wt. % of the composition, such as about 0.1 wt. % to about 15 wt. %, about 0.5 wt. % to about 5 wt. %, or about 0.1 wt. % or less, about 1 wt. %, 2, 3, 4, 5, 6, 7, 8, 9, 10, 11, 12, 13, 14, or about 15 wt. % or more of the composition.

Methods of Use

In some embodiments, the compositions described herein can be used to form cushions that can be used in areas prone to pressure ulcer development. The cushions can be used in shoes soles/insoles, casts, pads that can be adhered to the bottom of an amputation stump, gloves, mitts, or clothing or mats to detect when a patient is at risk of developing buttock, sacral, ischial, scapular, or scalp ulceration.

In some embodiments, the compositions described herein can be used to form shoe soles/insoles. The magnetic field strength can then be detected by a sensor such as wireless triple axis accelerometer and magnetometer. The sensors can be embedded in a custom- or generic-made insole. In some embodiments, the sensor(s) can be incorporated into the shoe soles/insoles. In some other embodiments, the sensor(s) can be placed near the shoe soles/insoles (i.e., the tongue of the shoe) as to not break the sensor due to repeated compression of the shoe soles/insoles.

In some embodiments, additional sensors can be present in the such as temperature, moisture, blood flow and blood glucose sensors.

The shoe soles/insoles can detect the displacement and force of the person walking based on the magnetic field strength generated from the magnetic particles. In some embodiments, the shoe soles/insoles can be used to help predict possible injuries from repeated stress and strain within people and potentially professional athletes.

In some embodiments, the composition can be integrated throughout the cushioning of the shoe for measuring impact and shear forces at five different areas of the foot. In some embodiments, the shoe sole can include two sensors located under the toes, two sensors under the footpads and a sensor beneath the heel. In some embodiments, the sensor(s) are Hall Effect sensors connected to a microcontroller (e.g., Arduino) and can wirelessly transfer the data in real-time to a mobile device. The data can then be used by the medical provider and the user to suggest changes in activity for treatment, prevention and diagnosis of foot ulcers (e.g., diabetic foot ulcers).

In some other embodiments, the composition can have the ability to reconnect soft tissue offering important clinical benefits for patients with soft tissue disorders. Self-healing hydrogels with pressure sensitivity and stretchability.

The composition is suitable for use in a conventional additive manufacturing process, such as fused deposition modeling (FDM), fused filament fabrication (FFF), fused pellet fabrication, fused particle fabrication, composite filament fabrication (CFF), direct ink writing (DIW), stereolithography (SLA), digital light processing, continuous liquid interface production, selective heat sintering, or selective laser sintering.

The compositions described herein can be used to form 3-dimensional article (e.g., cushions, sensors, or structural members). In some embodiments, the anisotropic magnetic particles are aligned and/or oriented within the article. The articles can be formed by any suitable manufacturing technique; however, in certain embodiments, the articles can be formed by an additive manufacturing process.

The articles can be interfaced with a magnetometer, such as a Hall Effect sensor, configured to interrogate the magnetic field strength within the article. By measuring the magnetic field, strength within the article, a force applied to the article can be calculated.

The articles can be interfaced with a magnet (e.g., an electromagnet) configured to apply a magnetic field within the article. By applying a magnetic field of varying strength, the mechanical properties of the article (e.g., the Young's modulus of the material) can be varied.

These effects can be anisotropic in nature.

Also provided are methods of forming 3-dimensional articles using the compositions described herein via additive manufacturing processes. For example, provided are methods of forming 3-dimensional articles using a 3D printer having an x-y-z gantry robot that comprise extruding a composition described herein via a nozzle operatively coupled to the x-y-z gantry robot to form an article having a predetermined shape with the extruded composition. Extrusion of the composition can align and/or orient the anisotropic magnetic particles within the formed article (e.g., by flow of the anisotropic particles through the nozzle).

Also provided are methods of forming 3-dimensional articles that comprise:

(i) applying a composition described herein by an independently controllable apparatus in an x, y work plane via at least one printing head, to an independently spatially controllable baseplate or to a shaped body affixed thereto;

(ii) allowing the composition to cure or solidify to form a layer of a cured or partially cured 3-dimensional article;

(iii) displacing the controllable apparatus and/or the shaped 3-dimensional article from step (ii) relative to each other in the z-direction far enough such that a next layer can be applied in the x, y work plane; and (iv) repeating steps (i)-(iii) until construction of the 3-dimensional article is complete.

In some embodiments, step (ii) can comprise inducing curing of the composition thermally and/or by UV or UV-VIS light.

Application of the composition can align and/or orient the anisotropic magnetic particles (e.g., by flow of the anisotropic particles through the printing head).

By way of non-limiting illustration, examples of certain embodiments of the present disclosure are given below.

EXAMPLES

Example 1: Magnetic Nanorod Fillers for Silicone Direct-Write Inks

Materials and Methods

Nanorods Synthesis and Characterization.

The nanorods were synthesized by electrodeposition of nickel into nanoporous alumina templates. Whatman™ Anodisc™ Filter Membranes of 0.02 μm pore size were obtained from Fisher Scientific (Hampton, N.H.); gallium-indium eutectic, nickel(II) chloride hexahydrate, nickel(II) sulfate hexahydrate and boric acid used in the electrolyte solution were obtained from Sigma Aldrich (St. Louis, Mo.); nickel wire of 1.0 mm diameter 99.5% metals basis was purchased from VWR (Radnor, Pa.). The deposition time was varied to produce nanorods of assorted lengths. Each nanorod batch (n=50) was imaged with a light microscope and the nanorod lengths were measured using ImageJ (small=1-4 μm; medium=4-8 μm; large=8-12 μm). Transmission electron microscopy (TEM) was used to measure the diameters of the synthesized rods to examine their nanoscale features. Energy dispersive x-ray spectroscopy (EDX) was employed to analyze the elemental composition and to obtain elemental maps of the nanorod samples.

Synthesis and Mechanical Testing of NuSil R40-2181-Nanorod Composites.

Nanorods of various size ranges (1-4 μm and 8-12 μm) were incorporated into NuSil R40-2181 (Nusil Technology LLC; Carpinteria, Calif.), and the viscoelastic properties of each formulation were quantified through continuous flow and oscillatory stress sweeps and recovery tests with an AR 2000 Rheometer (TA Instruments; New Castle, Del.). The continuous flow sweeps were performed at a shear rate of $0.02\ s^{-1}$, and an oscillatory stress from 1 to 10000 Pa was applied at 1 Hz for the stress sweeps. Rheological recovery tests were also performed by the cyclic application of 30 seconds of 4 kPa critical stress followed by 5 minutes of zero stress.

NuSil R40-2181 containing 1 wt % nickel nanorods with lengths of 1-4 μm, 4-8 μm and 8-12 μm were 3D printed with an EnvisionTEC Bioplotter (EnvisionTEC; Gladbeck, Germany). Printing parameters (e.g., pressure and plotting speed) were adjusted to yield strand diameters of approximately 0.5 mm. Lattice structures with heights of 4 mm were printed and cured at 160° C. for 4 hours. A 3 mm biopsy punch (Miltex GmbH; Rietheim-Weilheim, Germany) was used to form cylindrical samples for uniaxial compression tests. The average compressive elastic modulus (n=6) for each formulation was determined using an RSA III dynamic mechanical analyzer (TA Instruments; New Castle, Del.). The cylindrical samples were compressed with the dynamic mechanical analyzer (DMA) to 70% of their initial height at a rate of 0.005 mm/s, and the strain and normal stress were both measured. These values were used to calculate the compressive elastic modulus and reported as mean±standard deviation.

Synthesis and Mechanical Testing of PDMS-Nanorod Composites in Magnetic Field.

Nanorods of varying lengths (4-12 μm) were incorporated into Dow SYLGARD™ 184 Silicone Elastomer Clear (Dow Chemical Co.; Pevely, Mo.) at 1 wt % concentration and cured in flat bottom 96 well plates (Corning Incorporated; Corning, N.Y.) at 60° C. for 1 hour. To produce vertically-oriented PDMS-nanorod constructs, a cylindrical electromagnet was placed below the samples during curing and powered to provide a magnetic field at a strength of 15 gauss during the curing process. Similarly, horizontally-oriented PDMS-nanorod cylinders were prepared by applying a 15 gauss magnetic field with the electromagnet mounted perpendicularly to the samples during curing.

A cylindrical electromagnet (Uxcell, Hong Kong) was mounted onto the RSA III DMA and connected to a DC power supply. PDMS constructs with 1 wt % nanorods were mounted on top of the electromagnet and compressed at a controlled strain rate (0.005 mm/s). DMA testing was performed on each sample (n=3) with the electromagnet powered at 0, 1, 1.5, 3, 6, and 12 V. These studies were conducted on PDMS-nanorod constructs with either vertically-oriented nanorods or horizontally-oriented nanorods. The magnetic field strengths produced by the electromagnet at each corresponding voltage were measured with SS49E linear Hall effect sensors (Honeywell; Golden Valley, Minn.) controlled by an Arduino Mega 2560 microcontroller (Arduino; Somerville, Mass.). Compressive moduli (G') data obtained from DMA testing were plotted against magnetic field strength values.

Sectioning and Imaging of PDMS-Nanorod Cylinders.

PDMS constructs with horizontally-oriented and with vertically-oriented nanorods at a concentration of 1 wt % were suspended in optimal cutting temperature (OCT) compound (Scigen Scientific; Gardena, Calif.) and subsequently frozen at −80° C. overnight. A cryostat (Leica Biosystems; Wetzler, Germany) was used to cut cross sections of the PDMS-nanorod cylinders at a thickness of 50 μm. Cross sections of PDMS with horizontally-oriented and vertically-oriented nanorods were then imaged with a bright-field microscope with a 40× objective lens.

Remote Sensing of Compressive Forces Applied to PDMS-Nanorod Constructs.

An MLX90393 triple-axis magnetometer breakout board (SparkFun; Boulder, Colo.) was wired to an Arduino Mega 2560 microcontroller to communicate via I2C, and the magnetometer board was then mounted onto the bottom geometry platform of the RSA III DMA. PDMS-nanorod constructs with 1 wt % nanorods were subsequently placed above the magnetometer sensor, and the DMA was utilized to exert increasing increments (100-600 grams in 100 gram increments) of compressive force on the PDMS-nanorod constructs. Magnetic field strength data from all 3 axes were collected from the output of the Arduino IDE software while the samples were compressed by the DMA. PDMS-nanorod samples were compressed from 100-500 grams of force for 5 seconds each up to 500 grams of force and for 80 seconds at 600 grams of force. Magnetic field strength readings from the magnetometer were plotted against time. Remote sensing of compression events was successfully achieved; both duration and magnitude of compressive forces were detectable based on the change in magnetic field strength. Additionally, the aforementioned procedure was conducted with blank PDMS constructs without nanorods to confirm the validity of the results (i.e., lack of interfering external forces) and technique outlined above.

Statistical Analysis.

All results were presented as the mean±standard deviation (SD). Statistical analysis was performed by SAS® 9.4 Software using one-way analysis of variance (ANOVA) in conjunction with Tukey's HSD post-hoc test to compare between individual groups. Statistical significance was defined by p-values of *p<0.05, p<0.01, and *p<0.001.

Results

Nanorods Characterization.

The average nanorod length per batch (n=50) as a function of deposition time is shown in FIG. 1. Based on the TEM images that were obtained (FIGS. 2A-B), rods synthesized by the template-based method possessed consistent diameters on the nanoscale ranging from 130-300 nm. Elemental maps of the nanorod samples were obtained using energy dispersive X-ray spectroscopy (FIGS. 2C-2H). Elemental analysis confirmed that the nanorods were primarily composed of nickel elements (82.42% by weight), and that the nickel elements were evenly distributed throughout.

NuSil R40-2181-Nanorod Composites.

Figures 3A, 3B, 3C:
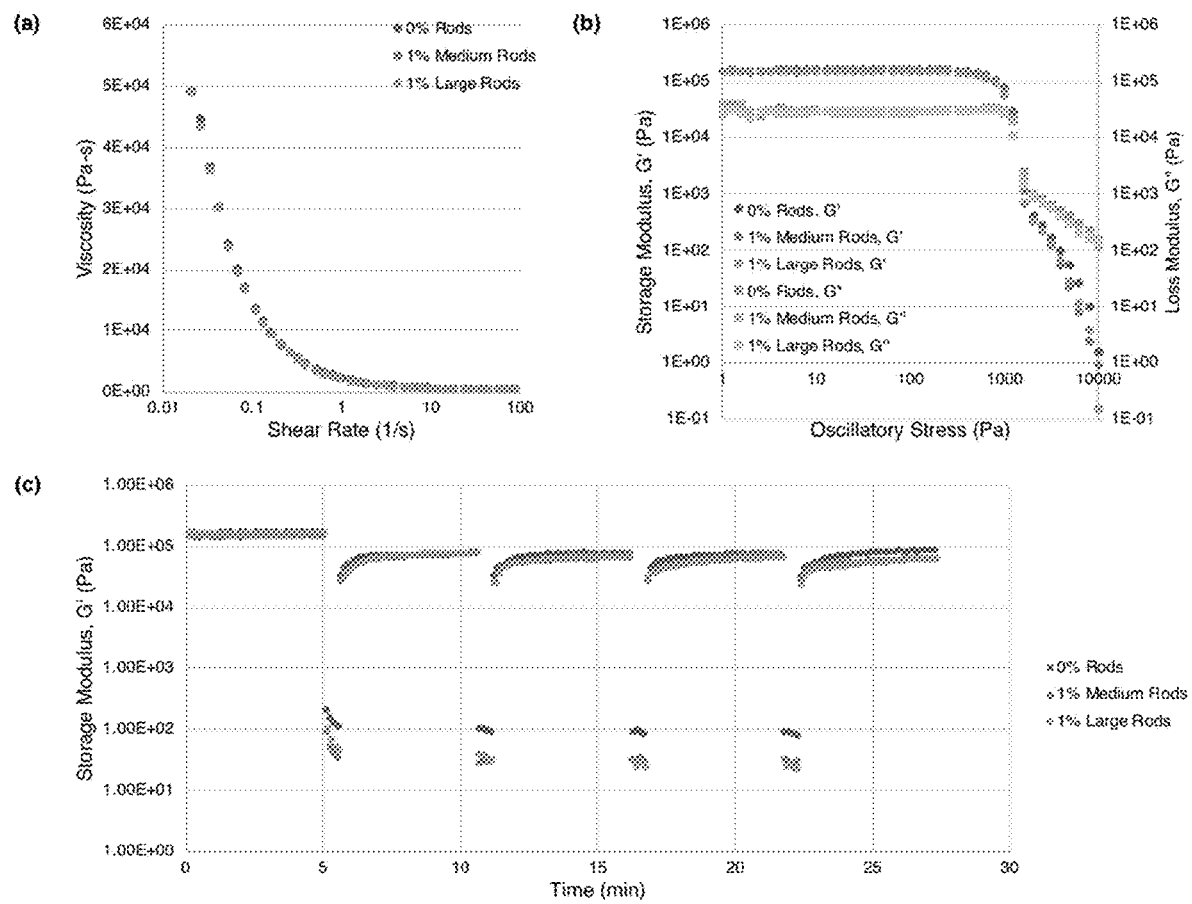
FIGS. 3A-3C illustrate the viscoelastic properties of NuSil R40-2181 containing nickel nanorods (1% by weight) with medium and large lengths (medium=4-8 µm; large=8-12 µm). Representative continuous flow curves (FIG. 3A), oscillatory stress sweep curves (FIG. 3B), and stress recovery curves (FIG. 3C) of NuSil R40-2181 formulations are shown.
Figure 4:
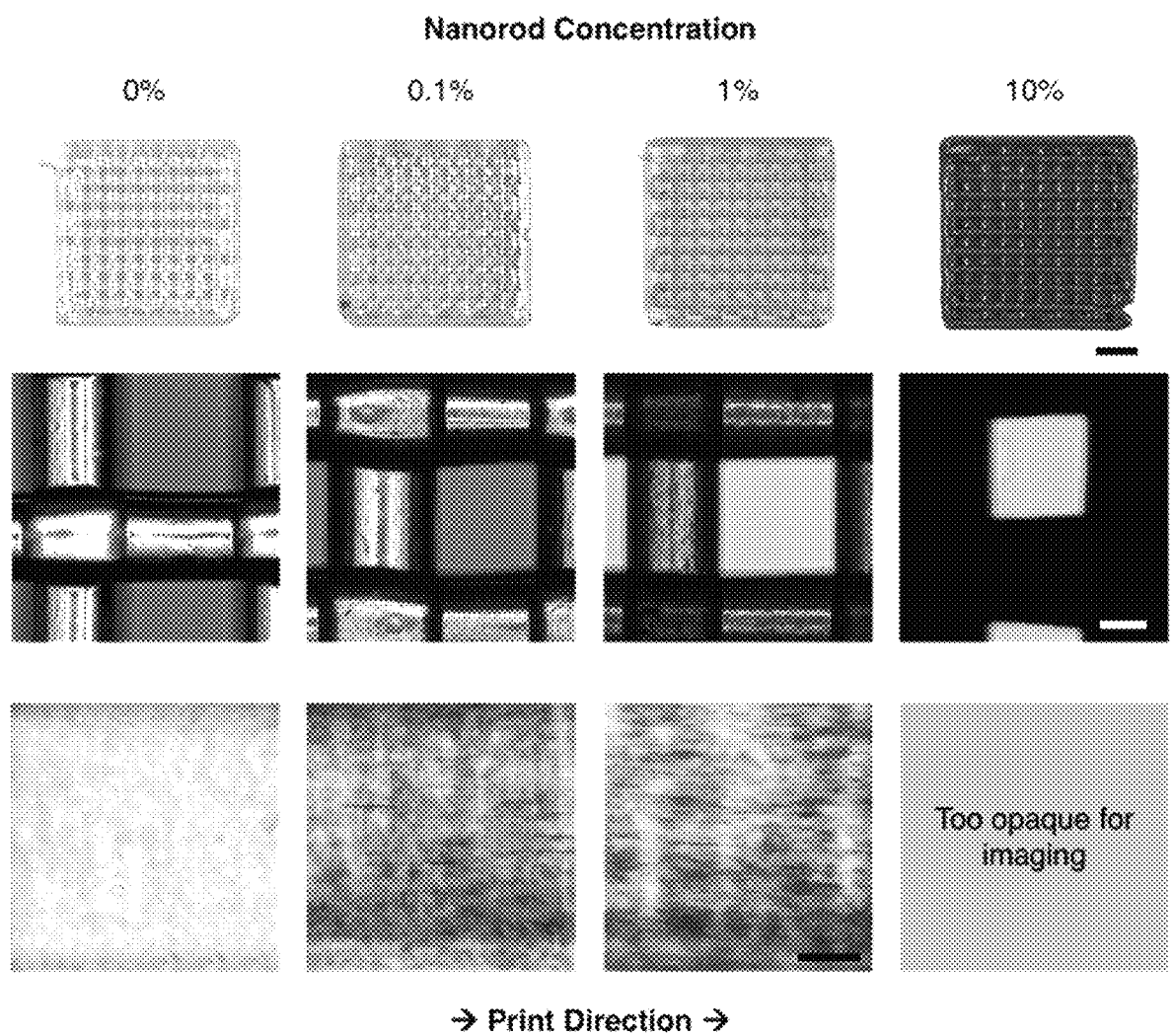
FIG. 4 includes optical macro- and microscopic images of 3D-printed NuSil R40-2181 containing various concentrations of nickel nanorods (0, 0.1, 1 and 10% by weight). Scale bars=2 mm (top), 200 µm (middle), and 50 µm (bottom).

Medium (4-8 μm) and large (8-12 μm) size nickel nanorods were incorporated into NuSil R40-2181 and the viscoelastic properties of each formulation were quantified through rheology. Representative continuous flow and oscillatory stress sweep curves are shown in FIGS. 3A-3B. Each formulation exhibited shear thinning behavior and had an observable yield stress (Table 1). Overall, the addition of 1 wt % medium rods and 1 wt % large rods did not significantly impact the apparent viscosity, storage modulus, loss modulus and yield stress of NuSil R40-2181. The rheological recovery experiments (FIG. 3C) showed that the materials exhibited only partial recovery within the 5-minute timeframe following oscillatory disruption. After four cycles of applied stress, the storage moduli for NuSil R40-2181 containing 0%, 1% medium rods and 1% large rods were only recovered by 49%, 43% and 39%, respectively. The data suggest that the materials are deformed by shear stresses of critical magnitudes, and that the addition of nanorods impairs the recovery of bulk fluid properties, although the effect is marginal. Lattice structures of NuSil R40-2181 containing 1 wt % nickel nanorods of small (1-4 μm), medium (4-8 μm) and large (8-12 μm) lengths were 3D printed with strand diameters of ~0.5 mm. Two-layered lattice structures were printed and flow-induced nanorod alignment was assessed and confirmed to successfully dictate the orientation of the nanorods (FIG. 4).

Figure 5A:
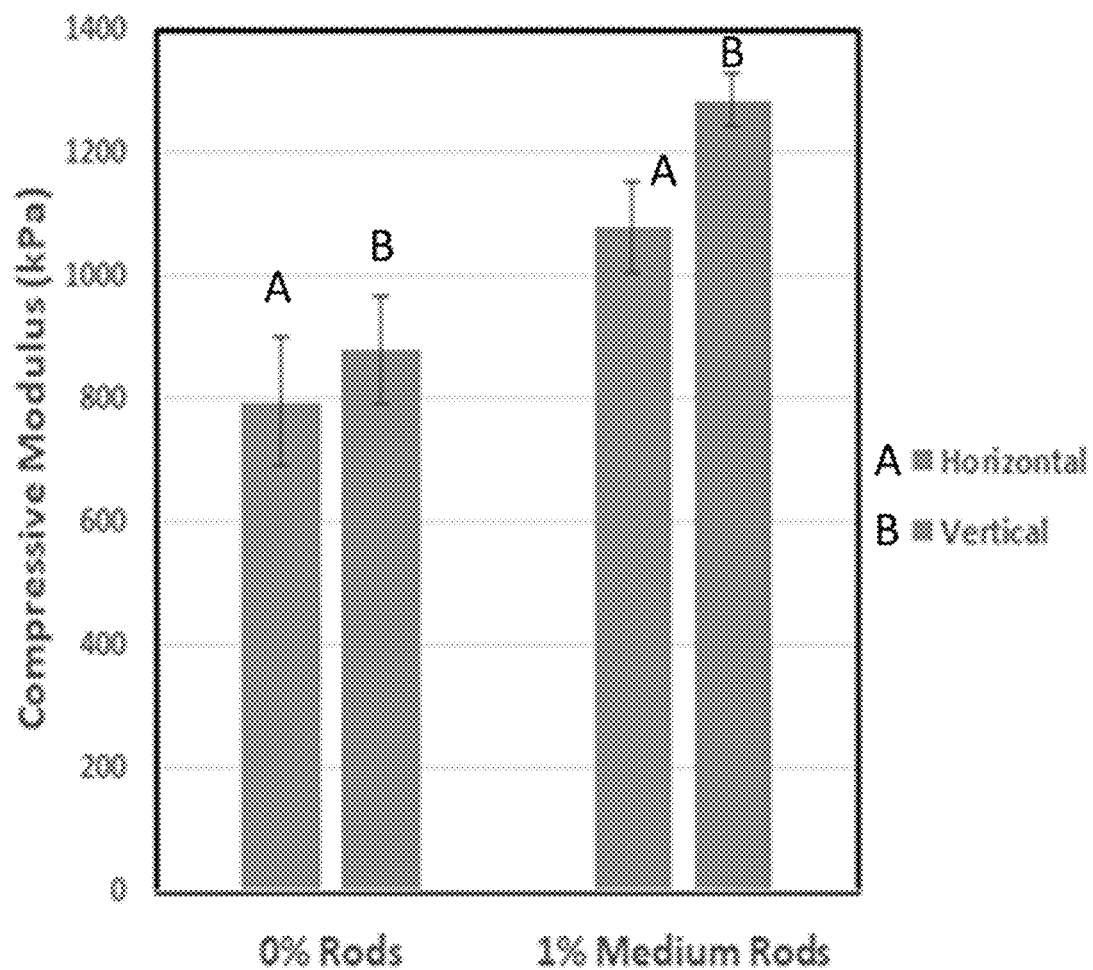
FIGS. 5A-5B show compressive moduli of 3D-printed NuSil R40-2181 structures containing 1% by weight vertically aligned medium nickel nanorods (FIG. 5A) and 1% by weight horizontally aligned nickel nanorods of various lengths (small=1-4 µm; medium=4-8 µm; large=8-12 µm) (FIG. 5B).

Dynamic mechanical analysis (DMA) indicated that the addition of small rods did not significantly affect sample stiffness, whereas the addition of medium and large rods resulted in a statistically significant (p-value <0.0001) increase in stiffness (FIG. 5A). These results indicate that the length of loaded nanorods influences the stiffness of 3D-printed NuSil R40-2181. The inclusion of nickel nanorods of all lengths at a 1 wt % concentration also endowed the material system with observable magnetism, as the 3D-printed structures were attracted to an external magnetic field (Table 1). Since nanorod alignment is induced through the shear and extensional stresses applied during the 3D printing process, the mechanical tests were performed on 3D-printed samples containing nanorods predominantly aligned in the horizontal direction.

TABLE 1

Rheological, mechanical and magnetic properties of nanorod-loaded NuSil R40-2181.

| Material Formulation | Yield Stress Pa | Compressive Modulus kPa | Observable Magnetic Properties Y/N |
|---|---|---|---|
| 0% Rods | 1552 ± 3 | 795 ± 106 | N |
| 1% Small Rods | TBD | 744 ± 42 | Y |
| 1% Medium Rods | 1548 ± 5 | 1080 ± 74 | Y |
| 1% Large Rods | 1378 ± 155 | 1240 ± 80 | Y |

Figure 5B:
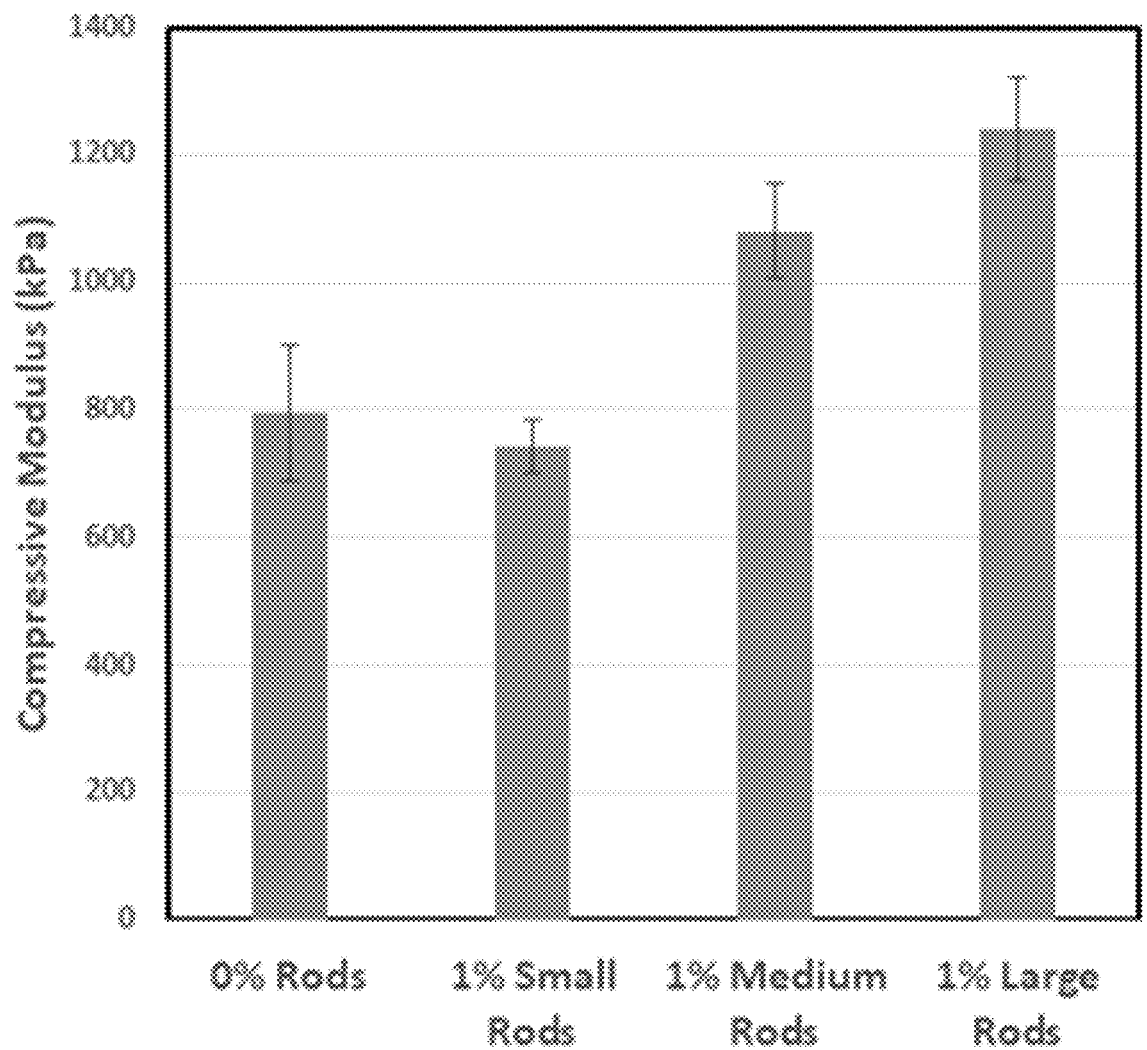

To test the effect of nanorod orientation on mechanical stiffness, cylindrical samples were punched out of the side of the 3D printed lattice structures as opposed to the top of the structures, to ensure that nanorods were aligned in the vertical direction every alternate layer. The compressive moduli of "horizontal" and "vertical" oriented NuSil R40-2181 samples without nanorods were not significantly different. However, "vertical" NuSil R40-2181 samples loaded with 1 wt % medium sized nanorods exhibited statistically significant (p-value <0.0001) larger moduli than "horizontal" samples (FIG. 5B), demonstrating that the compressive stiffness of 3D-printed structures is enhanced by nanorods that are vertically aligned.

PDMS-Nanorod Composites.

Small (1-4 μm) and large (8-12 μm) size nickel nanorods were incorporated into SYLGARD™ 184 Silicone Elastomer Clear (PDMS) at 1 wt % concentration and observable magnetism was achieved. The nanorods were oriented vertically and horizontally within the constructs, and this orientation was confirmed using brightfield microscopy on cross sections of the cured PDMS-nanorod composites (FIGS. 6A-6B). The horizontally-oriented nanorods look like long rods throughout the cross section, perpendicular to the objective lens. The vertically-oriented nanorods appear as dots indicative of the rods' diameters, demonstrating that the rods were successfully oriented in the same direction as the lens.

Compression DMA studies showed that the addition of large nanorods resulted in a higher compressive modulus than that obtained through the addition of small nanorods (FIG. 7A). When the length of the rods were increased in the PDMS samples, a higher Young's modulus was obtained. This result ratifies the direct proportionality of nanorod size to sample stiffness observed in the NuSil R40-nanorod composites. Nanorod length strongly dictated the mechanical properties of both silicone composites.

Exposure to a Magnetic Field.

Figure 7B:
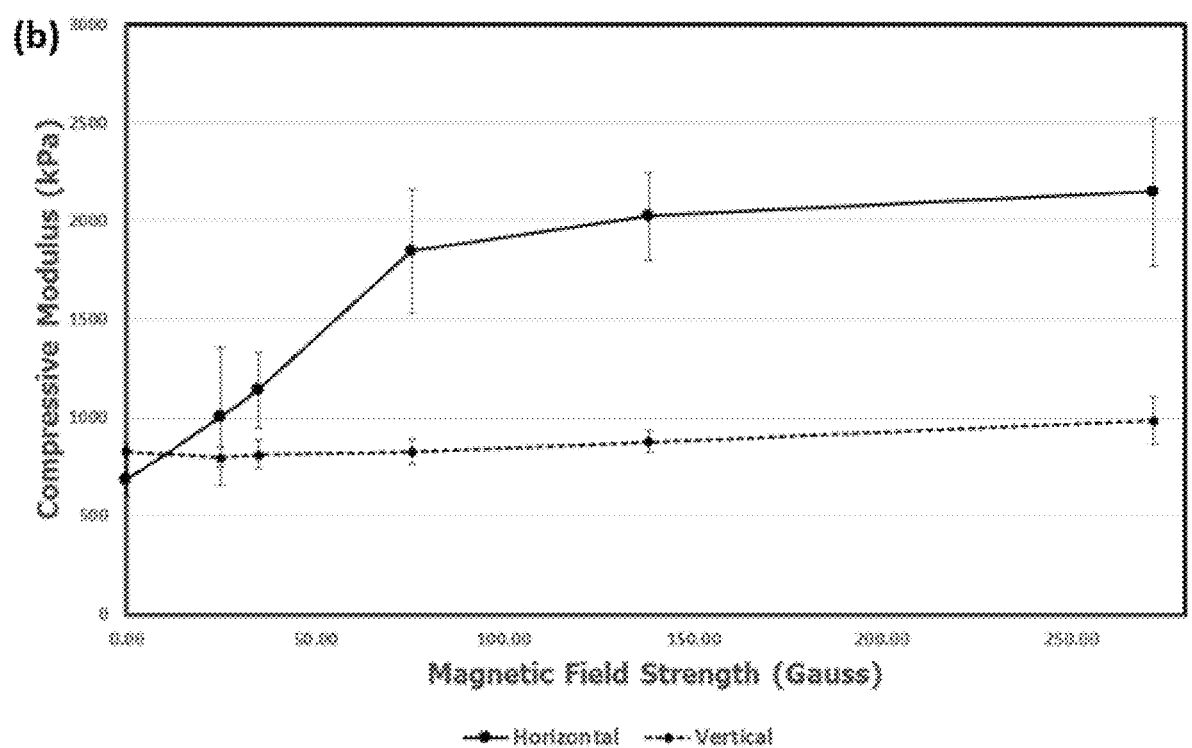

The PDMS-nanorod composites were exposed to a magnetic field underneath during compression DMA studies to study the mechanical properties in relation to the strength of a magnetic field applied. FIG. 7A shows that for vertically oriented nanorod composites, the application of a magnetic field did not yield a significant change in compressive modulus regardless of the size of the nanorods. The large rods provided stiffer composites than the small rods regardless of the strength of the magnetic field applied. However, this was not the case for the horizontally oriented nanorod composites (FIG. 7B). When exposed to a magnetic field, the horizontally oriented nanorod composites experienced large increases in compressive modulus. This increase in compressive modulus was related to the strength of the magnetic field applied, increasing rapidly when exposed to weaker magnetic fields but not as rapidly for stronger magnetic fields. When no magnetic field was applied, the 1 wt % vertically oriented nanorod composites displayed a higher compressive modulus than that of the horizontally oriented nanorod composites. Applying a magnetic field, however, enhances the compressive modulus of the horizontally oriented nanorod composites, while the vertically oriented nanorod composites remained constant. PDMS samples with no nanorods were also compressed dynamically while being exposed to a magnetic field and no change in compressive modulus was observed, confirming that the increase in stiffness is caused by the actuation of the nanorods within the composites and not by the PDMS itself.

The orientation of the nanorods provides the user with the ability to modulate the stiffness of the material by applying a magnetic field. Horizontally oriented nanorod composites can be used when enhanced mechanical strength is needed on an application, and this can be tuned with the strength of the magnetic field applied. Conversely, if a magnetic silicone construct that maintains its mechanical properties regardless of the magnetic field applied is needed, the vertically oriented nanorod composites are optimum given that their stiffness has very little to no response to magnetic field strength.

Detection of Compressions with Magnetometer.

Figure 8A:
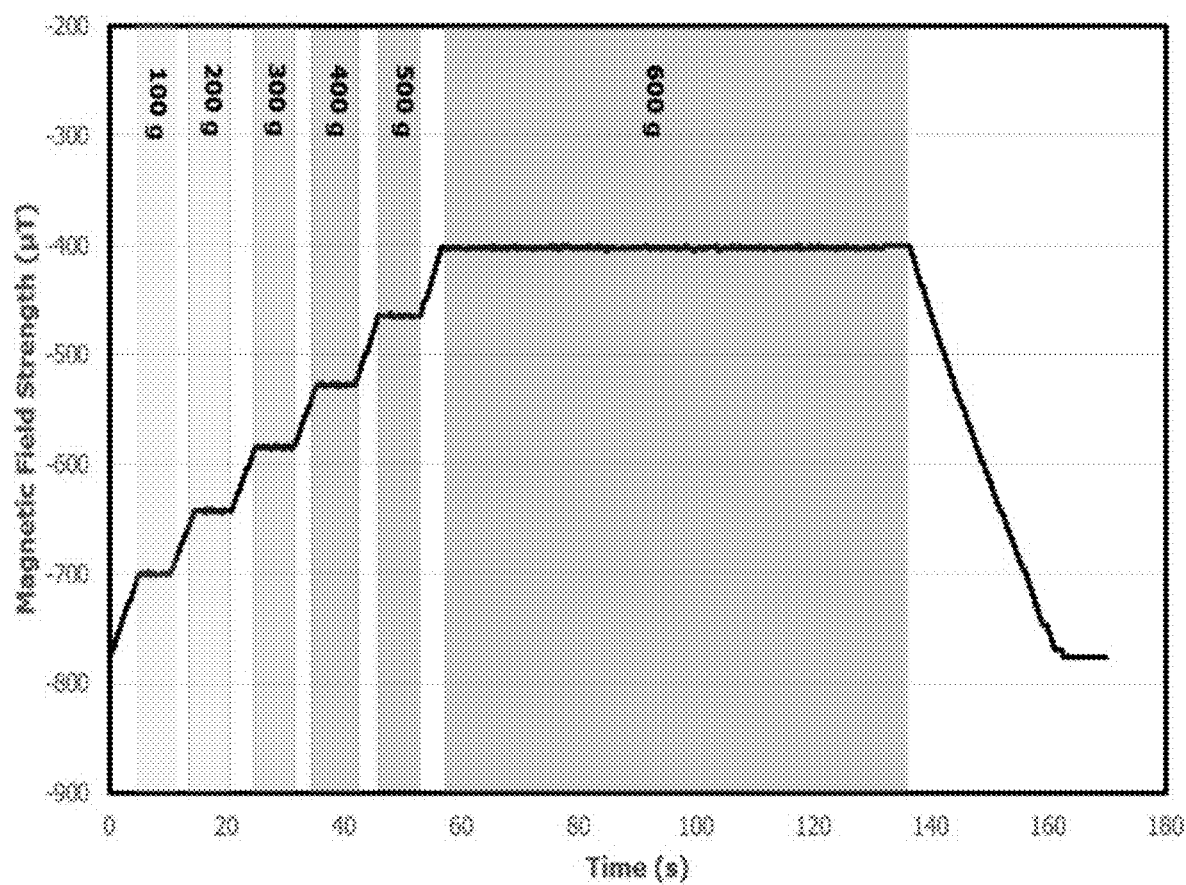
FIGS. 8A-8B illustrate the remote sensing of compressive forces by measurement of magnetic field strength of PDMS-nanorod composites (1 wt % nanorods) (FIG. 8A) and NuSil R40-2181-nanorod composites (1 wt % nanorods) (FIG. 8B) during sample compression with DMA. The samples were compressed atop a triple-axis magnetometer, which was used with a microcontroller to record the magnetic field strength value while the samples were subjected to compressive forces in 100 gram intervals up to 600 grams.
Figure 8B:
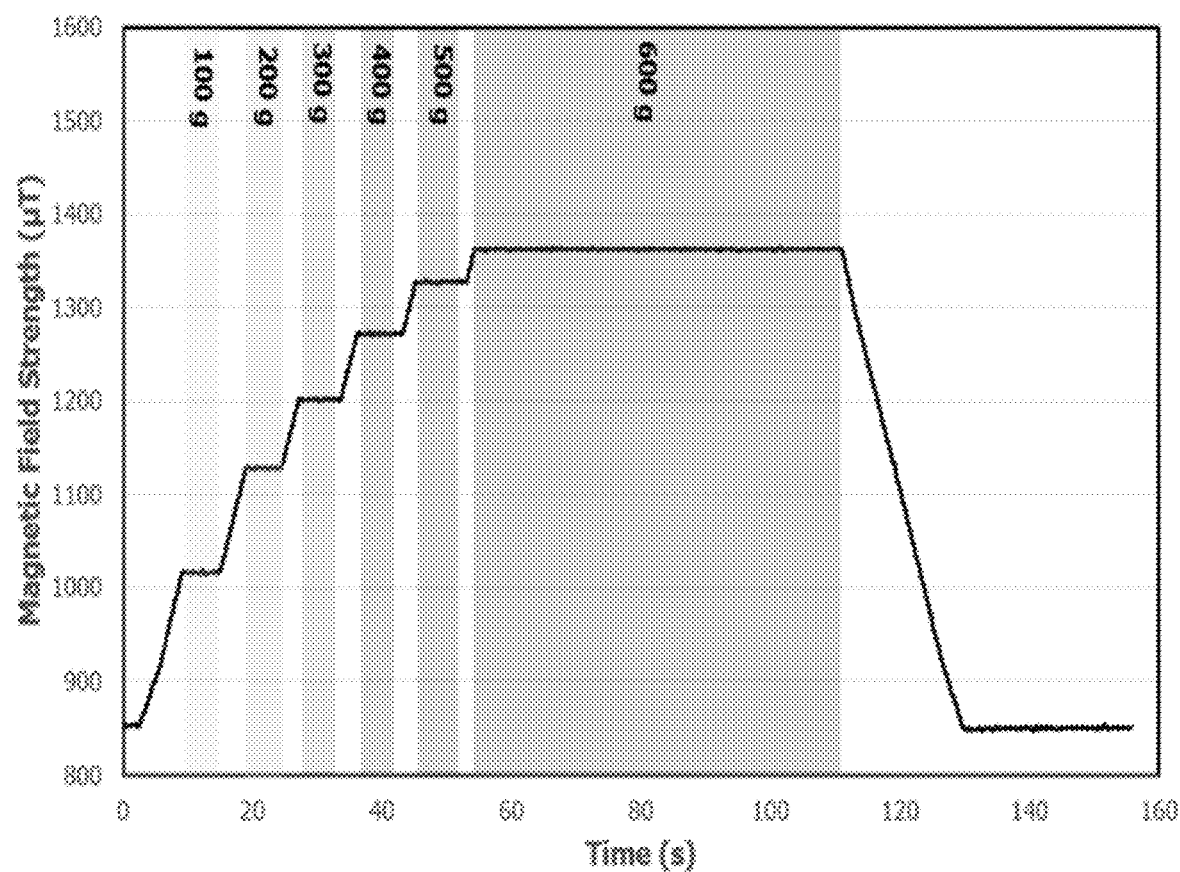

Using a triple-axis magnetometer (Hall Effect sensor) and Arduino microcontroller, PDMS-nanorod (1 wt % nanorods) composites were subjected to compression and the change in magnetic field strength was measured to determine if mechanical forces can be remotely sensed. Increasing compressive forces in increments of 100 g were applied, and the fluctuation in magnetic field strength varied at each increase in compressive force. Not only was the magnitude of force remotely detectable by the magnetometer, but also the duration of the force applied (FIG. 8A). After compressing the PDMS-nanorod constructs at 600 g for 80 seconds, the compressive force was removed, and the sample returned from a field strength of approximately $-400$ µT to the baseline magnetic field strength reading (approximately $-800$ µT). These results confirm the ability to remotely sense compression events and other mechanical forces in PDMS-nanorod structures with detection of both duration and magnitude. Furthermore, the data confirmed that PDMS-nanorod constructs retained their initial magnetic field strengths after cycles of compression. Finally, the 3D printed silicone cushions containing 1 wt % nanorods (see FIG. 4) were also compressed with varying forces. A similar compression cycle was applied and the silicone cushions demonstrated similar changes in magnetic field strength (FIG. 8B) validating remote sensing of these soft materials.

Figure 10:
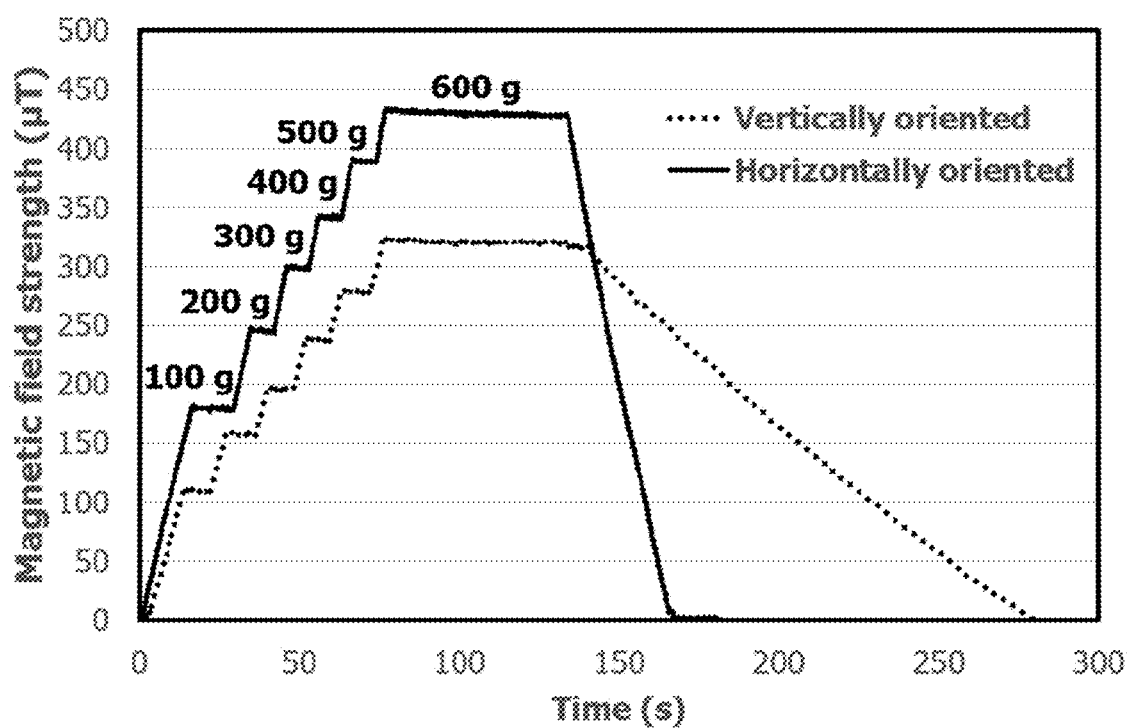
FIG. 10 show changes in magnetic field strength in 1 wt % horizontal and vertically aligned PDMS-nickel nanorods constructs at various compression intervals.

Findings indicated that the orientation of the nickel nanorods in the composite affected the magnetic field strength. At the same compression intervals, PDMS cylinders with horizontally aligned nickel nanorods displayed a greater increase in magnetic field strength when compared to cylinders with vertically aligned nickel nanorods (FIG. 10).

Figure 11:
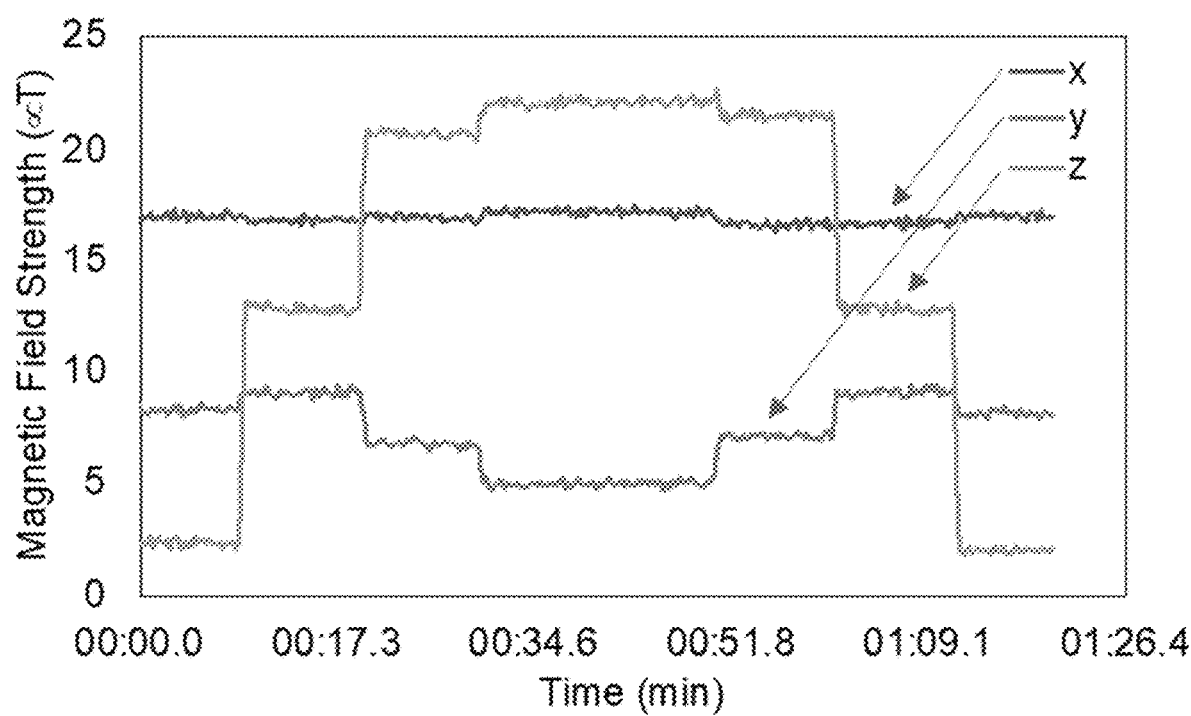
FIG. 11 show the magnetic field response from the x, y, and z axis of a 1 wt % PDMS-nickel nanorod construct during different magnitudes of displacement.

Sensing of movement, especially that in three directions, is an important characteristic of the next generation of smart materials. In evaluations of the PDMS-nickel nanorod 1 wt % composite the cylinder movement was sensed in the three directions and displacement of different magnitudes and durations were evident (FIG. 11).

The results from these investigations by our colleagues were that silicone cushions with a PDMS-nickel nanorod 1 wt % composition displayed electromagnetic-induced stiffness with remote control and that movement in a three-directional fashion was sensed using a remote magnetometer. The findings also suggest that horizontally aligned nickel nanorods display a greater change in magnetic field strength than vertically aligned nanorods.

Example 2: Compression Testing of Ferromagnetic Particles within Soft Materials

The inclusion of magnetic particles as fillers within soft materials has the potential to drive the development of smart materials with high functionality and structural diversity. Six ferromagnetic fillers (i.e., nickel, carbonyl iron, cobalt, iron oxide, magnetite, and neodymium powder) were incorporated within polydimethylsiloxane at concentrations of 0.01 wt %, 0.1 wt %, and 1 wt %. Defined compression tests determined the ability to detect material deformation and the magnetic field response generated during compression cycles. Utilizing iron oxide at 1 wt %, the compressive response of additional silicones and a two-part polyurethane was also investigated.

Compression testing of five of the six ferromagnetic fillers in PDMS, with the exception of carbonyl iron, revealed that 1 wt % was the minimum concentration required to detect compression events via the magnetic field response. The findings of carbonyl iron at 1 wt % were not viable as its magnetic field response was similar to that of the PDMS control samples. The neodymium filler particles produced the strongest magnetic field response. However, settling of the neodymium particles became evident during the curing process, which prompted further theoretical exploration at various particle sizes and viscosities. PDMS displayed the optimal relationship between force and displacement amongst the various polymers with 1 wt % iron oxide. The other materials were either too soft or were too resistive to be considered viable as a durable soft sensor material or were limited by an inability to measure magnetic field strength.

Introduction

The rapid advancements in soft materials has spurred the development of smart sensing devices including those that may be implantable into various textiles or other sensing applications. These smart materials are comprised of magnetic particles to enable detection of material movement or even control of movement via external magnetic fields. Such soft materials can be applied in a number of fields which include soft robotics[22, 23], biomechanics[24, 25], as well as and biomedical[26, 27] and biotechnology[28] applications such as drug delivery[29], imaging[30, 31], monitoring[14, 32], and invasive surgery[33, 34] devices. However, there is still a need to improve the accuracy and performance of these soft sensors.

Until recently, Hall effect sensors generally utilized a solid and rigid neodymium magnet embedded within silicone or other soft materials. These were limited both by its structure but also because these kinds of sensors tend to reach saturation quickly and therefore offer a limited range of measurement[10]. The need to improve these sensors lead to an investigation designed to identify a way to replace rigid neodymium magnets with a neodymium magnetic powder that could then be blended with silicone and cured[11]. This technique reduced the overall thickness and resulted in the development of a sensor with a softer structure.

Numerous synthetic polymers and soft materials are on the market, however the need to improve materials and performance of soft sensors is fundamental[35]. Soft materials need to be durable as to not break from repeated amounts of compression and have sufficient recovery to sustain their shape. They also need to maintain the ideal rheological properties prior to curing if additive manufacturing techniques of these soft sensors is to be explored[36, 37]. Silicones have become favorable due to their low cost as well as their ability to be printed through direct ink writing (DIW)[38]. They also express the ability to change physical properties due to varying molecular weight, chemistry, and weight-to-weight (w/w) ratios of the base polymer to crosslinker[39, 40].

Magnetic particles used as fillers for soft materials would need to possess the ability to emit a large magnetic field and retain their magnetic moment. In addition, they would have a high remnant magnetization and have a large coercivity to avoid demagnetization. Before chemical synthesis of ferromagnets, this was considered an anomaly because materials that have a large coercivity tend to have low remnant magnetization and those with a high remnant magnetization tend to have a low coercivity[30]. Therefore, we explored synthetic ferromagnetic fillers such as cobalt, iron, nickel, and their common alloys because of their abilities to retain permanent magnetism. We also considered the particle shape and sizes of these magnetic fillers in an effort to avoid affecting the bulk properties of the soft materials. This is especially vital in situations where the function of the soft material must be maintained.

The current state of the art in magneto sensing has revealed several limitations with regards to both magnetic particle performances as well as materials. Specifically, the key components are to improve upon sensitivity, accuracy, and performance[9, 10]. This study sought to advance previous magnetic sensing research and our own collaborative data to improve current force sensors, specifically the limitations in sensitivity and accuracy. We designed these investigations to identify and test six ferromagnetic fillers incorporated within soft sensors. Our main objective was to analyze the magnetic concentration dependence on the ability to detect compression events and their magnetic field response generated during these compression events. Next, we wanted to assess a particular ferromagnetic filler with a viable magnetic field response to identify other possible soft materials and composites with potential in future sensing applications.

Materials & Methods

Nickel Nanorod Synthesis

Ferromagnetic nickel nanorods utilized in the testing were synthesized by electrodeposition of nickel into nanoporous alumina templates[41]. To perform the process supplies were acquired as follows: Whatman™ Anodisc™ Filter Membranes of 0.02 µm pore size were obtained from Fisher Scientific (Hampton, N.H., USA); gallium-indium eutectic, nickel(II) chloride hexahydrate, nickel(II) sulfate hexahydrate and boric acid used in the electrolyte solution were obtained from Sigma Aldrich (St. Louis, Mo., USA); and nickel wire of 1.0 mm diameter 99.5% metals basis was purchased from VWR (Radnor, Pa., USA). Previous work demonstrated that varying the deposition time produced nanorods of assorted lengths: 10-20 minutes produced small (1-4 µm), 20-30 minutes produced medium (4-8 µm), and 40-50 minutes produced large (8-12 µm) nanorods. All nickel nanorods synthesized and produced for this work utilized a deposition time of 45 minutes.

Remaining Magnetic Materials

Aside from the nickel nanorods being produced in lab, the five remaining ferromagnetic materials were obtained from and used as received from outside suppliers. Carbonyl iron microspheres, cobalt nanowires, and iron(II,III) oxide (iron oxide) nanopowder were all acquired from Sigma Aldrich (St. Louis, Mo., USA). The iron oxide contains a 97% trace metal basis. Magnetite powder and neodymium iron boron (neodymium) powder were purchased from Advanced Reade Materials (East Providence, R.I., USA) and Nanoshel (Wilmington, Del., USA), respectively. The purity of the neodymium powder is 95-96% and comprised of 29-32% neodymium, 64.2-68.5% iron, 1.0-1.2% boron, and 0.5-1.0% niobium. Physical properties of the magnetic materials were provided in their technical data sheets by their respective suppliers and are summarized in Table 1.

TABLE 1

Physical properties of ferromagnetic materials.

| Magnetic Material | Diameter/Average Particle Size | Length (µm) | Density (g/cm³) |
|---|---|---|---|
| Carbonyl Iron | 1 µm | — | 7.86 |
| Cobalt | 200-300 nm | 100-200 | 8.90 |
| Iron Oxide | 50-100 nm | — | 4.8-5.1 |
| Magnetite | 5 µm | — | 5.1 |
| Nickel | 100-200 nm | 8-12 | — |
| Neodymium | 50-60 µm | — | 7.5 |

Characterization

Each magnetic material was imaged using a light microscope and their particle sizes and lengths were verified using ImageJ. Previous work utilized transmission electron microscopy (TEM) to measure the diameters of the synthesized nickel nanorods and to examine their nanoscale features.

Soft Materials

Three silicones and a two-part polyurethane were also purchased from outside suppliers to be utilized as soft materials. Dow Sylgard™ 184 silicone elastomer base and curing agent was acquired from Dow Chemical Company (Pevely, Mo., USA). It is a two-part system comprised of a polymeric base and a curing agent that when combined, the curing agent crosslinks with the polymeric matrix to form PDMS. Two additional vinyl terminated polydimethylsiloxanes (DMS-V21 and DMS-V33) and platinum-cyclovinylmethyl-siloxane complex; 2% pt in cyclomethylvinylsiloxanes (platinum catalyst) were purchased from Gelest (Morrisville, Pa., USA). The Sylgard 184 curing agent was used as the crosslinker and the platinum catalyst was also used to help cure these two siloxanes. The supplier recommends using a 10:1 w/w ratio of base to curing agent for PDMS, however, a 15:1 w/w of base to curing agent was used for all three silicones. A two-part polyurethane (BJB) was also obtained from BJB Enterprises (Tustin, Calif., USA). The polyurethane mixture needs equal parts (1:1 w/w) of each component to cure.

Table 2 lists the respective densities (kg/m$^3$) and viscosities (cSt) of the soft materials used as provided by their respective suppliers' technical data sheets.

TABLE 2

Physical properties of uncured soft materials.

| Soft Material | Density (kg/m$^3$) | Viscosity (cSt) |
| --- | --- | --- |
| BJB | 1,050 | 1,100 |
| DMS-V21 Base | 970 | 100 |
| DMS-V33 Base | 970 | 3,500 |
| PDMS Base | 1,110 | 5,000 |
| Sylgard 184 Curing Agent | 1030 | 110 |

Preparation of Samples

Figures 14A, 14B, 14C:
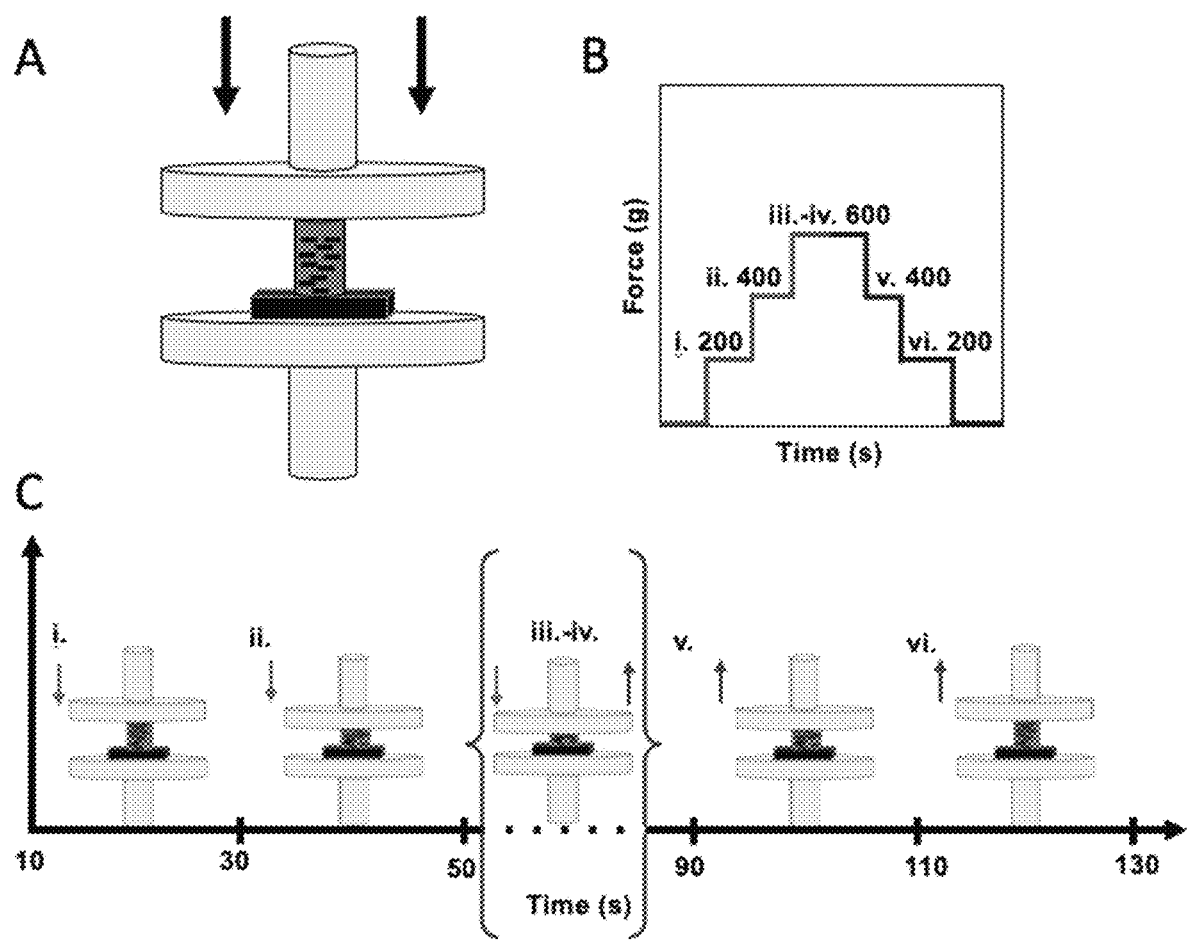
FIG. 14A-14C illustrates the experimental setup of compression testing. A) Cylindrical sample is placed on top of magnetometer and top geometry of ElectroForce 5500 is lowered to sample height until contact is made. B) Theoretical graph of force (g) versus time (s) showing the incremental steps of 200 g of force applied at 20 g/s for steps i, ii, and iii, and the removal of 200 g of force applied during steps iv, v, and vi. C) Theoretical figure of a cylinder being compressed or recovered during each incremental step of applied force over the course of 140 s.

The dry powder of all six ferromagnetic materials were incorporated into PDMS at varying concentrations of 0.01, 0.1, and 1 weight percent (wt %). The powder was first weighed before adding the PDMS base and curing agent at a 15:1 w/w ratio. The samples were hand mixed aggressively using glass stirring rods and then centrifuged at 500 min' to eliminate any air bubbles without separating components. Uncured samples were then mixed lightly again before being filled into 96 well-flat bottom plates (Corning Incorporated; Corning, N.Y., USA) and placed in a vacuum chamber for 20 to 30 minutes before curing to remove any additional air bubbles (FIG. 14A). Following this process, the samples were then placed in an oven at 70° C. to decrease curing time from 24-48 hrs at room temperature to just 2-3 hours. To produce horizontally-oriented dipoles of ferromagnetic particles within the PDMS, samples were prepared by applying a 15 gauss magnetic field (~0.1 T) with an electromagnet mounted perpendicularly to the samples during curing (FIG. 14B).

After curing was completed, the well plates were broken down and samples were removed from individual wells using ethanol. Due to the silicones surface tension within the individual wells, menisci had formed and were removed by slicing the top part of the cylindrical constructs to bring their height down from about 10.65 mm to approximately 7.50 mm. Samples were also brought down to this height to help prevent shear stress during testing. The samples each had a diameter of 6.5 mm.

Iron oxide nanopowder was also mixed with the remaining silicones, DMS-V21 and DMS-V33, as well as the BJB polyurethane at 1 wt %. The iron oxide was utilized as the control within these soft materials due to its abundance and inexpensive cost as well as its magnetic field strength displayed in preliminary studies. The DMS-V21 and DMS-V33 were prepared in similar fashion to the PDMS as each was used at a 15:1 w/w ratio of base to curing agent with an additional 0.01 volume % of platinum catalyst. with the iron oxide following the weighing, centrifuging, vacuum chamber, and oven. The BJB polyurethane cures within 30 minutes at room temperature so once it was mixed and centrifuged with iron oxide at 1 wt %, it was left to cure at room temperature.

Compression Testing and Sensing

A MLX90393 triple-axis magnetometer purchased from Adafruit Industries (New York City, N.Y., USA) was wired to an Arduino Mega 2560 microcontroller to communicate via I2C, and the magnetometer board was then mounted using double sided tape onto the bottom geometry platform of the Electroforce 5500 (TA Instruments, Eden Prairie, Minn., USA). Cylindrical constructs were subsequently placed above the magnetometer sensor and the ElectroForce 5500's axial mover was lowered until contact was made with the top side of the sample (FIG. 14A). The ElectroForce was utilized to exert increasing increments (i.e., 0-600 g in increments of 200 g over 10 seconds) of compressive force on the samples (FIG. 14B and C) for the first half of the experiment and then release those same incremental amounts of force until zero force is applied at the end. Each compressive force was held for 10 seconds. Magnetic field strength data from all three axes were collected from the output of the Arduino IDE software while the samples were compressed by the ElectroForce 5500. Magnetic field strength readings from the magnetometer were plotted against time alongside the applied force. Remote sensing of compression events was successfully achieved; both duration and magnitude of compressive forces were detectable based on the change in magnetic field strength. This procedure was also conducted with blank PDMS, DMS-V21, DMS-V33, and BJB constructs without the ferromagnetic materials to establish a baseline reading of magnetic field strength and possible background interference.

Figures 15A, 15B:
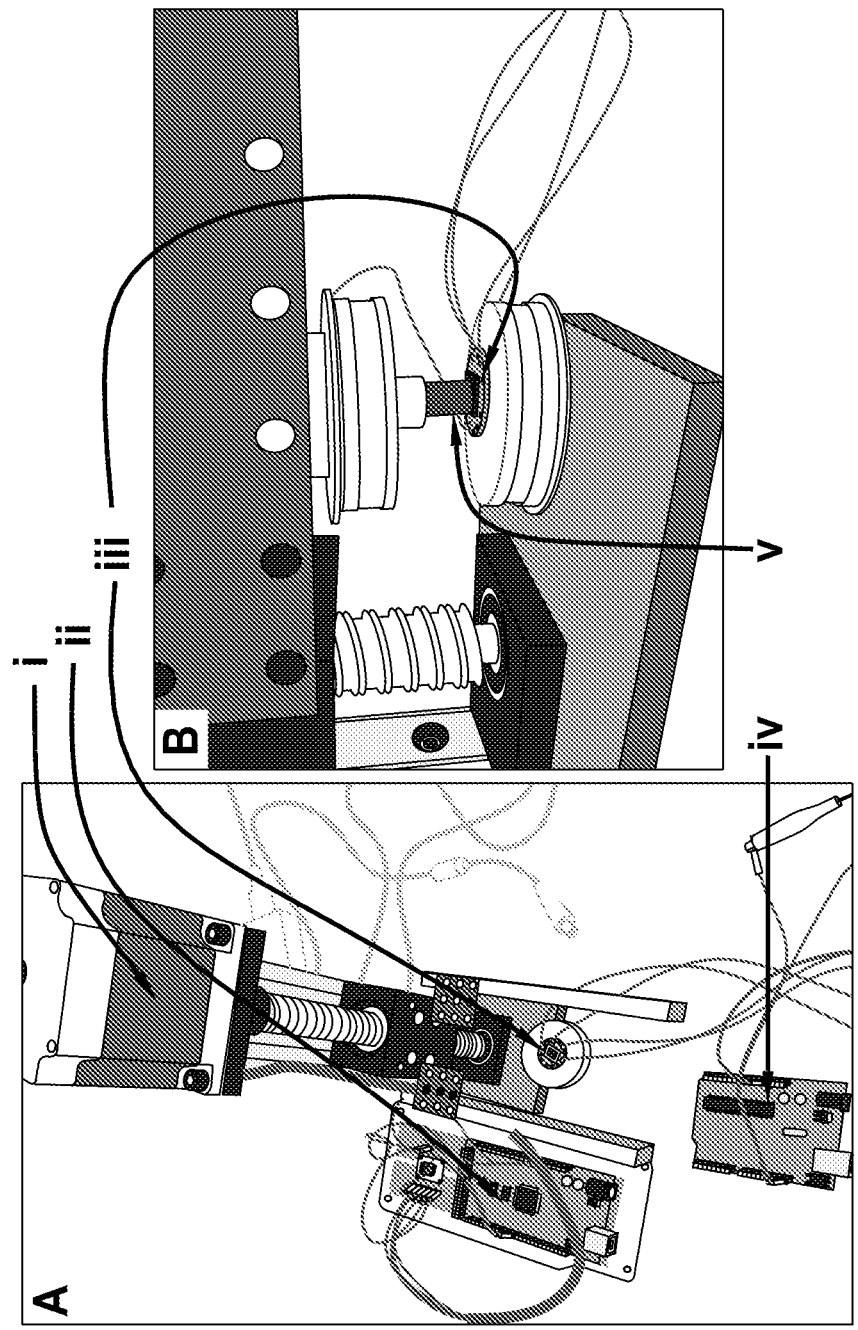
FIG. 15A-15B illustrates A) Custom built stepper motor to perform preliminary studies B) Compression geometry of stepper motor i) NEMA-23 2 phase stepper motor ii) Motor controller with A4988 stepper motor driver and iii) LSM303 triple-axis accelerometer and magnetometer iv) Sensor controller v) Cylindrical sample to be compressed.

Prior to using the ElectroForce 5500, preliminary studies were also performed using a similar technique as seen in FIG. 14A-C. However, rather than measuring the magnetic field response based on applied force, the magnetic field strength was measured against displacement. A NEMA-23 two-phase stepper motor was modified with platforms to add compression geometry onto the linear actuator. This custom built stepper motor seen in FIG. 15A was then used to apply increasing increments (i.e., 0-2.25 mm in increments of 0.75 mm) of displacement on the samples seen similarly in FIGS. 14B and C. A LSM303 triple-axis accelerometer and magnetometer purchased from Adafruit Industries was mounted onto the bottom platform geometry using double sided tape. The cylindrical construct was then placed on top of the magnetometer before the top geometry platform (mounted to linear actuator) was lowered until contact with the top side of the sample was made (FIG. 15B). Two separate Arduino Mega 2560 microcontrollers were then used to communicate with the magnetometer and the stepper motor via an A4988 stepper motor driver.

Experiments can also be performed similar to the force and displacement tests that were explained by the ElectroForce, but rather than placing the triple axis accelerometer and magnetometer directly between the bottom of the cylindrical samples and the bottom of the ElectroForce geometry, a structure to support the magnetometer directly perpendicular to the sample and the ElectroForce can be implemented. In the current assessment, the cross-sectional area of the actual sensor on the magnetometer board is much smaller than the cross-sectional area of the cylinders. As a result, the outcomes may have been affected by the cylindrical constructs beginning to engulf the sensor itself as the Electro-Force continuously displaced the sample.

Results & Discussion

Cylindrical constructs consisted of the six different magnetic fillers mixed with PDMS at varying concentration levels of 0.01, 0.1, and 1 wt % to determine the sensitivity for analyzing magnetic field strength (µT). These six ferromagnetic particles consisted of nickel nanorods, carbonyl iron microspheres, cobalt nanowires, iron oxide nanopowder, magnetite nanopowder, and neodymium iron boron powder. Iron oxide was also mixed with DMS-V21, DMS-V33, and BJB at 1 wt %. Blank cylinders of BJB, DMS-V21, DMS-V33, and PDMS with no magnetic nanoparticles served as controls to provide a baseline reading on the magnetometer and identify any possible background interference.

Figures 16A, 16B, 16C, 16D, 16E, 16F:
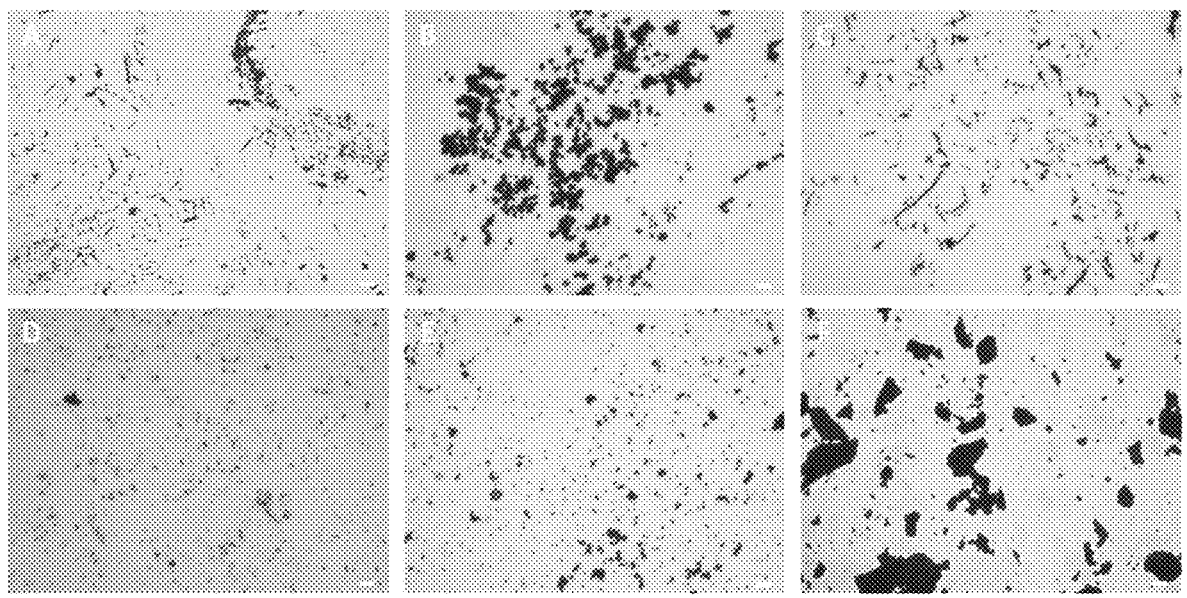
FIG. 16A-16F show images of A) Nickel nanorods, B) carbonyl iron microspheres, C) cobalt nanowires D) iron(II, III) oxide (FeO and $Fe_2O_3$) nanopowder, E) magnetite ($Fe_3O_4$) powder F) neodymium iron boron powder. The scale bars are equal to 10 mm.

Before these cylindrical constructs were produced, the average particle sizes of these six ferromagnetic materials were verified under a 20× light microscope. FIG. 16A displays the nickel nanorods and the carbonyl iron, cobalt, iron oxide, magnetite, and neodymium particles can be seen in FIGS. 16B, C, D, E, and F, respectively.

Samples were made in batches and three constructs of each particle were selected for testing (n=3). Overall, 72 samples were tested and the ensuing results of the magnetic field strength and displacement (mm) were averaged. Criteria for testing included: 1) no visible air bubbles although this standard became harder to implement in samples at 1 wt % due to their opaqueness as well as within BJB since it cured so quickly and 2) most perpendicular top sides after samples were sliced down from 10.65 mm to 7.5 mm in height to help minimize possible shear stress. It should also be noted that during preliminary trials, only one (n=1) of every sample made from nickel, carbonyl iron, iron oxide, and magnetite at 0.01, 0.1, and 1 wt % as well as cobalt at 0.01 and 0.1 wt % within PDMS were tested.

Figures 17A, 17B, 17C, 17D, 17E, 17F:
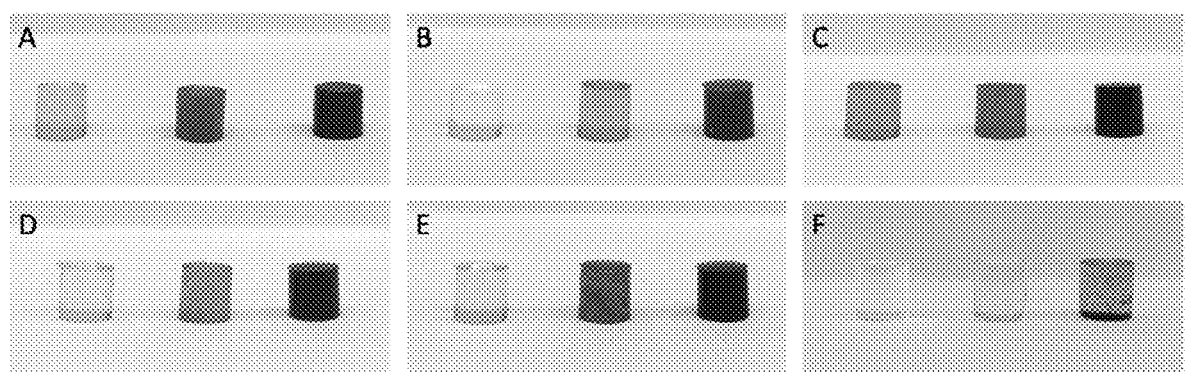
FIG. 17A-17F show all six ferromagnetic materials at 0.01 wt % (Left), 0.1 wt % (Middle), and 1 wt % (Right) within PDMS. A) Nickel, B) carbonyl iron C) cobalt D) iron oxide, E) magnetite, and F) neodymium.

Cylindrical constructs of every magnetic material at 0.01, 0.1, and 1 wt % within PDMS was photographed to show how each cured sample appeared after being cured, removed from well plates and sliced down from about 10.65 mm to approximately 7.50 mm (FIG. 17).

Figures 18A, 18B:
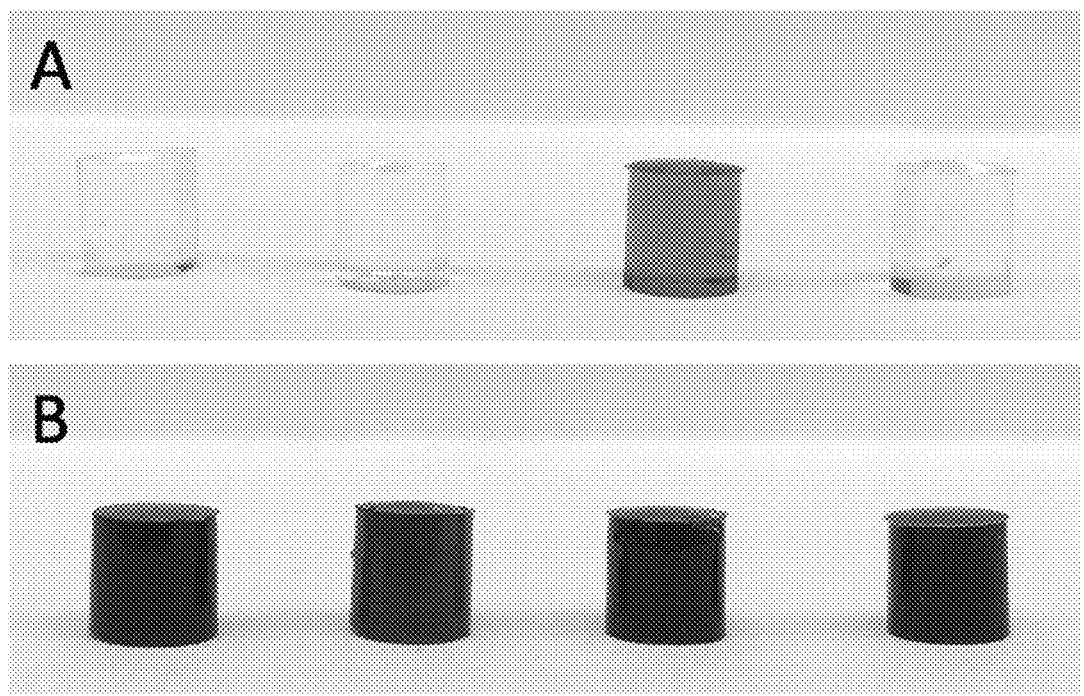
FIG. 18A-18B show images of A) Blank samples of 2-part polyurethane (Left), DMS-V21 (Middle-Left), DMS-V33 (Middle-Right), and PDMS (Right). B) Samples each containing 1 wt % iron oxide.

FIG. 18A displays the blank samples of BJB, DMS-V21, DMS-V33, and PDMS with no magnetic filler while FIG. 18B presents each of these soft materials with 1 wt % iron oxide. The blank DMS-V33 sample appeared different from the rest of the blanks due to the platinum catalyst that was added. DMS-V21 also includes a platinum catalyst but did not display the darker coloring.

Figure 19:
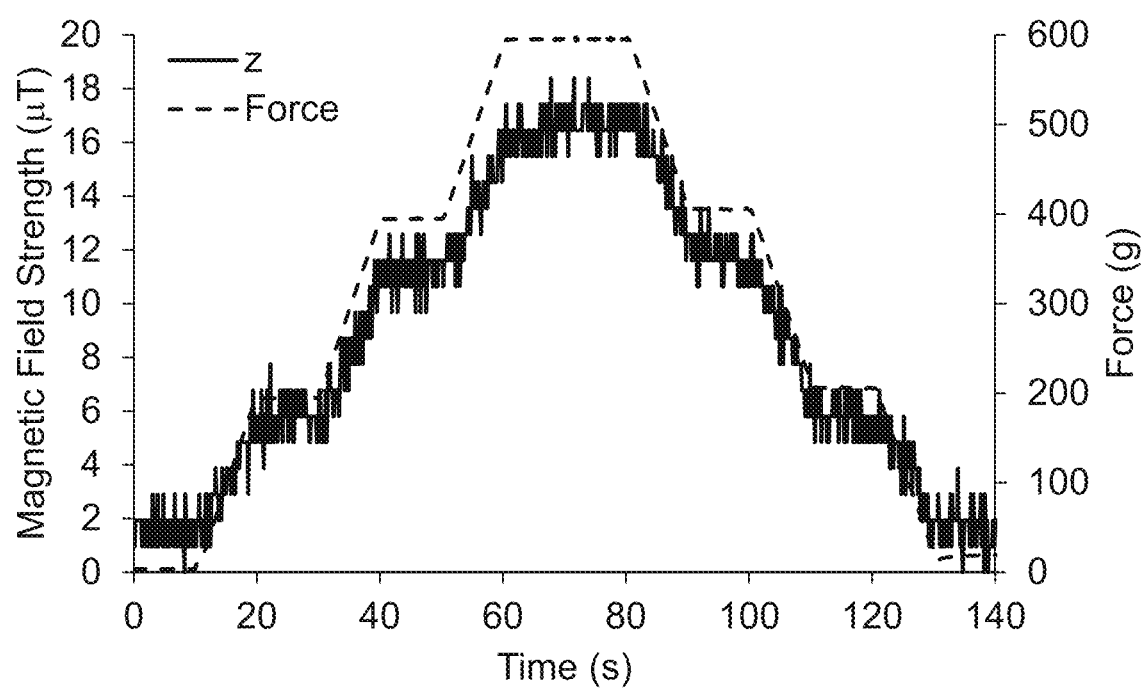
FIG. 19 show the magnetic field strength (displayed from the z-axis) and the force versus time of a 1 wt % sample of nickel.

The magnetic field response on the z-axis of each sample was plotted against time along with the change in applied force against time to detail the dependence of the magnetic field response based on force. FIG. 19 showcases a typical graph of the magnetic field strength and force plotted against time for a sample of nickel at 1 wt %. The data was normalized to display the magnetic field response, which was about 1.5±1.5 µT when 0+10 g of force was applied. As the force increased to 200±10 g, the magnetic field strength increased. When the force was held at a certain point, the magnetic field strength would hold as well. Then, as force was unloaded incrementally, the magnetic field strength of the sample would adjust back to a similar response as when the same force was applied in the first half of the test. This is evident in FIG. 19 when the sample is held at 400±10 g of force from 40-50 s and displays a magnetic field response of 10.7±1.5 µT. Then as the force is increased to 600±10 g and reduced back to 400±10 g at 90-100 s, the sample exhibits a magnetic field response of about 11.6±1.5 µT.

Figure 20:
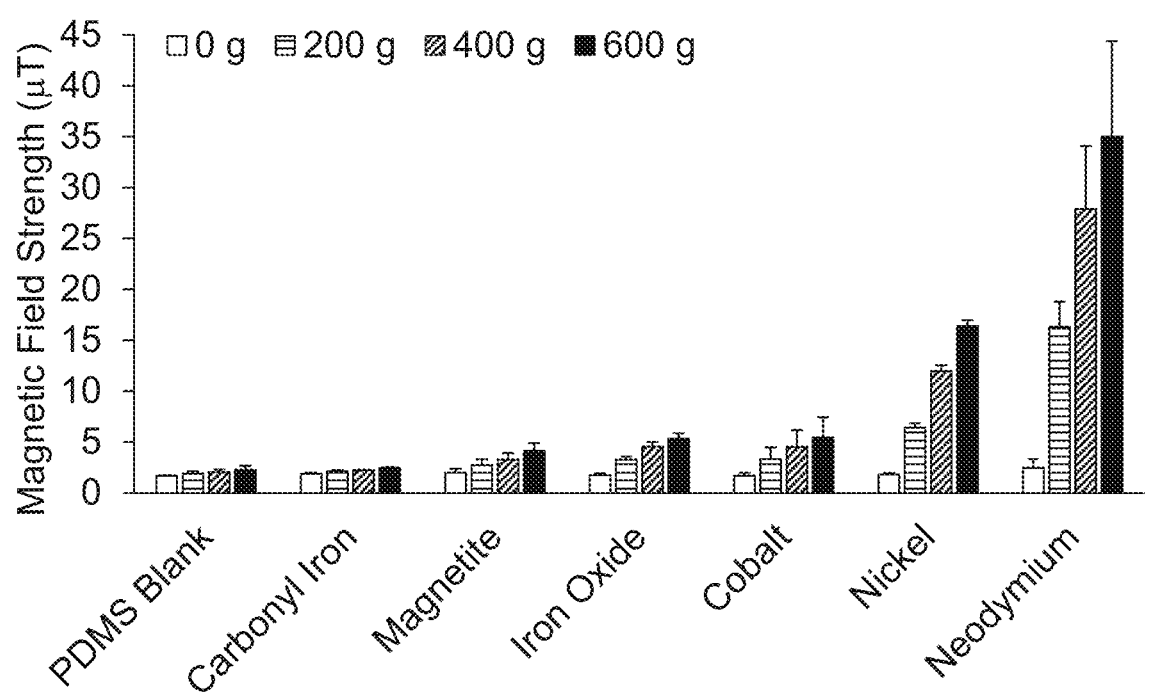
FIG. 20 show the magnetic field strength from all six magnetic fillers at 1 wt % during 0, 200, 400, and 600 g of force.

FIG. 20 outlines the varying ferromagnetic fillers in increasing order of magnetic field strength when 0, 200, 400, and 600 g of force was applied. Neodymium provided the greatest response in magnetic field strength during compression. At 1 wt % and with 600 g of applied force, neodymium exhibited a magnetic field response of 35 µT. Even with only 200 g of force applied by the ElectroForce, the neodymium cylinders still provided a magnetic field response (16 µT) equivalent as the next strongest material, nickel, at their maximum force of 600 g. While the nickel was expected to provide a strong magnetic field response, the cobalt was originally hypothesized to produce an even stronger response. However, the cobalt may have displayed a limited magnetic response due to aggregation of the nanowires observed in the cylinders. The blank PDMS control sample provided a baseline reading of about 1.7 µT of background interference on the magnetometer at 0 g of force and about 2.3 µT at about 600 g of force. This could potentially be due to the top geometry and the axial mover interfering with the magnetometer as it approached the magnetometer during compression steps. The iron oxide and magnetite displayed a magnetic field response of about 5 and 4 µT, respectively, at 600 g of force. Meanwhile, the carbonyl iron did not display a magnetic field response strong enough for us to be confident of detection as its maximum response was about 2.5 µT at 600 g of force.

Figure 21:
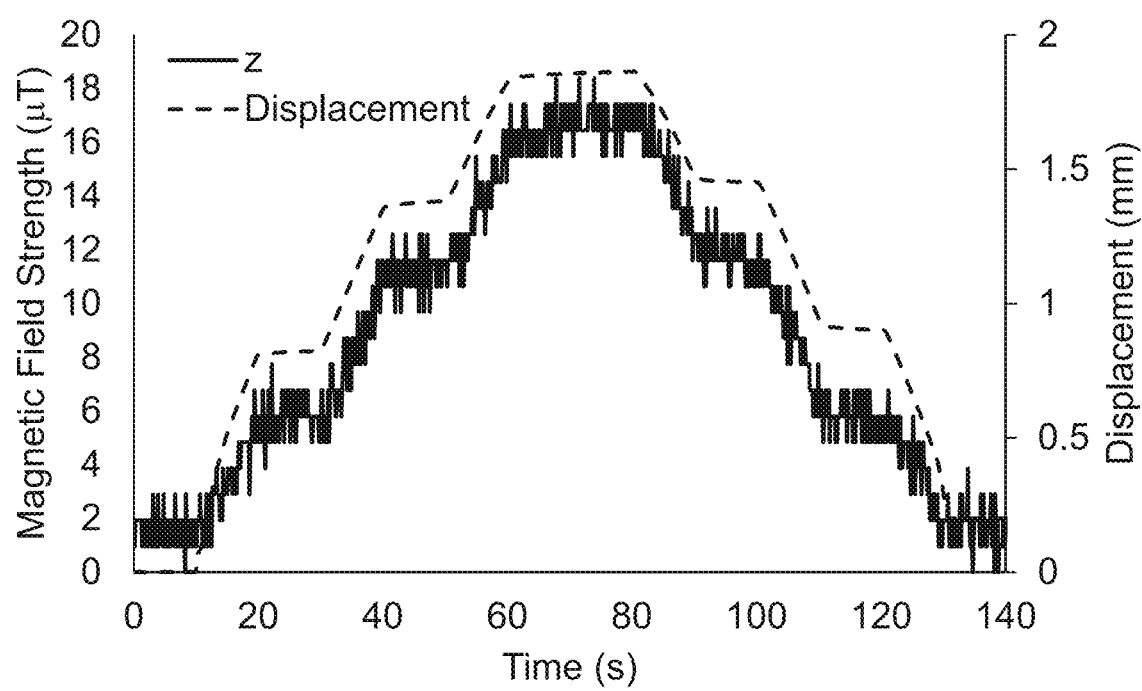
FIG. 21 show the magnetic field strength (displayed from the z axis) and the displacement versus time of the same 1 wt % sample of nickel depicted in FIG. 19.

The ElectroForce was also used to determine the displacement of the samples by measuring the displacement of the axial mover from its starting position to each step of compression. The main motive for quantifying displacement was to identify a similarity between preliminary results performed on the stepper motor compared to the results from the ElectroForce. FIG. 21 provides the displacement at of the same 1 wt % nickel sample seen in FIG. 19. During 600±10 g of force at 60-80 s, the sample provided a response of about 16.5±1.5 µT as it was being displaced about 1.83±0.02 mm.

Figure 22:
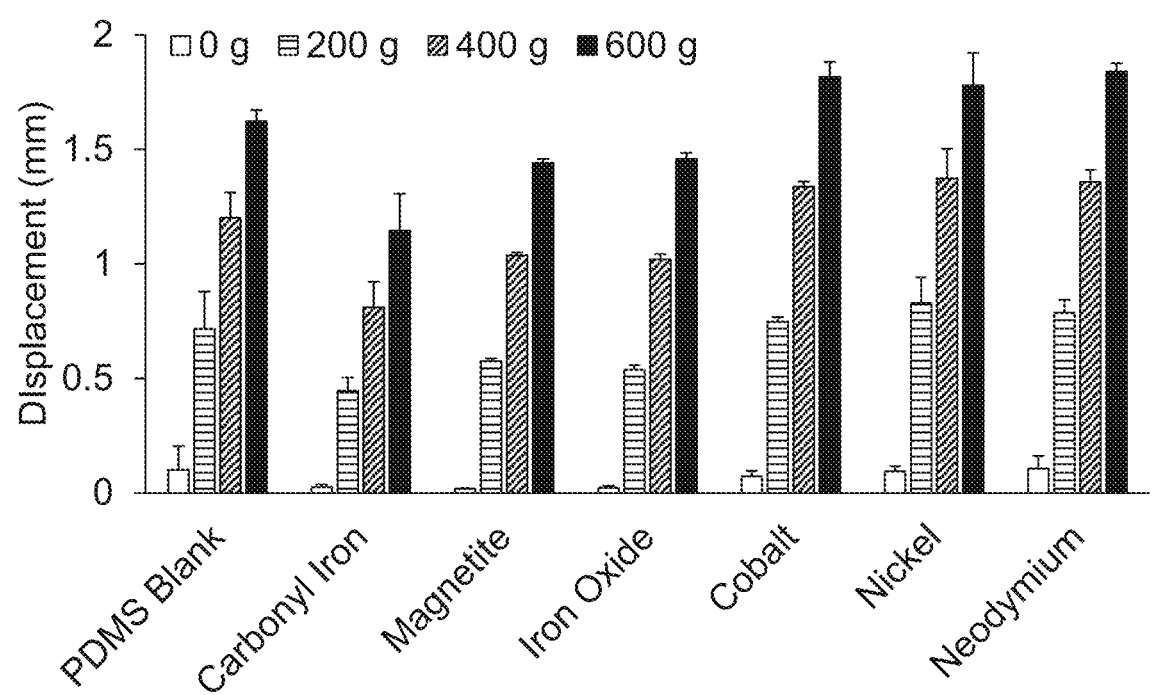
FIG. 22 is a bar graph showing the displacement of all six magnetic fillers at 1 wt % during 0, 200, 400, and 600 g of force.

The average displacements of the three samples tested for each material at 1 wt % during each step of compression can be seen in FIG. 22. Although we originally hypothesized each magnetic filler material would have increased the compressive modulus of PDMS, we can see that cobalt, nickel, and neodymium were all displaced an average of 1.82, 1.78, and 1.84 mm, respectively compared to the blank PDMS samples only being displaced 1.62 mm at 600 g of force. Alternatively, carbonyl iron, magnetite, and iron oxide all displayed a higher compressive strength with a lower average displacement of 1.14, 1.44, and 1.46 mm, respectively.

Figure 23:
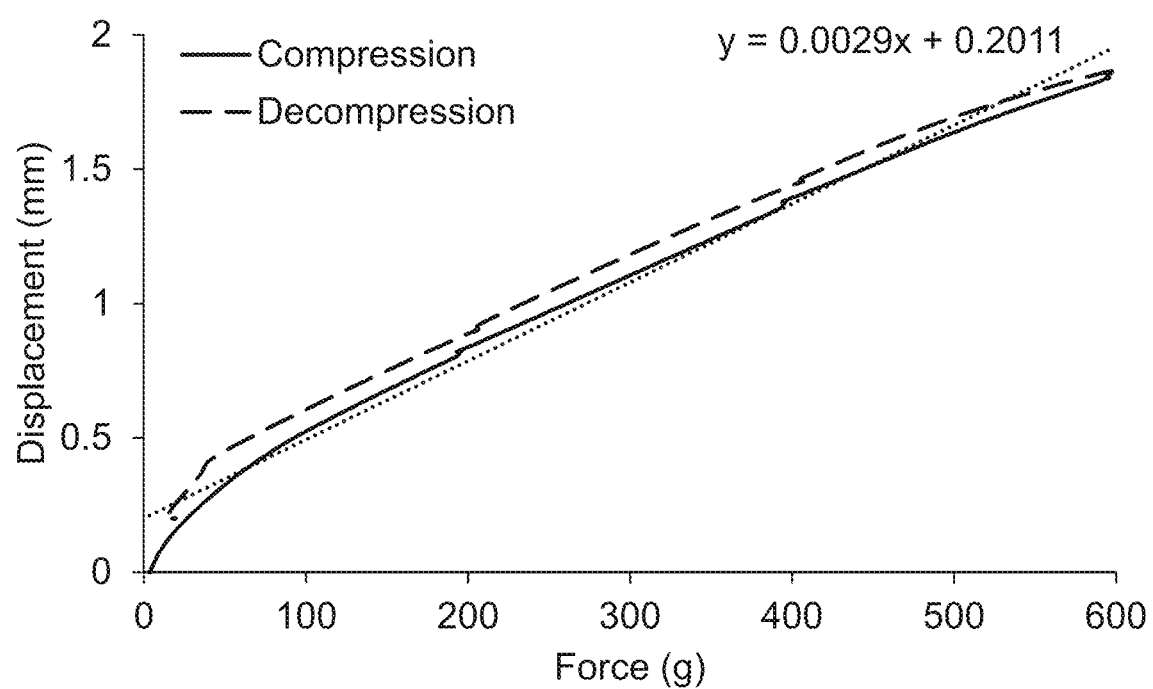
FIG. 23 show displacement as a function of force of the same 1 wt % nickel sample seen in FIG. 19.
Figure 24:
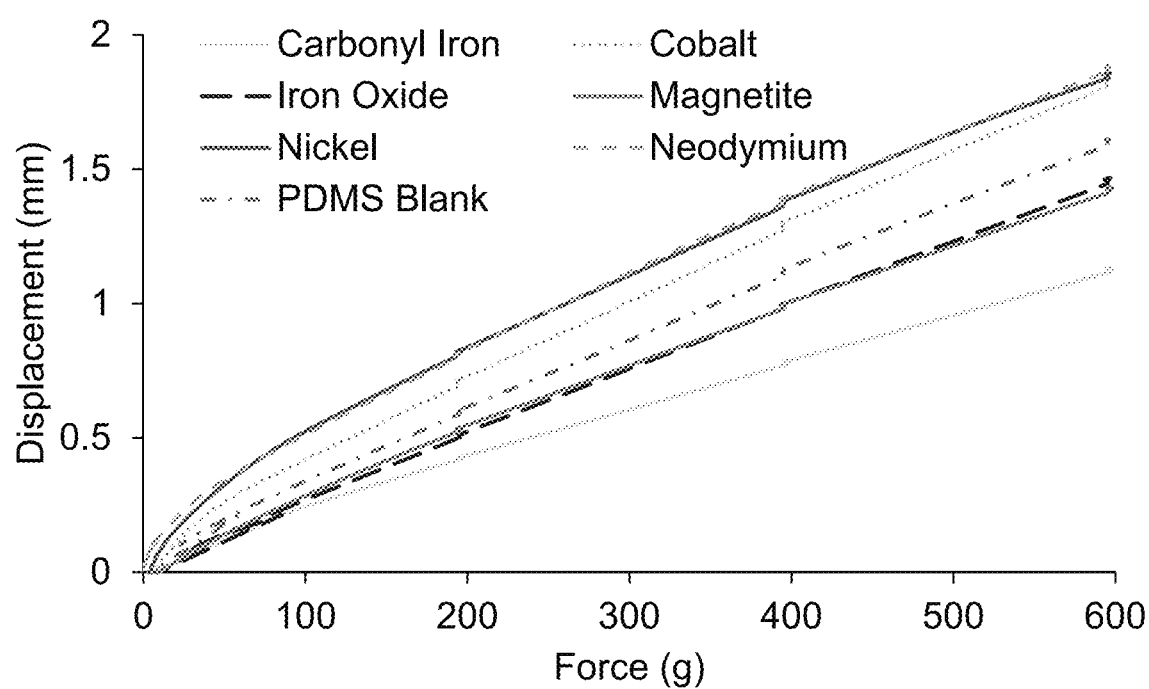
FIG. 24 show displacement as a function of force for one sample (n=1) of each magnetic material at 1 wt % within PDMS. Only the compression cycles are displayed here.

Returning to the 1 wt % nickel sample seen in FIG. 21, FIG. 23 provides the actual displacement as a function of force and display a near linear relationship. The compression and decompression cycles are very similar, yet distinct due to the recovery of the constructs. After the force versus displacement curves were plotted for every sample at every wt %, the correlation was used to determine the amount of force applied from the stepper motor at each step of displacement. FIG. 24 displays the compressive force vs displacement for one sample of each magnetic material at 1 wt % within PDMS. With this information, a relationship between displacement and magnetic field strength could be modelled in future investigations.

Figure 25:
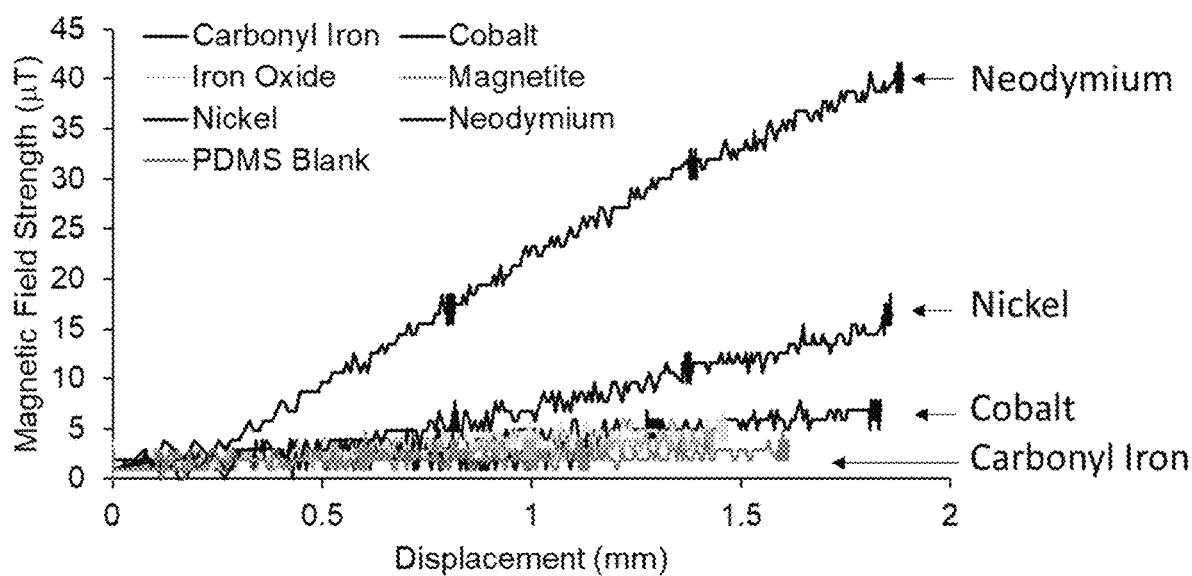
FIG. 25 show magnetic field strength as a function of displacement for one sample (n=1) of each magnetic material at 1 wt % within PDMS. Only the compression cycles are displayed here.

When implementing these soft sensors in other applications, we would like to correlate the force and displacement as a function of the magnetic field strength generated during the unknown amount of force and displacement applied. FIG. 25 depicts the relationship between displacement and magnetic field response. For example, with neodymium powder incorporated into PDMS at 1 wt %, if the sensor displayed a response of about 30 µT, we could determine the sensor was displaced about 1.4 mm. We can also determine that about 400 g of force was applied during that response when using that information and referring back to FIG. 24.

Figure 26:
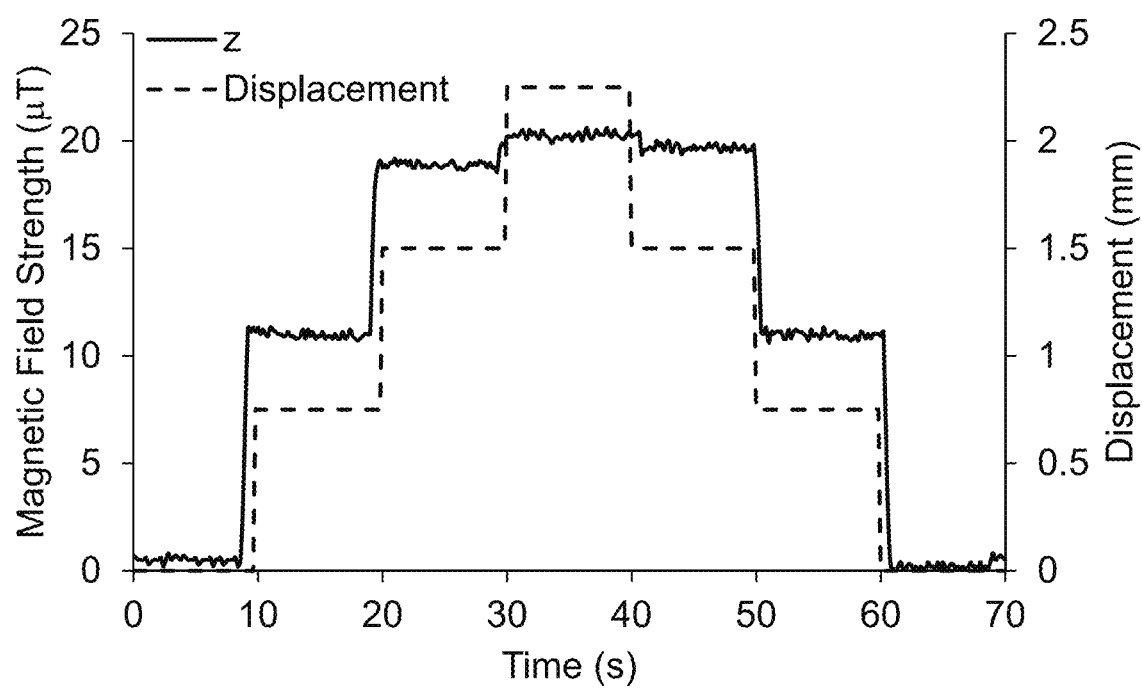
FIG. 26 show preliminary results of field strength (displayed from the z axis) and the displacement versus time of 1 wt % nickel.

FIG. 26 displays the magnetic field strength produced from the z-axis of a 1 wt % nickel sample originally tested during the preliminary studies on the stepper motor. The sample produced an average magnetic field response of 11.0, 19.3, and 20.2 µT at 0.75, 1.5, and 2.25 mm of displacement, respectively. Using the linear equation in FIG. 23 as well as the linear relationships produced from the other two 1 wt % nickel samples, we were able to determine approximately how much force was applied at each step. At 0.75 mm of displacement, roughly 190 g of force was applied while about 450 g and 700 g of force were applied at 1.5 mm and 2.25 mm steps of displacement, respectively.

Figure 27:
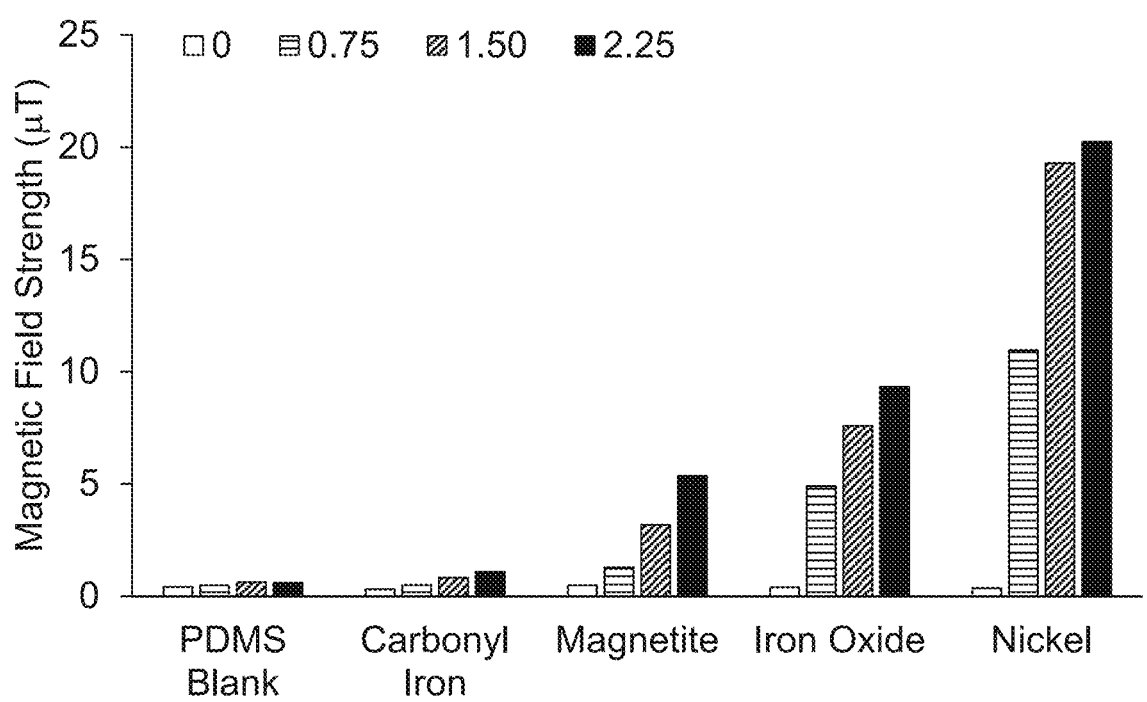
FIG. 27 is a bar graph showing magnetic field strength from materials studied during preliminary trials at 1 wt % during 0, 0.75, 1.50, and 2.25 mm of displacement.

During our initial evaluations, we were able to identify the magnetic field strength of nickel, carbonyl iron, iron oxide, and magnetite at 1 wt % within PDMS when displaced a total of 2.25 mm. Nickel provided a very strong magnetic field response of 20.25 µT (FIG. 27). Iron oxide and magnetite also displayed viable responses of 9.32 and 5.35 µT, respectively. A preliminary objective of this study was to deliver a sensitivity analysis of the lowest concentration (wt %) possible to observe a change in magnetic field strength from these ferromagnetic materials. From the initial studies depicted in FIG. 27, we can see that 1 wt % carbonyl iron only provided a response of 1.08 µT when displaced 2.25 mm by the stepper motor whereas, as illustrated in FIG. 20, it only displayed a response of 2.46 µT when displaced 1.14 mm by 600 g of force from the ElectroForce. Both of these responses were relatively close to the blank PDMS cylinders which displayed a magnetic field response of 0.61 µT in FIG. 27 and 2.27 µT in FIG. 20. This helped us determine that carbonyl iron is not providing a reliable magnetic field response when compressed and these values were likely background interference.

Similarities between the iron oxide and magnetite were evident from the initial evaluations (FIG. 27). Based on the results depicted in FIG. 20 and FIG. 22, we can see that magnetite displayed a magnetic field response of 4.11 µT when it was displaced 1.44 mm by 600 g of force. The iron oxide also provided a magnetic field response of 5.33 µT when displaced 1.45 mm by the same amount of force. If we look at the 1.50 mm bar in FIG. 27, we can see magnetite and iron oxide produced magnetic field responses of 3.17 and 7.58 µT, respectively, which is consistent with the results seen with the ElectroForce.

Figure 28:
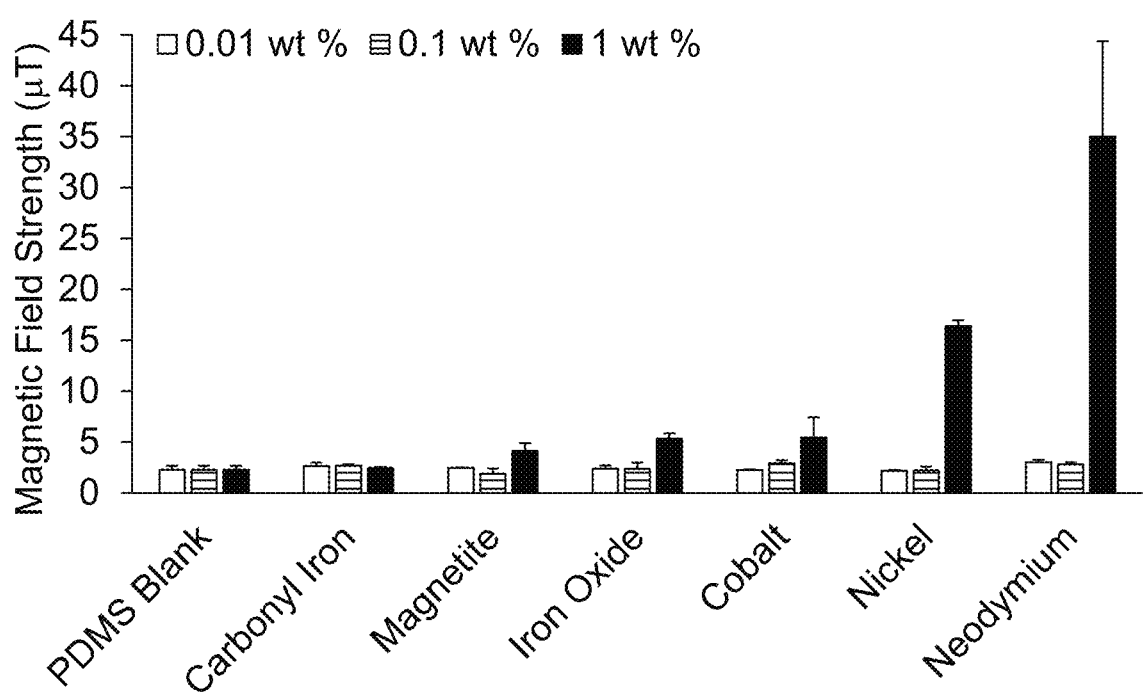
FIG. 28 is a bar graph showing magnetic field strength of all six magnetic fillers at 0.01, 0.1, and 1 wt % during 600 g of force.

As seen from FIG. 28, the lowest wt % possible for detection of these ferromagnetic fillers occurred at 1 wt % concentration for this study. At 600 g of force, neodymium and nickel only displayed readings of 2.80 and 2.22 µT at 0.1 wt %, respectively, compared to PDMS which displayed a magnetic response of 2.27 µT at 600 g of force. The remaining magnetic materials also all displayed responses below 3 µT at 0.1 wt %. This was not a reliable response for detecting magnetic field strength within constructs at 0.1 wt % or lower at 0.01 wt %.

Figure 29:
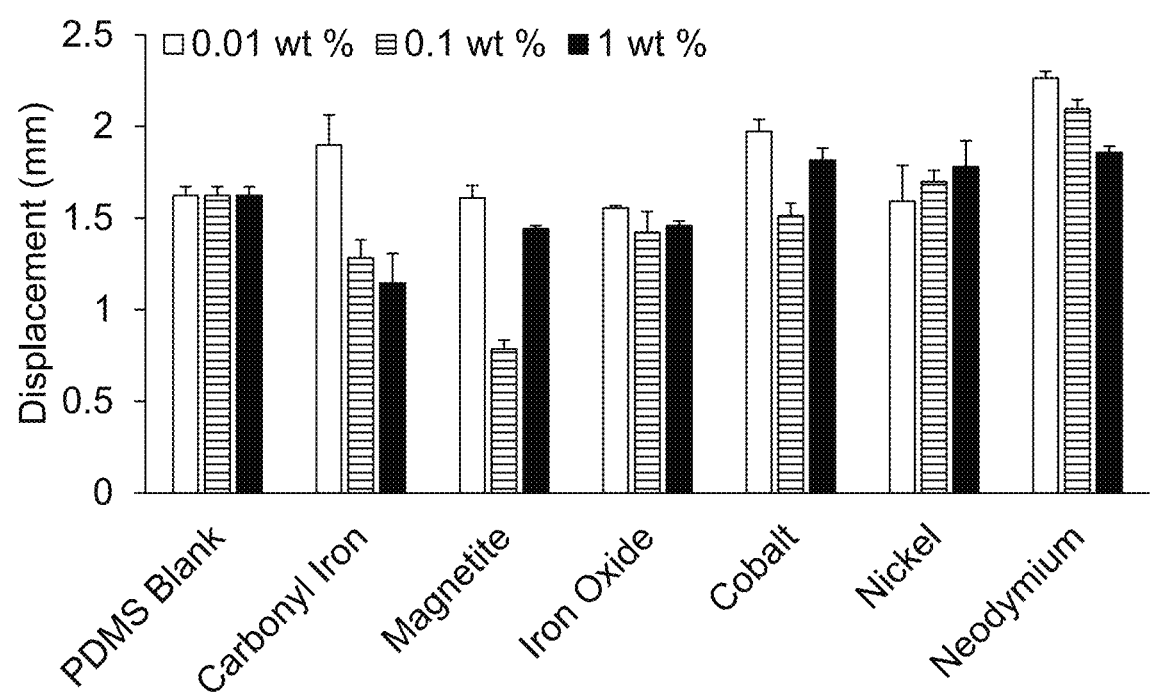
FIG. 29 is a bar graph showing displacement of all six magnetic fillers at 0.01, 0.1, and 1 wt % during 600 g of force.

The displacements of each magnetic filler material at each wt % was observed when 600 g of compressive force was applied to determine compressive strengths within PDMS. We originally hypothesized that the magnetic materials would increase the compressive modulus of PDMS, therefore making each sample more resistive to displacement as filler content increased. However, as seen in FIG. 29, we can see there are inconsistent trends of displacement between separate magnetic materials at varying wt %'s. There are a few possible causes for such altered displacements between samples. Most notably, if the w/w ratio of silicone base to curing agent is altered slightly from 15:1, this would affect material stiffness. If the ratio is lowered, the silicone will develop a higher compressive strength and be more resistive to displacement. On the other hand, if the ratio is increased, the cured silicone will have a lower compressive strength and be displaced more[40].

Figure 30:
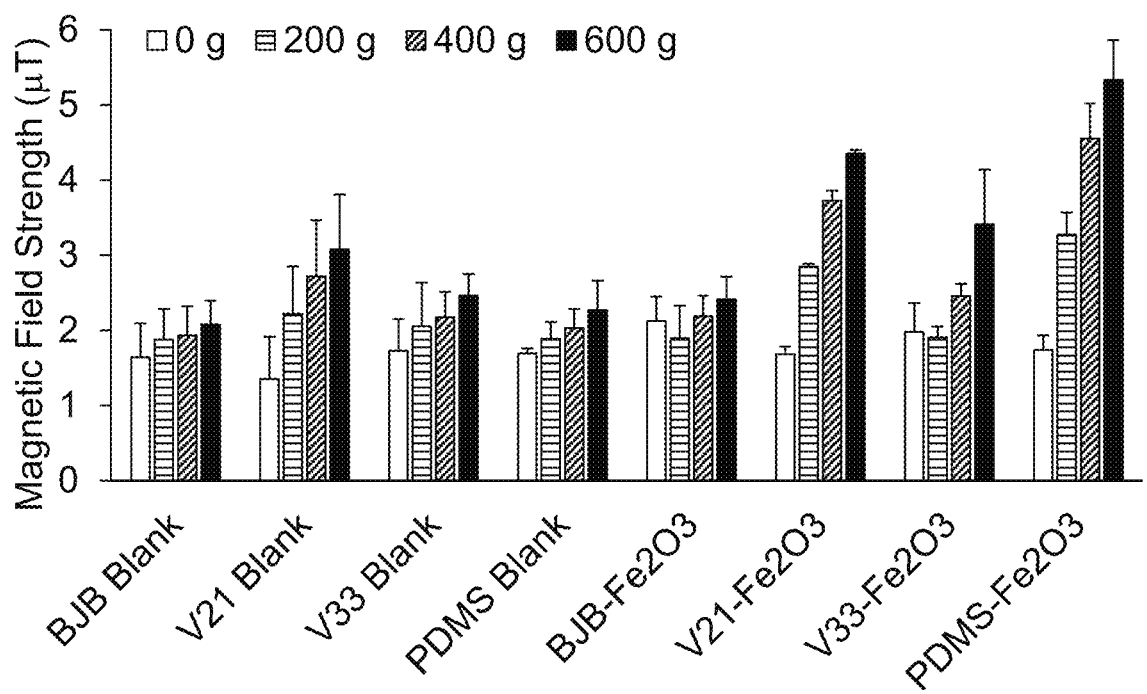
FIG. 30 is a bar graph showing magnetic field strength of blank soft materials and soft materials with 1 wt % iron oxide during 0, 200, 400, and 600 g of force.
Figure 31:
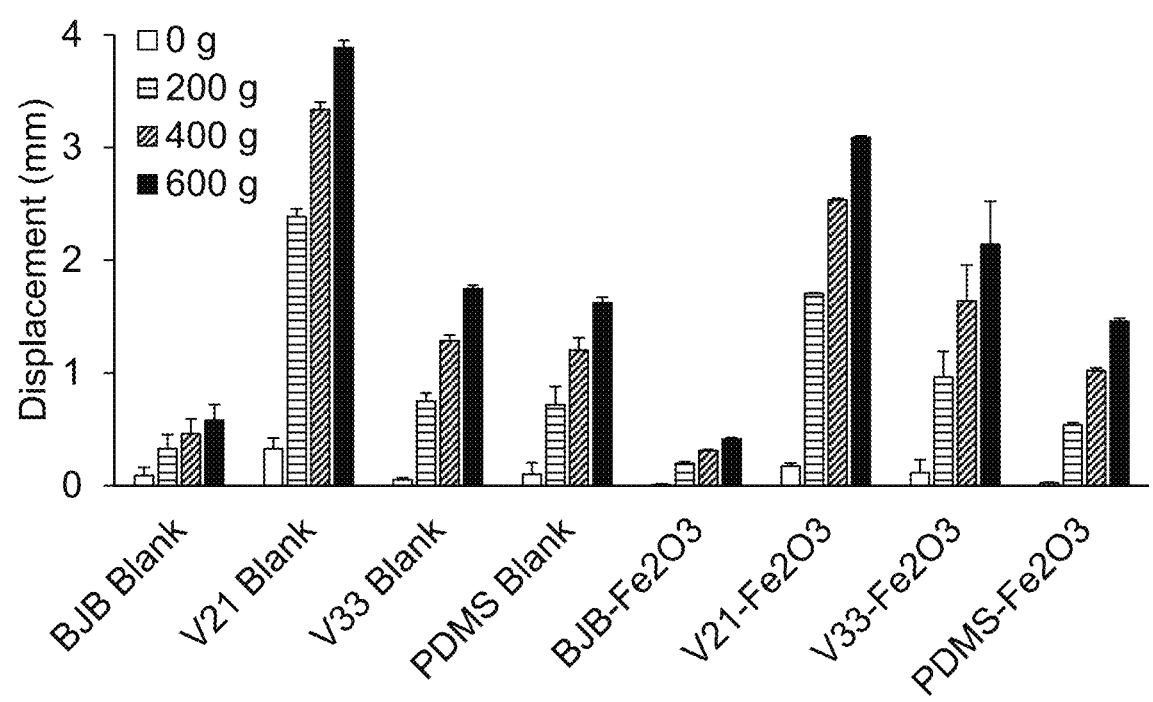
FIG. 31 is a bar graph showing displacement of blank soft materials and soft materials with 1 wt % iron oxide during 0, 200, 400, and 600 g of force.

Additional studies were conducted to explore a magnetic filler material within other soft materials. Due to its abundance and relatively low cost, iron oxide was selected as the ferromagnetic compound to be mixed with BJB, DMS-V21, and DMS-V33. FIG. 30 displays the magnetic field response from the blank soft materials with no iron oxide to establish a baseline as well as the samples with 1 wt % iron oxide. PDMS showed the highest response in magnetic field with 1 wt % iron oxide with an average reading of 5.33 µT at 600 g of compressive force. DMS-V21 presented the second highest response of 4.35 µT while DMS-V33 and BJB displayed a response of 3.41 and 2.41 µT at 600 g of force, respectively. Notably, BJB showed no promise as a soft material, but this is because the material did not compress at 600 g of force. FIG. 31 shows that the BJB-Blank and BJB-iron oxide samples were only displaced an average of 0.58 and 0.41 mm, respectively. Although the DMS-V21 and DMS-V33 showed some promise, it should be noted that the blank samples of these silicones displayed higher average magnetic readings than the PDMS and BJB. This could be due to a greater magnetic background interference from the ElectroForce's top geometry for these samples. The average displacement of the blank DMS-V21 samples were more than twice as large as the DMS-V33 and PDMS blanks. With the displacement of the DMS-V21 and DMS-V33 samples being larger than that of the PDMS, it would have also been expected that the magnetic field response of these silicones would also have been larger than PDMS when iron oxide at 1 wt % was incorporated. However, this was not the case as the PDMS-iron oxide still showed the greatest magnetic field response. Therefore, it is hypothesized that the platinum catalyst may have played a role in altering magnetic strength readings within the DMS-V21 and DMS-V33.

Figure 32:
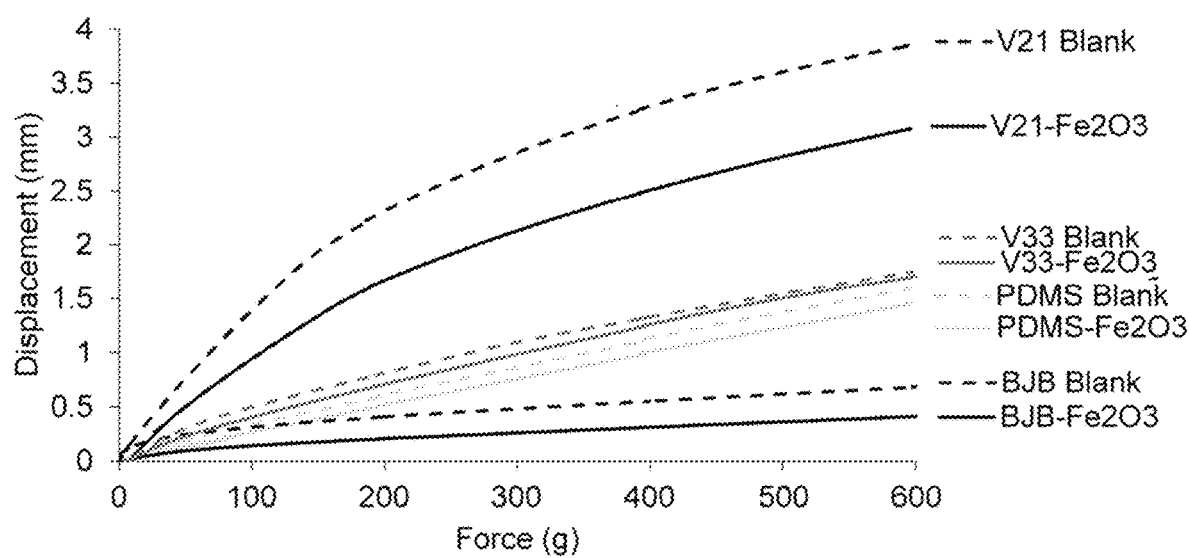
FIG. 32 show displacement as a function of force for one sample (n=1) of each soft material with and without 1 wt % iron oxide. Only the compression cycles are displayed here.

Although DMS-V21 also seemed that it would show some promise as a potential material for soft sensors, when we view FIG. 32, we can see that it does not have much compressive strength. In fact, compression cycles were originally intended to go up to 750 g of force, but DMS-V21 samples would fail around 700-750 g of force.

Settling velocities of magnetic particles was also investigated, since settling became evident during mixing of neodymium within PDMS at 1 wt %. In order to calculate settling time and viscosities, densities and viscosities of the siloxanes and their curing agent at specific weight-to-weight ratios were required. Mixture density, $\rho$, was calculated as the summation of the mass fraction, x, multiplied by the density of each component as seen in Equation 1[42].

$$\rho_n = \Sigma(x_i * \rho_i)_n \quad (1)$$

Equation 2 was used to calculate the natural log of the mixture viscosity, $\square$, as the natural log of each component's viscosity multiplied by its mass fraction[43].

$$\ln \eta = x_1 \ln \eta_1 + x_2 \ln \eta_2 \quad (2)$$

Table 3 provides the estimated densities and viscosities of DMS-V21, DMS-V33, and PDMS calculated from Equations 1 and 2 at a 15:1 w/w ratio with Sylgard 184 curing agent.

TABLE 3

Estimated mixture densities and viscosities of silicones at 15:1 w/w ratio with Sylgard 184 curing agent.

| Soft Material | Estimated Mixture Density (kg/m³) | Estimated Mixture Viscosity (cSt) |
|---|---|---|
| DMS-V21 | 975 | 100 |
| DMS-V33 | 975 | 2,820 |
| PDMS | 1105 | 3,940 |

After mixture densities and viscosities were determined, settling velocity, v, was estimated using Stokes Law. Assumptions were made before estimating each settling velocity. These assumptions were as follows: laminar flow where the Reynolds number is less than 0.3, homogenous mixtures, particles were spherical with smooth surfaces, and no particle-particle interactions. These assumptions combined to form Equation 3 from Stokes Law to solve for the settling viscosities of carbonyl iron, iron oxide, magnetite, and neodymium[44].

$$v = \frac{2(\rho_p - \rho_s)}{9\mu} g R^2 \quad (3)$$

Since nickel and cobalt were both cylindrical, a modified relationship from Stokes Law of flow of spherical particles is formed[45]. Equation 4 accounts for the correlation between the cylinder's length, L, and diameter, D.

$$v = \frac{0.0790(\rho_p - \rho_s)}{\mu} g L^2 \left(\frac{L}{D}\right)^{-1.664} \quad (4)$$

Figure 33:
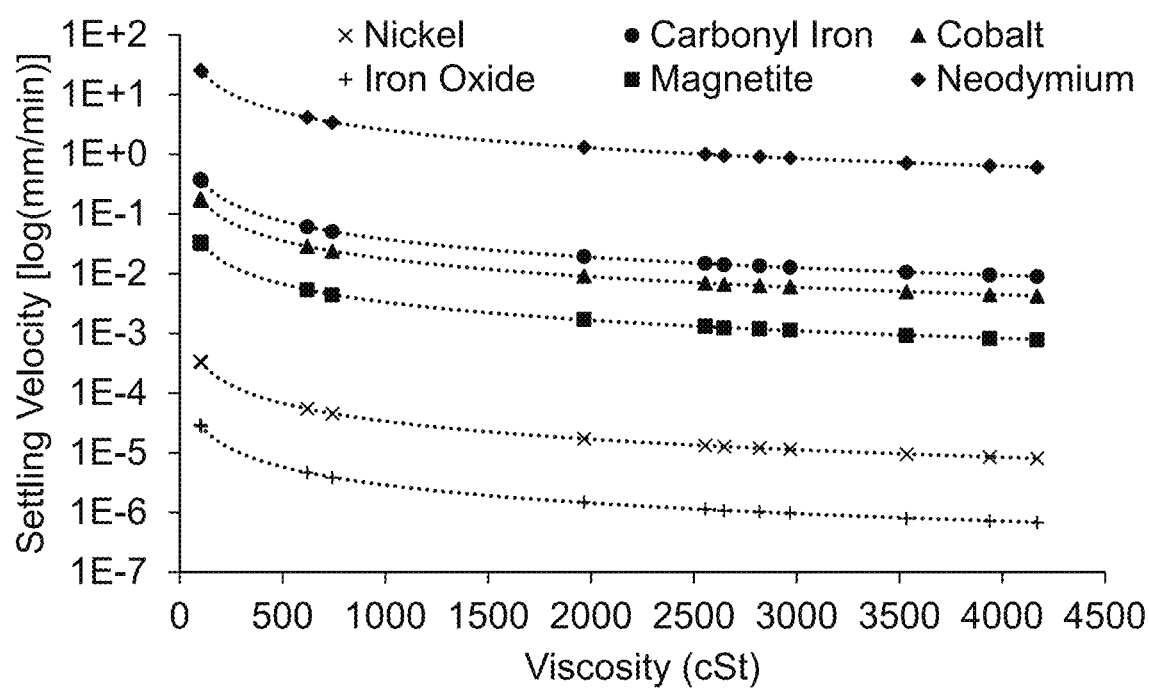
FIG. 33 show the estimated settling velocities of magnetic particles within solutions of varying viscosities.

FIG. 33 presents the estimated settling velocity of all six ferromagnetic particles within a varying range of viscosity from 100-4,170 cSt. All of the materials except for the neodymium display a settling velocity of less than 0.40 mm/min in solutions with a viscosity of 100 cSt. Therefore, these particles were all considered to have settling velocities near zero within PDMS during the curing process. Even iron oxide's settling velocity was approximately zero within DMS-V21, which had an estimated viscosity of 100 cSt. However, the neodymium displays a settling velocity range from 0.60 mm/min to 25.60 mm/min in solutions with a viscosity of nearly 4,170 and 100 cSt, respectively. Therefore, neodymium's settling velocity could not be ignored during the curing process as it would take about 15 minutes for neodymium particles to settle within PDMS with a viscosity of 4,000 cSt.

Figure 34:
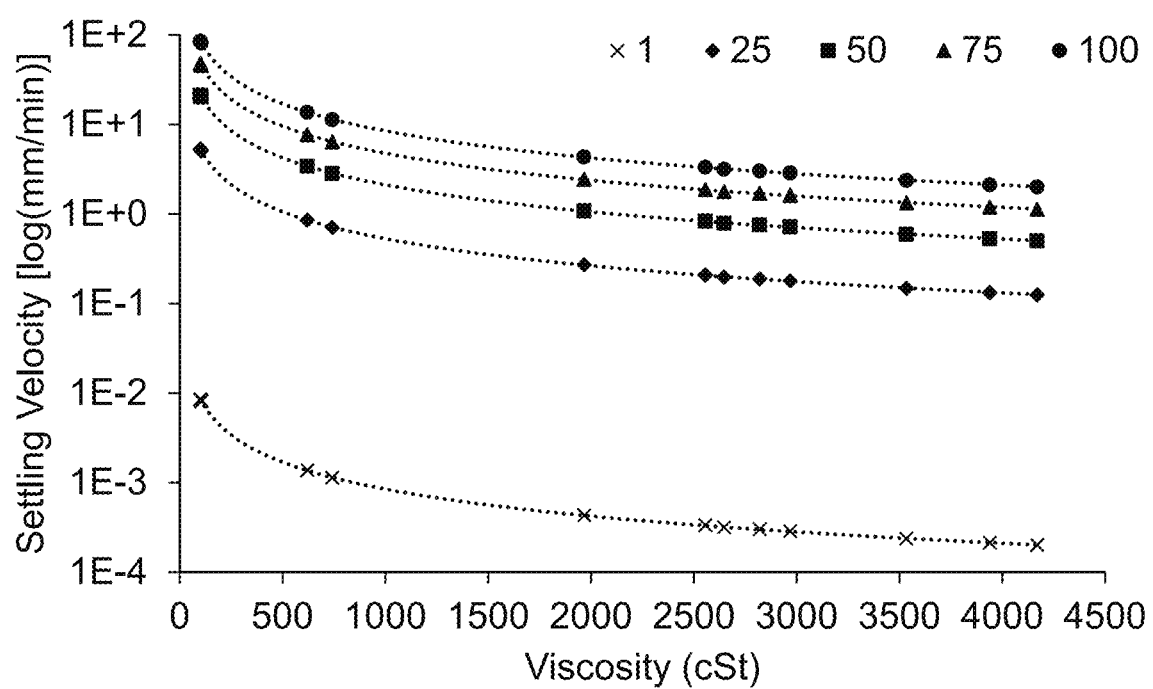
FIG. 34 show the estimated settling velocities of differing particle sizes (1, 25, 50, 75, and 100 mm) of neodymium within solutions of varying viscosities.
Figure 35:
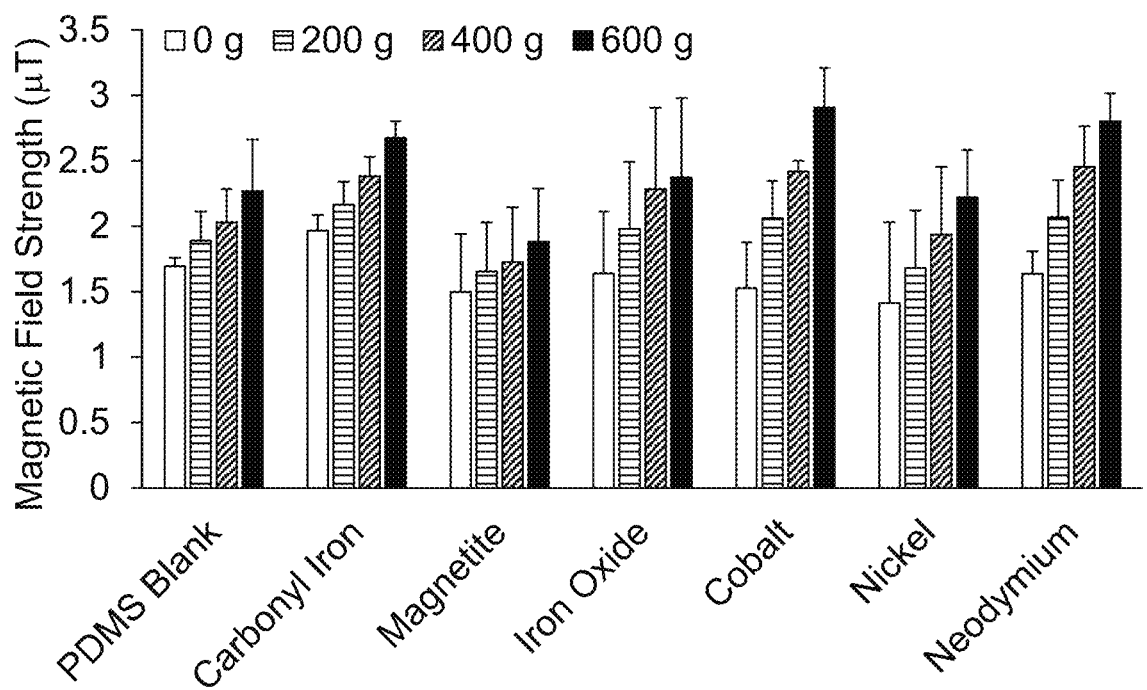
FIG. 35 is a bar graph showing magnetic field strength from all six magnetic fillers at 0.1 wt % during 0, 200, 400, and 600 g of force.
Figure 36:
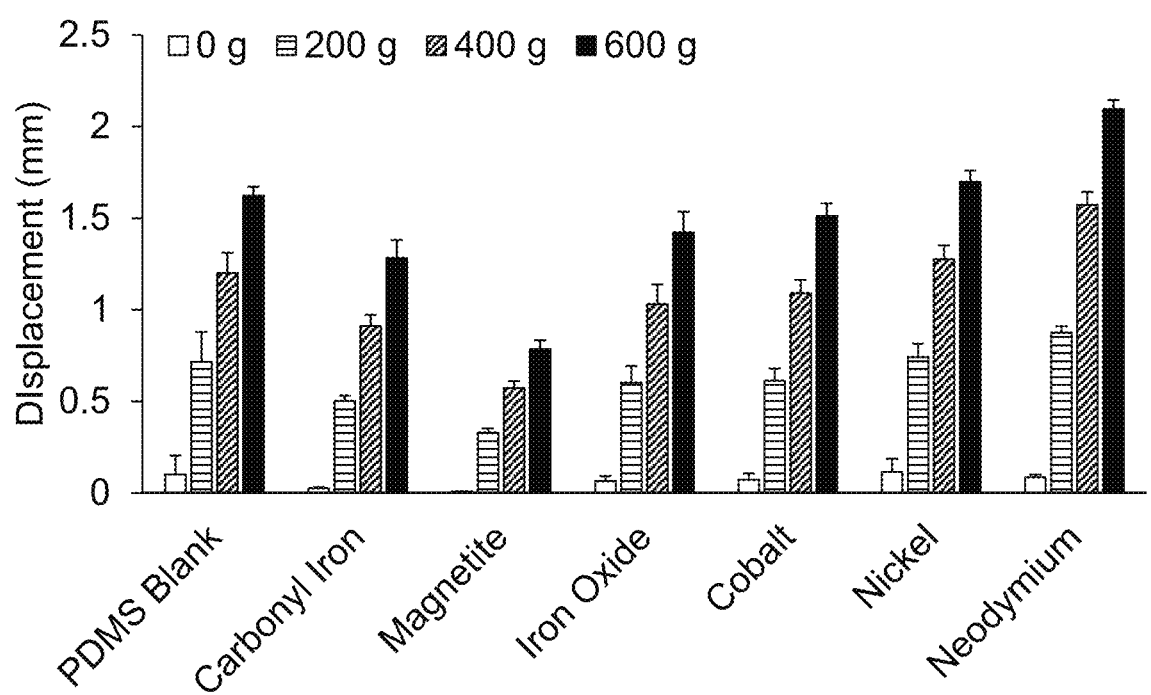
FIG. 36 is a bar graph showing displacement of all six magnetic fillers at 0.1 wt % during 0, 200, 400, and 600 g of force.
Figure 37:
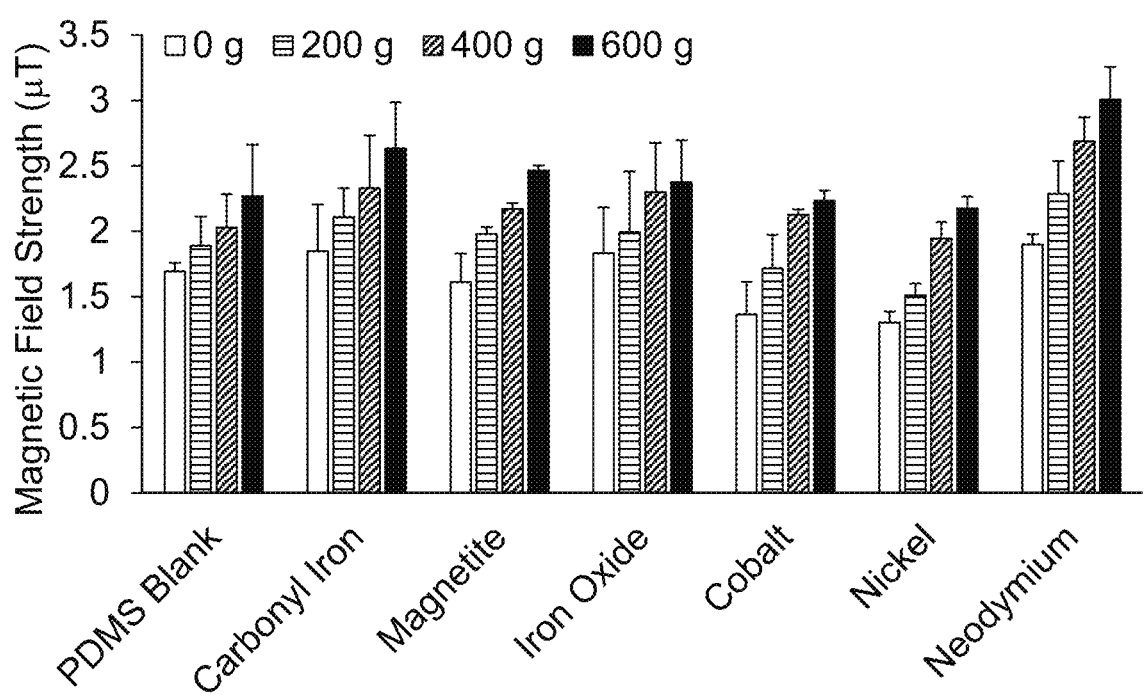
FIG. 37 is a bar graph showing magnetic field strength from all six magnetic fillers at 0.01 wt % during 0, 200, 400, and 600 g of force.
Figure 38:
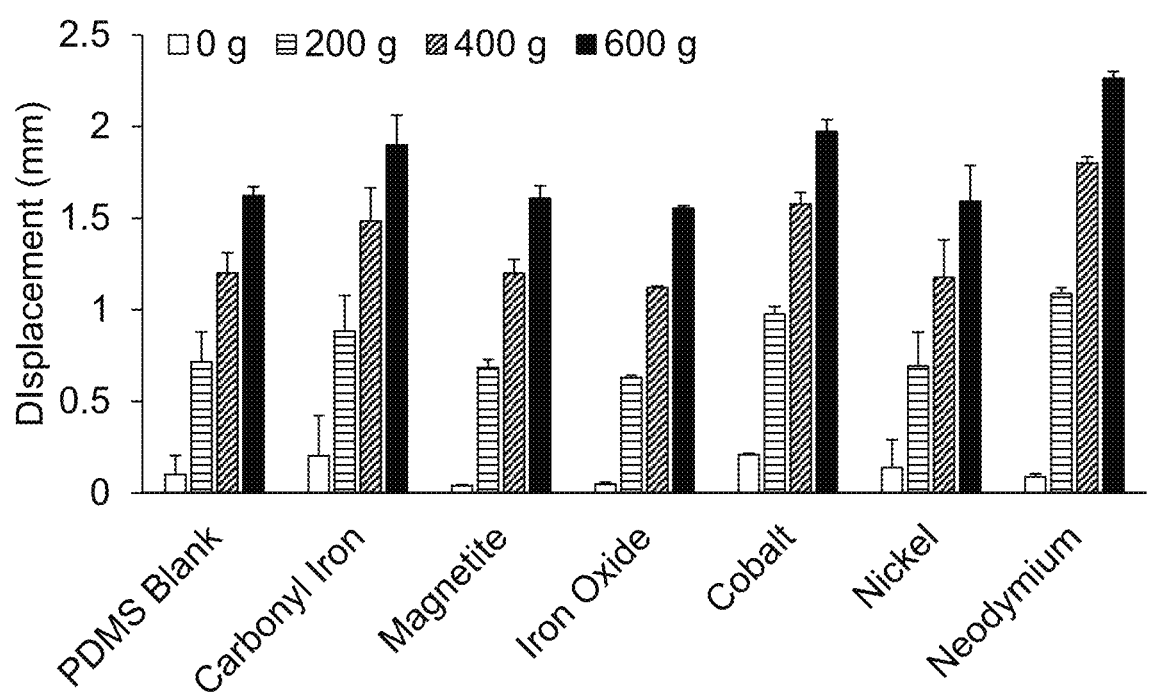
FIG. 38 is a bar graph showing displacement of all six magnetic fillers at 0.01 wt % during 0, 200, 400, and 600 g of force.
Figure 39:
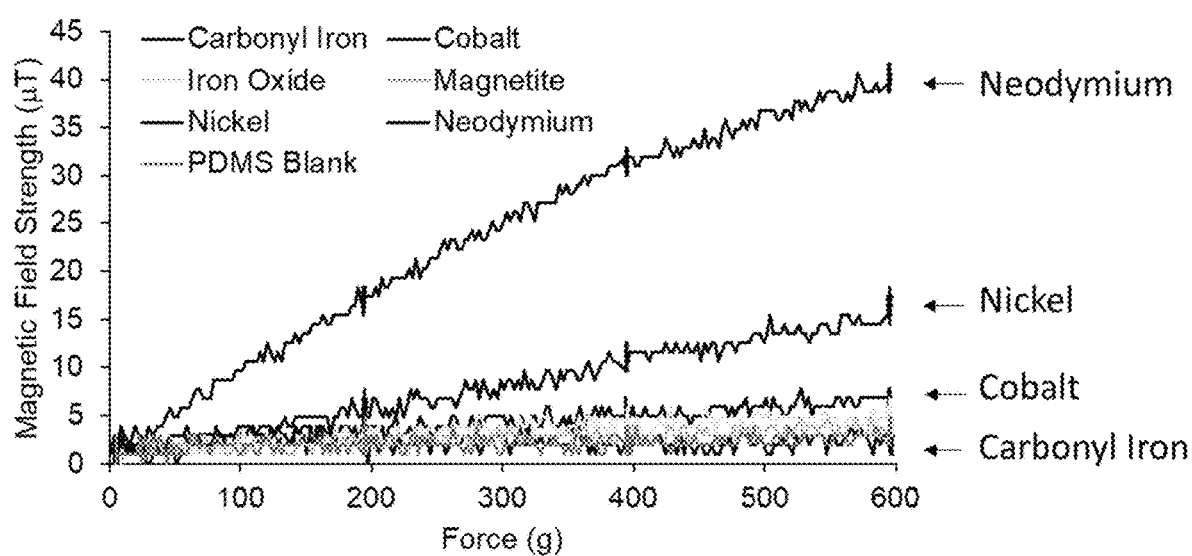
FIG. 39 show the magnetic field strength as a function of force for one sample (n=1) of each magnetic material at 1 wt % within PDMS. Only the compression cycles are displayed here.

The neodymium had an average particle size of 50-60 µm so we wanted to investigate the acceptable range of particle sizes within varying viscosities so that neodymium's settling velocity could then be assumed to zero. FIG. 34 presents an estimated settling velocity for varying particle sizes of neodymium of 0, 25, 50, 75, and 100 µm in solutions with a viscosity range of 100-4,170 cSt. Only neodymium particle sizes of 25 µm or less could be considered to have an assumed settling velocity of approximately zero in solutions with a viscosity of 2,000 cSt or more.

CONCLUSIONS

We were able to identify that 1 wt % was the minimum required concentration of magnetic filler to detect a magnetic response from compressive forces and displacement for nickel nanorods, cobalt nanowires, iron oxide nanopowder, magnetite powder, and neodymium powder incorporated within PDMS. However, this was not the case for the carbonyl iron microspheres integrated within PDMS as there was no viable magnetic response generated at 1 wt %.

Overall, the 1 wt % neodymium-PDMS cylindrical constructs showed the greatest magnetic field response when compressed at 600 g of force. However, the particles were also much larger than the other magnetic materials. Even in PDMS at a 15:1 w/w ratio of base to curing agent, which has an approximate viscosity of 3,900-4,000 cSt, the neodymium settled at a rate of 0.64 mm/min. Therefore, moving forward, smaller neodymium particles should be evaluated.

The PDMS also displayed the most desirable properties and relationship between force and displacement with and without the magnetic fillers. Without any magnetic materials incorporated, the PDMS and DMS-V21 exhibited similar Young's moduli which were the most favorable as they were compressible, unlike the BJB, but they were also resistive enough to not reach their ultimate strength at lower forces like the DMS-V21. However, the PDMS was more desirable than the DMS-V33 because of the magnetic field response generated when 1 wt % iron oxide was incorporated into the materials and compressed.

Although the neodymium powder displayed the strongest magnetic field response, it was also the largest particle compared to the nickel nanorods, carbonyl iron microspheres, cobalt nanowires, and iron oxide nanopowder, magnetite powder. Therefore, they displayed a settling rate far exceeding the other materials. Since it cannot be assumed that the settling rate of neodymium was zero during the curing process, it would be important for further investigations to assess the magnetic field strength of neodymium particles at a much smaller size, on the order of 25 µm or less.

Rheological analyses will be vital in understanding the ability that these ferromagnetic fillers have on additive manufacturing techniques such as 3D printing. Although a certain magnetic particle like the neodymium displayed favorable magnetic field response, it may not be favorable for 3D printing techniques such as DIW. In order to display the rheological prerequisites for desirable 3D printing techniques like DIW, the inks need to be of suitable sizes as not to obstruct the extrusion heads during manufacturing. Inks also need to have a certain viscosity range of 0.1 to 1,000 Pa/s[35, 46-48]. Therefore, it would be important to continue analyzing different magnetic materials at altered wt %'s and within varying viscous silicones (i.e., DMS-V21, DMS-V33, and PDMS with varying w/w ratios of base to curing agent).

Investigating these different silicones at varying w/w ratios would provide important information. Our findings and those of others suggest that even if certain ratios of each silicone composite display similar viscosities, their storage and loss moduli may still be very different. DIW inks need to have the ability to flow at a lower viscosity when placed under a shear force, meaning that the loss modulus needs to be greater than the storage modulus. However, it's imperative that DIW inks then have the ability to rapidly heal after extrusion so they recover after the shear force is removed, which means the storage modulus is now greater than the loss modulus. The faster the recovery, the more desirable the ink becomes especially since shear thinning are extremely common in soft materials[36].

Aside from utilizing these magnetically infused polymers in DIW printing, the ferromagnetic materials can be incorporated into photopolymerizable resins. This would explore the ability to print magnetic structures from these resins through stereolithography (SLA) printing. Minor inquiries were made into incorporating magnetic fillers into resins, but they became too opaque to crosslink at heights above 2-3 mm using an ultraviolet lamp. Future investigations would include the ability to an electromagnet within the SLA printer as well as printing or crosslinking in smaller and more consistent heights of about 100 μm.

Example 3: 3D Printed Silicone Cushions Using NuSil R40

The Berkland Laboratory at the University of Kansas has been investigating ferromagnetic compounds in silicone cushions that may be sensed remotely in order to identify those compounds with the highest potential for commercial utilization in a number of technical applications such as wireless sensors. 3D printed silicone cushions using NuSil R40 were prepared and the magnetic properties of nickel nanorods suspended in the NuSil R40 were evaluated.

Figure 12:
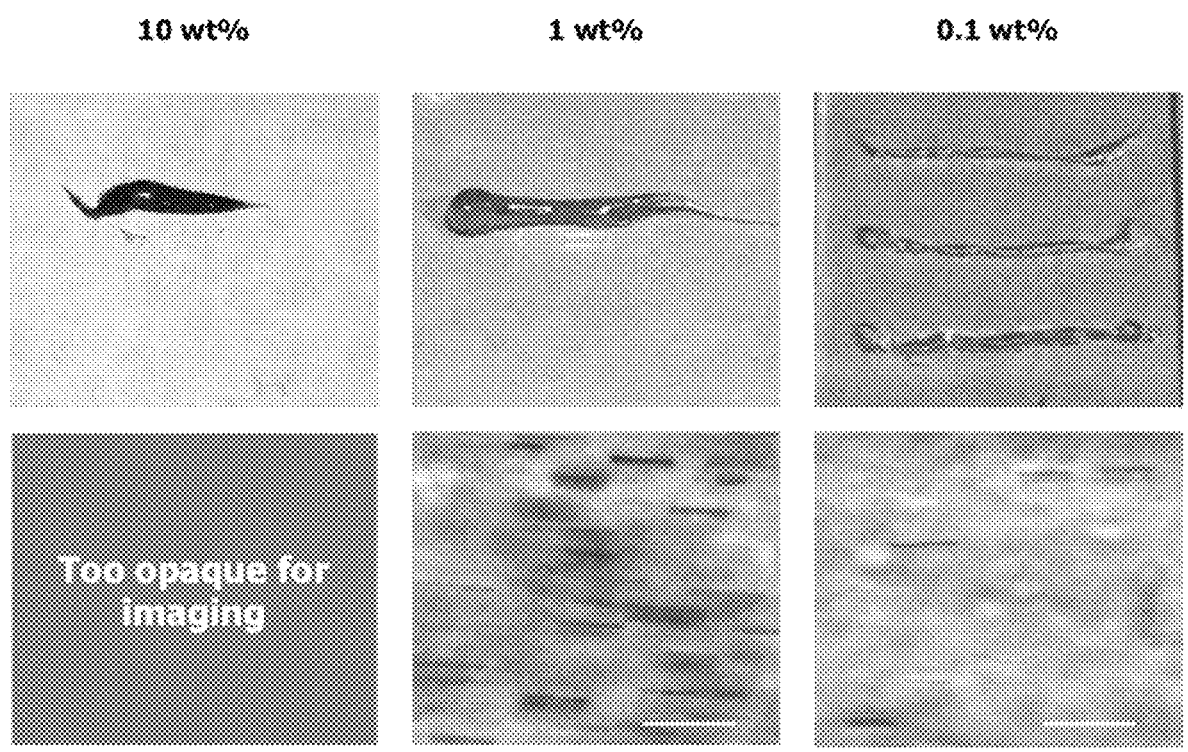
FIG. 12 show extrusion tests of nickel nanorods in NuSil R40 at 0.1, 1, and 10 wt %. The scale bars are equal to 20 μm. 13
Figure 13:
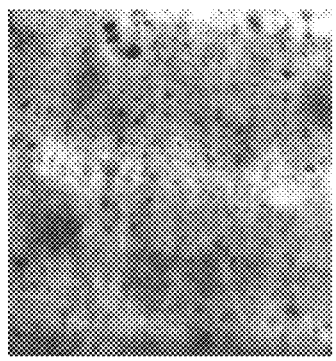
FIG. 13 show microscope imaging of 1 wt % (small=1-4 μm [left], medium=4-8 μm [middle], and large=8-12 μm [right]) nickel nanorods in NuSil R40.
Figure 13:
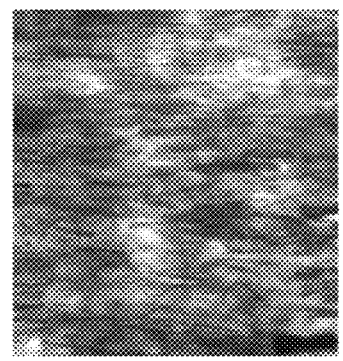
Figure 13:
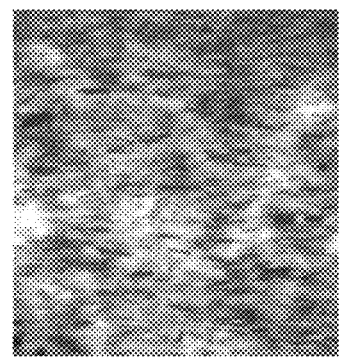

It was determined that the nickel nanorods extruded well in the silicone inks (10 wt %, 1 wt %, and 0.1 wt % concentrations of nickel nanorods in NuSil R40) and aligned in the direction of flow (FIG. 12). NuSil R40 extrusion tests were also performed using 1 wt % nickel nanorods of varying lengths, specifically categorized as small (1-4 μm), medium (4-8 μm), and large (8-12 μm) (FIG. 13).

REFERENCES

1. Frutiger, A.; Muth, J. T.; Vogt, D. M.; Mengiic, Y.; Campo, A.; Valentine, A. D.; Walsh, C. J.; Lewis, J. A., Capacitive Soft Strain Sensors via Multicore-Shell Fiber Printing. *Advanced Materials* 2015, 27 (15), 2440-2446.
2. Martin, J. J.; Fiore, B. E.; Erb, R. M., Designing bioinspired composite reinforcement architectures via 3D magnetic printing. *Nature Communications* 2015, 6 (1), 8641.
3. Darabi, M. A.; Khosrozadeh, A.; Mbeleck, R.; Liu, Y.; Chang, Q.; Jiang, J.; Cai, J.; Wang, Q.; Luo, G.; Xing, M., Skin-Inspired Multifunctional Autonomic-Intrinsic Conductive Self-Healing Hydrogels with Pressure Sensitivity, Stretchability, and 3D Printability. *Advanced Materials* 2017, 29 (31), 1700533.
4. Zeng, W.; Shu, L.; Li, Q.; Chen, S.; Wang, F.; Tao, X. M., Fiber-Based Wearable Electronics: A Review of Materials, Fabrication, Devices, and Applications. *Advanced Materials* 2014, 26 (31), 5310-5336.
5. Pang, C.; Lee, C.; Suh, K. Y., Recent advances in flexible sensors for wearable and implantable devices. 2013; Vol. 130, pp 1429-1441.
6. Vaidya, U. K.; Chawla, K. K., Processing of fibre reinforced thermoplastic composites. 2008; Vol. 53, pp 185-218.
7. Mouritz, A. P.; Bannister, M. K.; Falzon, P. J.; Leong, K. H., Review of applications for advanced three-dimensional fibre textile composites. *Composites Part A* 1999, 30 (12), 1445-1461.
8. Benjamin, C. K. T.; Chao, W.; Ranulfo, A.; Zhenan, B., An electrically and mechanically self-healing composite with pressure- and flexion-sensitive properties for electronic skin applications. *Nature Nanotechnology* 2012, 7 (12), 825.
9. Rashid, A.; Hasan, O., Wearable technologies for hand joints monitoring for rehabilitation: A survey. *Microelectronics Journal* 2019, 88, 173-183.
10. Mirzanejad, H.; Agheli, M., Soft force sensor made of magnetic powder blended with silicone rubber. *Sensors and Actuators A: Physical* 2019, 293, 108-118.
11. Mirzanej ad, H.; Tabrizi, M. M.; Fathian, A.; Sharifnej ad, A.; Agheli, M. In *A New Soft Force Sensor using Blended Silicone-Magnetic powder*, 2017 5th RSI International Conference on Robotics and Mechatronics (ICRoM), 25-27 Oct. 2017; 2017; pp 150-155.
12. Hongbo, W.; de Boer, G.; Junwai, K.; Alazmani, A.; Ghajari, M.; Hewson, R.; Culmer, P., Design Methodology for Magnetic Field-Based Soft Tri-Axis Tactile Sensors. *Sensors* (Ser. No. 14/248,220) 2016, 16 (9), 1356.
13. Jamone, L.; Metta, G.; Nori, F.; Sandini, G. In *James: A Humanoid Robot Acting over an Unstructured World*, 2006 6th IEEE-RAS International Conference on Humanoid Robots, 4-6 Dec. 2006; 2006; pp 143-150.
14. Kou, H.; Zhang, L.; Tan, Q.; Liu, G.; Dong, H.; Zhang, W.; Xiong, J., Wireless wide-range pressure sensor based on graphene/PDMS sponge for tactile monitoring. *Scientific Reports* 2019, 9 (1), 3916.
15. Alex, C.; Jia, L.; Zhenan, B., Pursuing prosthetic electronic skin. *Nature Materials* 2016, 15 (9).
16. Ho-Hsiu, C.; Amanda, N.; Alex, C.; John, W. F. T.; Chien, L.; Jianguo, M.; Tadanori, K.; Won-Gyu, B.; Jeffrey, B. H. T.; Zhenan, B., A chameleon-inspired stretchable electronic skin with interactive colour changing controlled by tactile sensing. *Nature Communications* 2015, 6 (1).
17. Wang, X.; Gu, Y.; Xiong, Z.; Cui, Z.; Zhang, T., Silk-Molded Flexible, Ultrasensitive, and Highly Stable Electronic Skin for Monitoring Human Physiological Signals. *Advanced Materials* 2014, 26 (9), 1336-1342.
18. Ho, D. H.; Sun, Q.; Kim, S. Y.; Han, J. T.; Kim, D. H.; Cho, J. H., Stretchable and Multimodal All Graphene Electronic Skin. *Advanced Materials* 2016, 28 (13), 2601-2608.
19. Donghee, S.; Jongha, L.; Shutao, Q.; Roozbeh, G.; Jaemin, K.; Ji Eun, L.; Changyeong, S.; Seok Joo, K.; Dong Jun, L.; Samuel Woojoo, J.; Shixuan, Y.; Minjoon, P.; Jiho, S.; Kyungsik, D.; Mincheol, L.; Kwanghun, K.; Cheol Seong, H.; Nanshu, L.; Taeghwan, H.; Dae-Hyeong, K., Multifunctional wearable devices for diagnosis and therapy of movement disorders. *Nature Nanotechnology* 2014, 9 (5), 397.
20. Patel, M. S.; Asch, D. A.; Volpp, K. G., Wearable Devices as Facilitators, Not Drivers, of Health Behavior Change. *JAMA* 2015, 313 (5).
21. Haghi, M.; Thurow, K.; Stoll, R., Wearable Devices in Medical Internet of Things: Scientific Research and Commercially Available Devices. *Healthcare informatics research* 2017, 23 (1), 4-15.
22. Kappassov, Z.; Corrales, J.-A.; Perdereau, V., Tactile sensing in dexterous robot hands—Review. *Robotics and Autonomous Systems* 2015, 74, 195-220.
23. Kyberd, P. J.; Chappell, P. H., A force sensor for automatic manipulation based on the Hall effect. *Measurement Science and Technology* 1993, 4 (3), 281-287.
24. Low, J. H.; Khin, P. M.; Yeow, C. H. In *A pressure-redistributing insole using soft sensors and actuators*, 25. Mengiic, Y.; Park, Y.; Martinez-Villalpando, E.; Aubin, P.; Zisook, M.; Stirling, L.; Wood, R. J.; Walsh, C. J. In *Soft wearable motion sensing suit for lower limb biomechanics measurements*, 2013 IEEE International Conference on Robotics and Automation, 6-10 May 2013; 2013; pp 5309-5316.

26. Chathuranga, D. S.; Wang, Z.; Noh, Y.; Nanayakkara, T.; Hirai, S. In *Disposable soft 3 axis force sensor for biomedical applications*, 2015 37th Annual International Conference of the IEEE Engineering in Medicine and Biology Society (EMBC), 25-29 Aug. 2015; 2015; pp 5521-5524.

27. Hallali, N.; Clerc, P.; Fourmy, D.; Gigoux, V.; Carrey, J., Influence on cell death of high frequency motion of magnetic nanoparticles during magnetic hyperthermia experiments. *Applied Physics Letters* 2016, 109 (3), 032402.

28. Lee, J.-J.; Jeong, K. J.; Hashimoto, M.; Kwon, A. H.; Rwei, A.; Shankarappa, S. A.; Tsui, J. H.; Kohane, D. S., Synthetic Ligand-Coated Magnetic Nanoparticles for Microfluidic Bacterial Separation from Blood. *Nano Letters* 2014, 14 (1), 1-5.

29. Liu, L.; Yu, P.; Zhang, Y.; Wu, B.; Cui, C.; Wu, M.; Wang, C.-X.; Zhuo, R.-X.; Huang, S.-W., Doxorubicin-conjugated magnetic iron oxide nanoparticles for pH-sensitive and magnetic responsive drug delivery. *Journal of Controlled Release* 2015, 213, e67-e67.

30. Frey, N. A.; Peng, S.; Cheng, K.; Sun, S., Magnetic nanoparticles: synthesis, functionalization, and applications in bioimaging and magnetic energy storage. *Chemical Society Reviews* 2009, 38 (9), 2532-2542.

31. Jedlovszky-Hajdú, A.; Tombácz, E.; Bányai, I.; Babos, M.; Palkó, A., Carboxylated magnetic nanoparticles as MRI contrast agents: Relaxation measurements at different field strengths. *Journal of Magnetism and Magnetic Materials* 2012, 324 (19), 3173-3180.

32. Schwartz, G.; Tee, B. C. K.; Mei, J.; Appleton, A. L.; Kim, D. H.; Wang, H.; Bao, Z., Flexible polymer transistors with high pressure sensitivity for application in electronic skin and health monitoring. *Nature Communications* 2013, 4 (1), 1859.

33. Puangmali, P.; Liu, H.; Seneviratne, L. D.; Dasgupta, P.; Althoefer, K., Miniature 3-Axis Distal Force Sensor for Minimally Invasive Surgical Palpation. *IEEE/ASME Transactions on Mechatronics* 2012, 17 (4), 646-656.

34. Chatzipirpiridis, G.; Erne, P.; Ergeneman, O.; Pané, S.; Nelson, B. J. In *A magnetic force sensor on a catheter tip for minimally invasive surgery*, 2015 37th Annual International Conference of the IEEE Engineering in Medicine and Biology Society (EMBC), 25-29 Aug. 2015; 2015; pp 7970-7973.

35. Paxton, N.; Smolan, W.; Bock, T.; Melchels, F.; Groll, J.; Jungst, T., Proposal to assess printability of bioinks for extrusion-based bioprinting and evaluation of rheological properties governing bioprintability. Biofabrication 2017, 9 (4), 044107.

36. Chen, D. T. N.; Wen, Q.; Janmey, P. A.; Crocker, J. C.; Yodh, A. G., Rheology of Soft Materials. *Annual Review of Condensed Matter Physics* 2010, 1 (1), 301-322.

37. Gul, J. Z.; Sajid, M.; Rehman, M. M.; Siddiqui, G. U.; Shah, I.; Kim, K.-H.; Lee, J.-W.; Choi, K. H., 3D printing for soft robotics—a review. *Sci Technol Adv Mater* 2018, 19 (1), 243-262.

38. Kim, Y.; Yuk, H.; Zhao, R.; Chester, S. A.; Zhao, X., Printing ferromagnetic domains for untethered fast-transforming soft materials. *Nature* 2018, 558 (7709), 274-279.

39. Schmid, H.; Michel, B., Siloxane Polymers for High-Resolution, High-Accuracy Soft Lithography. *Macromolecules* 2000, 33 (8), 3042-3049.

40. Wang, Z.; Volinsky, A. A.; Gallant, N. D., Crosslinking effect on polydimethylsiloxane elastic modulus measured by custom-built compression instrument. *Journal of Applied Polymer Science* 2014, 131 (22).

41. Bentley, A. K.; Farhoud, M.; Ellis, A. B.; Nickel, A.-M. L.; Lisensky, G. C.; Crone, W. C., Template Synthesis and Magnetic Manipulation of Nickel Nanowires. *Journal of Chemical Education* 2005, 82 (5), 765.

42. Perry, R.; Green, D., *Perry's Chemical Engineers' Handbook, Eighth Edition*. McGraw-Hill Education: 2008.

43. Bloomfield, V. A.; Dewan, R. K., Viscosity of liquid mixtures. *The Journal of Physical Chemistry* 1971, 75 (20), 3113-3119.

44. Lamb, H., *Hydrodynamics*. Dover publications: New York, 1945.

45. Komar, P. D., Settling Velocities of Circular Cylinders at Low Reynolds Numbers. *The Journal of Geology* 1980, 88 (3), 327-336.

46. Li, L.; Lin, Q.; Tang, M.; Duncan, A. J. E.; Ke, C., Advanced Polymer Designs for Direct-Ink-Write 3D Printing. *Chemistry—A European Journal* 2019, 25 (46), 10768-10781.

47. Hölzl, K.; Lin, S.; Tytgat, L.; Van Vlierberghe, S.; Gu, L.; Ovsianikov, A., Bioink properties before, during and after 3D bioprinting. *Biofabrication* 2016, 8 (3), 032002.

48. Lewis, J. A., Direct Ink Writing of 3D Functional Materials. *Advanced Functional Materials* 2006, 16 (17), 2193-2204.

Example 4: Shoe Soles to Detect the Displacement and Force

Using wireless triple axis accelerometer and magnetometer via Bluetooth or another wireless connection would allow for the possibility to incorporate sensors directly into the silicones or polymers themselves. Larger constructs could be built in 12 well plates or even petri dishes depending on the size of the remote wireless magnetometer. There is then the possibility of integrating these larger constructs into shoe soles to detect the displacement and force of the person walking based on the magnetic field strength generated from the magnetic particles that are then detected from the sensor within the composite. However, because the placement of the sensor-containing composite in the sole faces repeated force and displacement, it may also be better to place the wireless magnetometer in close proximity to the magnetic composite (i.e., the tongue of the shoe) as to not break the sensor due to repeated compression of the shoe soles. In this case, it would also be important to develop a more formal relationship between the force and displacement of the materials against their magnetic field response. That way, the force and the displacement could be determined from the magnetic field response received by the magnetometer. This technology could be then utilized to help predict possible injuries from repeated stress and strain within people and potentially professional athletes.

The compositions, devices, systems, and methods of the appended claims are not limited in scope by the specific compositions, devices, systems, and methods described herein, which are intended as illustrations of a few aspects of the claims. Any compositions, devices, systems, and methods that are functionally equivalent are intended to fall within the scope of the claims. Various modifications of the compositions, devices, systems, and methods in addition to those shown and described herein are intended to fall within the scope of the appended claims. Further, while only certain representative compositions, devices, systems, and method steps disclosed herein are specifically described, other combinations of the compositions, devices, systems, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A system comprising a 3-dimensional article formed from a composition comprising an elastomeric resin, and a population of anisotropic magnetic particles dispersed within the elastomeric resin, wherein the anisotropic magnetic particles are aligned and/or oriented within the article; and
   a magnetometer or a Hall Effect sensor, configured to interrogate the magnetic field strength within the article; and
   a magnet or an electromagnet, configured to apply a magnetic field within the article, wherein the strength of the magnetic field can be varied to vary a mechanical property of the article; and
   a processor configured to vary the strength of the applied magnetic field to induce a target mechanical property in the article.

2. The system of claim 1, wherein the anisotropic magnetic particles comprise nanoparticles.

3. The system of claim 1, wherein the anisotropic magnetic particles comprise rod-shaped magnetic particles.

4. The system of claim 3, wherein the rod-shaped particles have an aspect ratio of from 5 to 500, or from 5 to 250.

5. The system of claim 3, wherein the rod-shaped particles have a diameter of from 50 nm to 500 nm, or from 100 nm to 300 nm.

6. The system of claim 3, wherein the rod-shaped particles have a length of from 1 micron to 25 microns.

7. The system of claim 1, wherein the anisotropic magnetic particles comprise plate-like particles.

8. The system of claim 1, wherein the anisotropic magnetic particles are present in the composition in an amount of from 0.1% by weight to 10% by weight, based on the total weight of the composition, or from 0.1% by weight to 5% by weight, from 0.1% by weight to 2.5% by weight, or from 0.1% by weight to 1% by weight, based on the total weight of the composition.

9. The system of claim 1, wherein the composition further comprises a non-magnetic filler, or silica particles.

10. The system of claim 1, wherein the elastomeric resin comprises a crosslinkable composition, or a crosslinkable silicone composition.

11. The system of claim 10, wherein the elastomeric resin comprises (A) a first organosilicon compound having at least two ethylenically unsaturated moieties per molecule; and optionally (B) one or more additional organosilicon compounds.

12. The system of claim 1, wherein the article is formed by an additive manufacturing process.

13. The system of claim 1, wherein the article comprises a cushion or structural member.

14. The system of claim 1, further comprising a processor configured to calculate a force applied to the article based on a measurement of a change in the magnetic field strength within the article.

* * * * *